US010430789B1

(12) United States Patent
Herald, Jr. et al.

(10) Patent No.: US 10,430,789 B1
(45) Date of Patent: Oct. 1, 2019

(54) SYSTEM, METHOD AND COMPUTER PROGRAM PRODUCT FOR SECURE RETAIL TRANSACTIONS (SRT)

(71) Applicant: LOCKHEED MARTIN CORPORATION, Bethesda, MD (US)

(72) Inventors: Thomas E. Herald, Jr., Oviedo, FL (US); Michael F. Riera, Hialeah, FL (US); Javier A. Rivas, Orlando, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 14/943,332

(22) Filed: Nov. 17, 2015

Related U.S. Application Data

(63) Continuation-in-part of application No. 14/506,590, filed on Oct. 3, 2014, now Pat. No. 9,760,738, and a
(Continued)

(51) Int. Cl.
*H04L 29/06* (2006.01)
*G06Q 20/38* (2012.01)
*G06Q 20/14* (2012.01)

(52) U.S. Cl.
CPC ........... *G06Q 20/385* (2013.01); *G06Q 20/14* (2013.01); *G06Q 20/3829* (2013.01)

(58) Field of Classification Search
CPC ... G06Q 20/14; G06Q 20/386; G06Q 20/3829
See application file for complete search history.

(56) References Cited

U.S. PATENT DOCUMENTS 4,937,861 A 6/1990 Cummins
4,951,249 A 8/1990 McClung et al.
(Continued)

FOREIGN PATENT DOCUMENTS

WO WO2012/070923 * 5/2012
WO WO2012070923 * 5/2012

*Primary Examiner* — Yin Chen Shaw
*Assistant Examiner* — Darshan I Dhruv
(74) *Attorney, Agent, or Firm* — Terry M. Sanks, Esq.; Beusse Wolter Sanks & Maire, PLLC

(57) ABSTRACT

Embodiment for systems, method and computer program products for transacting a secure retail transaction (SRT). The system comprises a seller device to generate seller information associated with a financial transaction, a unique, one-time-only transaction identification and seller's financial institution data. A buyer device receives a transaction invoice having transaction invoice information and generates encrypted buyer data with the transaction invoice information. The system includes a transaction manager to generate a single transaction data packet comprising encrypted buyer data from the buyer device and the seller information transmitted and establishes a communication session from the buyer to transmit the encrypted transaction data packet to a buyer's financial institution. The buyer's institution sends the transaction packet information to the seller's institution for pairing with the unique, one-time-only encrypted invoice within allotted time established by the seller. The seller's institution determines if the unique, one-time-only transaction pairing is valid, then completes the transaction.

36 Claims, 33 Drawing Sheets

Related U.S. Application Data continuation-in-part of application No. 14/506,593, filed on Oct. 3, 2014, now Pat. No. 9,419,954, and a continuation-in-part of application No. 14/506,597, filed on Oct. 3, 2014, now Pat. No. 9,311,506, and a continuation-in-part of application No. 14/506,600, filed on Oct. 3, 2014, now Pat. No. 9,225,695.

(60) Provisional application No. 62/010,201, filed on Jun. 10, 2014.

(56) References Cited

U.S. PATENT DOCUMENTS

| | | | |
|---|---|---|---|
| 5,012,514 A | 4/1991 | Renton | |
| 7,020,638 B1 | 3/2006 | Yacobi et al. | |
| 7,024,493 B1 | 4/2006 | Tran | |
| 7,392,331 B2 | 6/2008 | James et al. | |
| 7,757,290 B2 | 7/2010 | Costea et al. | |
| 7,801,829 B2 | 9/2010 | Gray et al. | |
| 8,156,298 B1 | 4/2012 | Stubblefield | |
| 8,397,306 B1 | 3/2013 | Tormasov | |
| 8,459,545 B1 * | 6/2013 | Hammer | G06Q 30/06 235/379 |
| 8,494,168 B1 | 7/2013 | Tolfmans | |
| 8,528,059 B1 | 9/2013 | Labana et al. | |
| 8,543,838 B1 | 9/2013 | Au et al. | |
| 8,713,265 B1 | 4/2014 | Rutledge | |
| 8,886,760 B2 | 11/2014 | Jogand-Coulomb et al. | |
| 8,938,790 B2 | 1/2015 | Kang et al. | |
| 9,069,488 B2 | 6/2015 | Langas et al. | |
| 2002/0174337 A1 | 11/2002 | Aihara | |
| 2003/0064811 A1 | 4/2003 | Schlottmann | |
| 2003/0182245 A1 * | 9/2003 | Seo | G06Q 20/401 705/75 |
| 2004/0250092 A1 | 12/2004 | Hori et al. | |
| 2005/0027608 A1 * | 2/2005 | Wiesmuller | G06Q 20/04 705/80 |
| 2005/0152386 A1 | 7/2005 | Lesartre et al. | |
| 2005/0213766 A1 | 9/2005 | Goss | |
| 2005/0223146 A1 | 10/2005 | Dellacona | |
| 2006/0015748 A1 | 1/2006 | Goto et al. | |
| 2006/0020814 A1 | 1/2006 | Lieblich et al. | |
| 2007/0016799 A1 | 1/2007 | Klint et al. | |
| 2007/0118646 A1 | 5/2007 | Gassoway | |
| 2007/0125838 A1 | 6/2007 | Law et al. | |
| 2008/0017704 A1 | 1/2008 | VanDeburg et al. | |
| 2008/0172555 A1 | 7/2008 | Keenan | |
| 2009/0086977 A1 | 4/2009 | Berggren | |
| 2009/0132816 A1 | 5/2009 | Lee | |
| 2009/0216680 A1 * | 8/2009 | McCown | G06Q 20/1235 705/75 |
| 2009/0217047 A1 | 8/2009 | Akashika et al. | |
| 2009/0289106 A1 * | 11/2009 | Bishop | G06Q 20/02 235/379 |
| 2010/0031040 A1 | 2/2010 | Takano | |
| 2010/0153587 A1 | 6/2010 | Choi | |
| 2010/0179883 A1 | 7/2010 | Devolites | |
| 2010/0205091 A1 * | 8/2010 | Graziano | G06Q 20/102 705/40 |
| 2011/0004732 A1 | 1/2011 | Krakirian et al. | |
| 2011/0119190 A1 * | 5/2011 | Mina | G06Q 20/12 705/44 |
| 2011/0154039 A1 | 6/2011 | Liu et al. | |
| 2011/0161452 A1 | 6/2011 | Poornachandran et al. | |
| 2011/0231672 A1 | 9/2011 | Idani et al. | |
| 2012/0115441 A1 | 5/2012 | Schell | |
| 2012/0266230 A1 | 10/2012 | Vanderpol et al. | |
| 2012/0290474 A1 * | 11/2012 | Hoke | G06Q 30/04 705/40 |
| 2012/0303425 A1 | 11/2012 | Katzin et al. | |
| 2012/0303971 A1 | 11/2012 | Palka et al. | |
| 2013/0024371 A1 | 1/2013 | Hariramani et al. | |
| 2013/0067213 A1 | 3/2013 | Liu | |
| 2013/0117550 A1 | 5/2013 | Jevans | |
| 2013/0268437 A1 | 10/2013 | Desai et al. | |
| 2013/0294524 A1 | 11/2013 | Van Der Auwera et al. | |
| 2013/0305028 A1 | 11/2013 | Mo et al. | |
| 2013/0317835 A1 * | 11/2013 | Mathew | G06Q 30/02 705/2 |
| 2014/0006806 A1 | 1/2014 | Coreila et al. | |
| 2014/0040001 A1 * | 2/2014 | Harvey | G06Q 10/00 705/14.26 |
| 2014/0108241 A1 | 4/2014 | Tunnell et al. | |
| 2014/0108786 A1 | 4/2014 | Kreft | |
| 2014/0164545 A1 | 6/2014 | Davis et al. | |
| 2014/0310536 A1 | 10/2014 | Shacham | |
| 2014/0372307 A1 * | 12/2014 | Joao | G06Q 20/401 705/44 |

* cited by examiner

SYSTEM, METHOD AND COMPUTER PROGRAM PRODUCT FOR SECURE RETAIL TRANSACTIONS (SRT)

CROSS-REFERENCE TO RELATED APPLICATION

This application is a Continuation-in-Part of U.S. application Ser. No. 14/506,590; U.S. application Ser. No. 14/506,593; U.S. application Ser. No. 14/506,597; and U.S. application Ser. No. 14/506,600, all of which were filed Oct. 3, 2014, and claimed the benefit of U.S. Provisional No. 62/010,201 filed Jun. 10, 2014, and incorporated herein by reference in their entirety.

FIELD OF DISCLOSURE

The present disclosure generally relates to the field of data security systems and methods, and in particular, to a system and method to prevent cyber theft approaches that work with and through a computer operating system

BACKGROUND

When a computer operating system is processing, creating, or storing data, then various types of malicious software (malware, computer viruses, etc.) can be used to gather sensitive data for the purpose of stealing (or infiltrating) sensitive information for example personal, financial, or business importance. Malware has been designed to intercept this information in a variety of ways, such as by key logging, random access memory ("RAM") scraping, cold booting, direct memory access ("DMA") attacking or obtaining a print screen of the sensitive data from the computer and many other methods that exploit weaknesses in the computer operating system. Malware can also access data that is stored, such as on a hard drive or any, computer memory source, especially when such data is being processed by the operating system.

A number of anti-malware/antivirus strategies exist to detect and remove malware software and to provide real-time protection against the installation of malware software on a computer. However, if the computer has already been compromised and malicious software already exists and is running on the computer, user remains vulnerable to having sensitive data hijacked. Furthermore, these software defined anti-virus mechanisms require frequent virus definition updates and leave a healthy window of vulnerability from when new Malware is introduced to society or when a counter measure or detection and quarantine method is available.

Data security issues become more complex in a network environment. Steps are usually taken to ensure that access to the network is controlled, and that data is not vulnerable to attack during transmission. Many technologies are also available to encrypt data to help ensure privacy of sensitive data. Encrypted data generally depends on the existence of a secret key (or certificate) shared between the communicating parties. This type of data security is often used for online credit/debit card purchases. However, in most system architectures, this type of encryption is often handled by the operating system and as such can be compromised by software running on a preexisting malicious node.

SUMMARY

Embodiments relate to a system and method to prevent cyber theft approaches that work with and through a computer operating system. A systematic system comprising: a seller device configured to generate seller information associated with a financial transaction, a unique, one-time-only transaction identification and seller's financial institution data including financial routing number; and a buyer device configured to receive a transaction invoice having transaction invoice information data and generate encrypted buyer data with the transaction invoice information data. The system includes a transaction manager configured to generate a single transaction data packet comprised of the encrypted buyer data from the buyer device and the seller information transmitted from the seller device and establish a communication session from the buyer to transmit the encrypted transaction data packet to a buyer's financial institution system. The buyer's financial institution system being configured to send the transaction packet information to the seller's financial institution for pairing with the unique, one-time-only seller encrypted transaction invoice within the allotted time window established by the seller. The seller's financial institution system determines if the unique, one-time-only transaction pairing is valid, then completes the transaction with transaction notification back to the buyer's financial institution system and to the seller.

Another aspect of the embodiments, includes a systematic method comprising: generating, by a seller device, seller information representative of received seller information associated with a financial transaction, a unique, one-time-only transaction identification and seller's financial institution data including financial routing number from the seller device; and receiving, by a buyer device, a transaction invoice having transaction invoice information data and generating, by the buyer device, encrypted buyer data with the transaction invoice information data. The method includes generating, by a transaction manager, a single transaction data packet comprised of encrypted buyer data from the buyer device and the seller information transmitted from the seller device; and establishing, by a transaction manager, a communication session from the buyer to transmit the encrypted transaction data packet to a buyer's financial institution system. The method includes sending, by the buyer's financial institution system, the transaction packet information to the seller's financial institution system for pairing with the unique, one-time-only seller encrypted transaction invoice within the allotted time window established by the seller; and determining, by the seller's financial institution system, if the unique, one-time-only transaction pairing is valid, and then completing, by the seller's financial institution system, the transaction with transaction notification back to the buyer's financial institution system and to the seller.

An aspect of the embodiments include one or more non-transitory, tangible computer storage media having stored thereon multiple instructions causing the one or more processors to: generate, by a seller device, seller information representative of received seller information associated with a financial transaction, a unique, one-time-only transaction identification and seller's financial institution data including financial routing number from the seller device; and receive, by a buyer device, a transaction invoice having transaction invoice information data and generating, by the buyer device, encrypted buyer data with the transaction invoice information data. The instructions causing the processors also to generate, by a transaction manager, a single transaction data packet comprised of encrypted buyer data from the buyer device and the seller information transmitted from the seller device; establish, by a transaction manager, a communication session from the buyer to transmit the encrypted transaction data packet to a buyer's financial institution system; send, by the buyer's financial institution system, the transaction packet information to the seller's financial institution system for pairing with the unique, one-time-only seller encrypted transaction invoice within the allotted time window established by the seller; and determine, by the seller's financial institution system, if the unique, one-time-only transaction pairing is valid, and then completing, by the seller's financial institution, the transaction with transaction notification back to the buyer's financial institution system and to the seller.

BRIEF DESCRIPTION OF THE DRAWINGS

The present subject matter may take form in various components and arrangements of components, and in various steps and arrangements of steps. The appended drawings are only for purposes of illustrating example embodiments and are not to be construed as limiting the subject matter.

DETAILED DESCRIPTION

The present disclosure will now be described more fully hereinafter with reference to the accompanying drawings in which example embodiments of the disclosure are shown. However, this disclosure may be embodied in many different forms and should not be construed as limited to the embodiments set forth herein. These example embodiments are provided so that this disclosure will be both thorough and complete, and will fully convey the scope of the disclosure to those skilled in the art. Like reference numbers refer to like elements throughout the various drawings.

Figure 1:
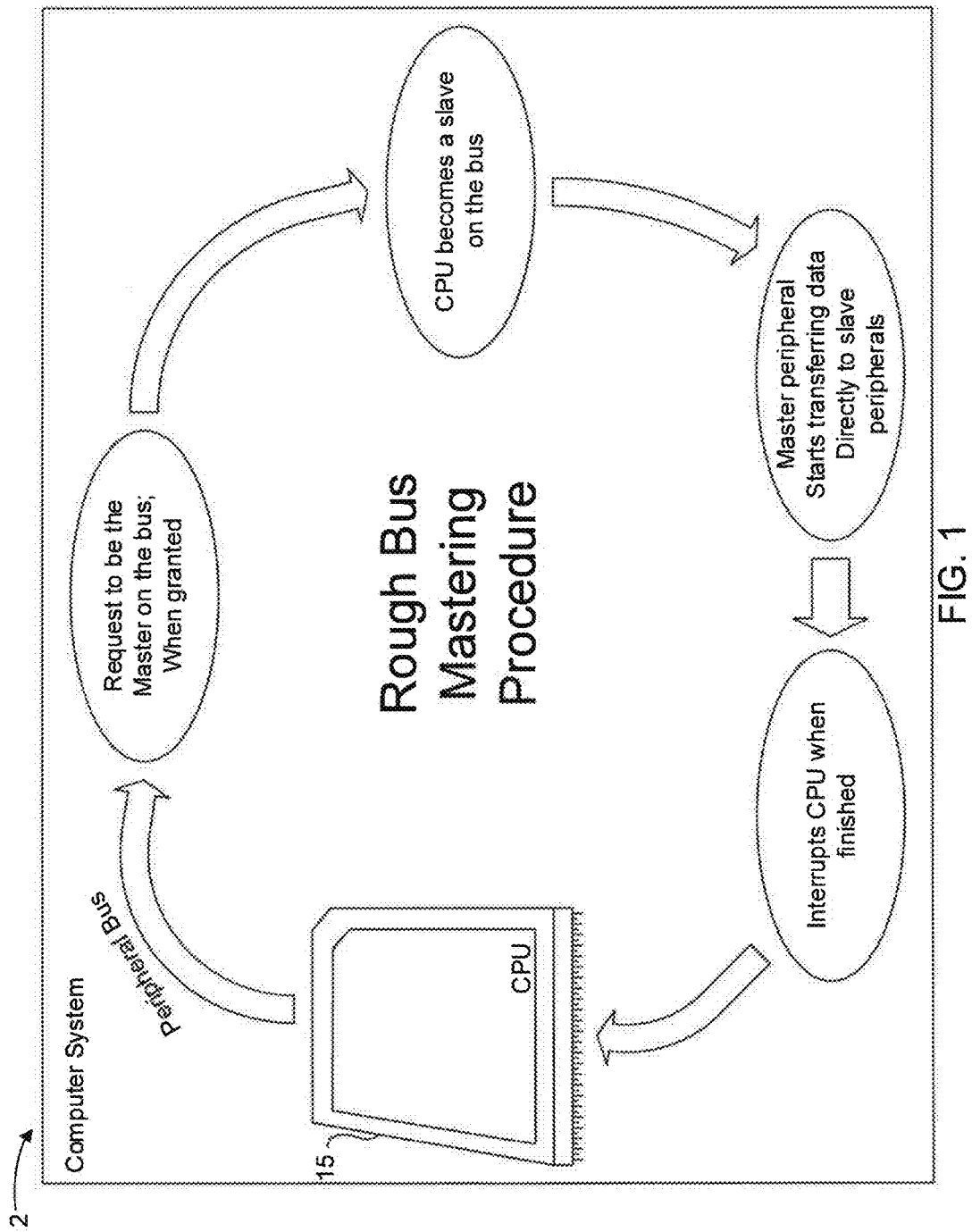
FIG. 1 shows a general flow diagram of an isolated DMA transfer from peripheral-to-peripheral via bus mastering according to an embodiment herein.

Generally, a system and method for storing and transmitting sensitive data is provided herein that allows for the creation and routing of data as shown in FIG. 1. This may be accomplished independently from a central processing unit (CPU) 15 of a computer system 2, and any associated and running operating systems. An isolated direct point to point communications (bus mastering) is used to transfer the secure data from peripheral-to-peripheral. The system and method configures the bus controller with source address and block size and destination address, causing a CPU 15 to discontinue bus mastering and allows for direct peripheral-to-peripheral communications, and starts transferring data between peripherals only; when concluded, an interrupt request is sent to the CPU 15 when finished, and then returns control to the CPU 15.

Different embodiments of the system are generally referred to herein as HardWallet, HardSafe, and. HardMobile, and collectively the "HardSuite" along with a Secure Key Management System (SKMS). The hardware used with the HardSuite includes, as a non-limiting example, a controller 20 (illustrated in FIG. 2A), for example a field-programmable gate array (FPGA), representing the HardWallet, HardSafe, and HardMobile IP with PCIe carrier (Peripheral Component Interconnect Express high-speed serial computer expansion bus), or any other form of interconnect such as InifiniBand, FSB, QPI, HyperTransport . . . etc. The controller 20 may be referred to as integrated circuit, programmable integrated circuit, FPGA, lattice FPGA, and control circuitry. The network interface card (NIC) 16 may be an optional shared. NIC or HardWallet/HardSafe can support onboard NICs. For setup, a trusted bootable CD (e.g., Live CD), or jump drive with Hard Wallet/HardSafe specific operating system (OS) that does not enable NIC is used (or it can be made into a partition on the existing hard drive). For HardMobile, a Mobile App similar to LiveCD may be used.

Figure 2A:
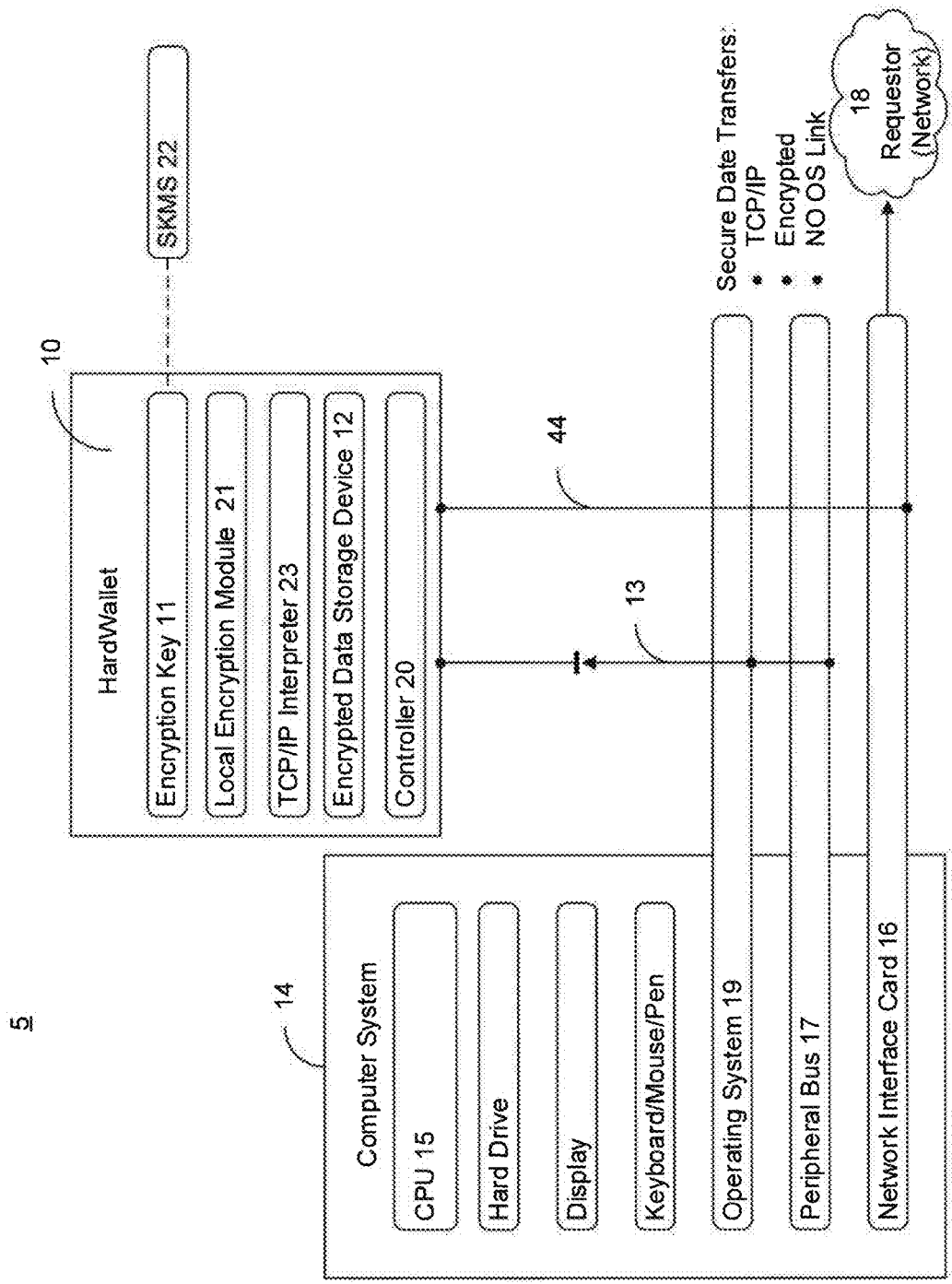
FIGS. 2A-2B show a block diagram of an independent hardware-based system for storing and transmitting sensitive data referred to as "HardWallet," of an embodiment herein.
Figure 2B:
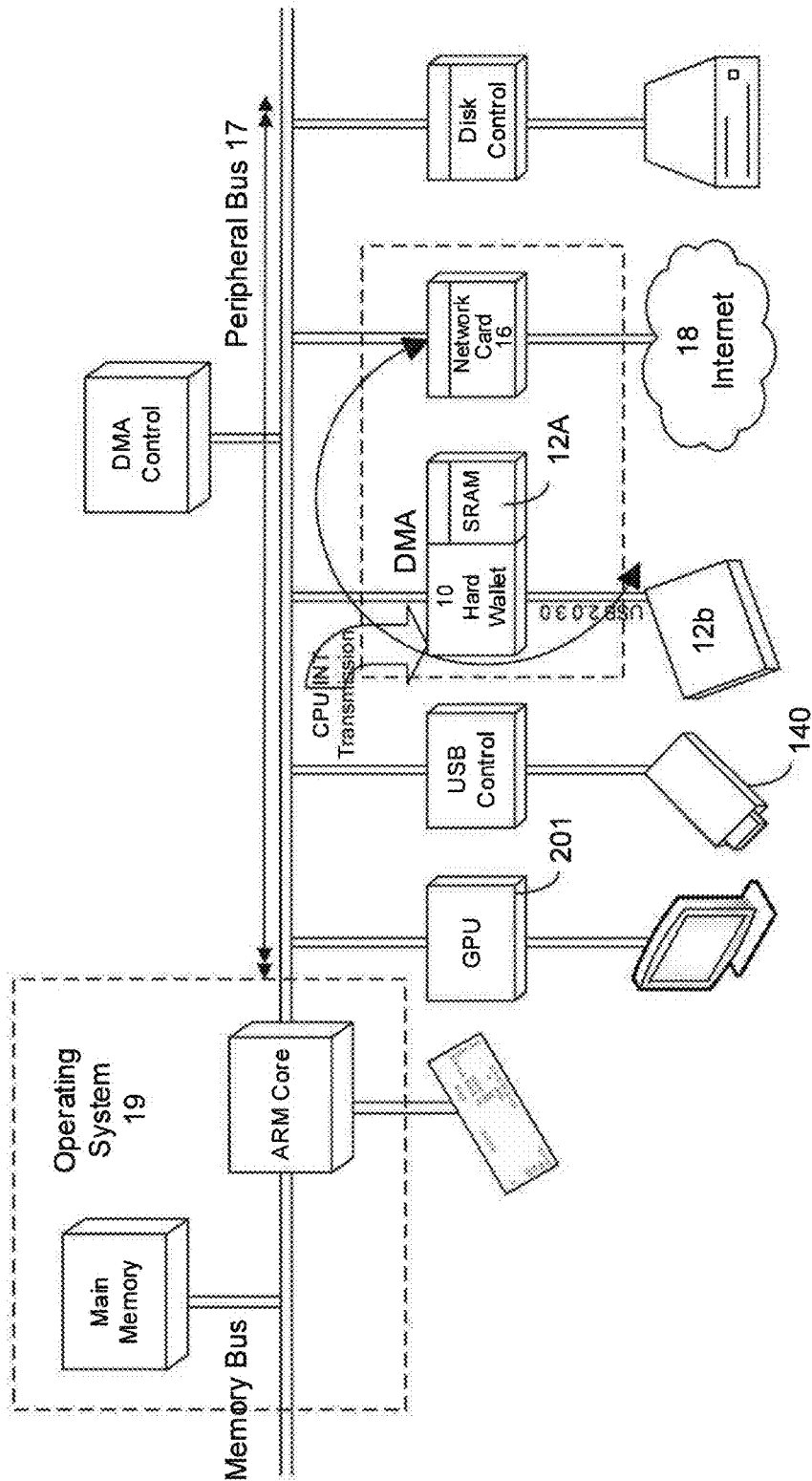

In a first embodiment, shown in FIGS. 2A-2B, sensitive data is protected by independent hardware 10 (hereinafter referred to as generally "HardWallet"), isolated from the native Operating System 19 of a computer system 14, which enables fully private and secure transmission of sensitive data via encryption keys of local encryption module 21 that are also private and secure and even only known by the HardWallet 10. (The term computer system 14 may be interchangeably referred to as computing device 14.) System 5, hereinafter referred to generally as "HardWallet system," is a two-part system with the computer system 14 being a first part and the HardWallet 10 being the second part and having a one-way trusted hardware interface 13 from a peripheral bus 17 of the native computer system 14 (i.e. a PCMCIA card or other bus connection and associated protocol) to an encrypted data storage device 12 (i.e. a jump drive or remote hard drive) that contains the sensitive data to be permanently secured for future retrieval. The encrypted data storage device (EDSD) 12 may sometimes be referred to as data storage device, storage device, data storage or secure data storage. A TCP/IP interpreter 23 may be provided in association with the data storage device 12 to provide from communications to the data storage device 12. In this manner, the CPU 15 of the computing system 14 only has unilateral communication to HardWallet 10, not from. The system 5 may be designed such that data cannot be retrieved because there will be no hardware support for said function; rather, data can only be "pushed." The HardWallet 10 handles communication between sensitive data either stored, for example, on the SRAM 12A or an external device, such as with the TCP/IP interpreter 23. The HardWallet 10 (and the HardSafe described hereinafter) is adapted for bus mastering, encrypted DMA streams, data sync operation (for Federal. Information Processing Standard Level 4—FIPS L4), SWARM routing (for HIPS USB/Ethernet (Common Internet File System—CIFS)/(Serial Advanced Technology Attachment—SATA) interfacing, and time/priority scheduling. The HardWallet 10 is designed such that only header data (such as file names, and time stamps) is returned. The system 5 is further adapted for data streaming. For live streaming, the "data save" function. (i.e., initial input into the HardWallet) can be combined with the "transfer out" function simultaneously such as a graphics processing unit (GPU) 201 for direct point to point video processing and delivery.

To initially program the HardWallet system 5 with sensitive data, the system 5 uses a one-way entrance to the HardWallet 10 via a trusted hardware interface 13 to store sensitive data (see also FIG. 7 described in more detail hereinafter). The data entered into the HardWallet 10 is initially and remains encrypted with a local encryption process of encryption module 21, as is the encryption key 11 itself, and thus both are fully secure from any system read or recovery method or mechanism. To use (i.e., read) the sensitive data from the secure HardWallet 10, the data consumer on the other hardware-connected end must have the same encryption key 11 in order to receive the data. At all points along the hardware path to the data consumer, the data is encrypted and secure. As disclosed in further detail with respect to FIG. 3A, a secure key management system (SKMS) 22 may be provided to store encryption keys and to manage key utilization.

The HardWallet system 5 may be adapted for many uses, including making purchases from online retailers (described in more detail hereinafter with reference to the use cases shown in FIGS. 8A-8D). Generally, a computer system 14 adapted for HardWallet support with the appropriate hardware and software will allow for safer purchases online. Initially, HardWallet 10 is configured by the user with vendor specific data using the trusted hardware interface 13 to store sensitive data. This may be accomplished via a bootable CD (e.g., LiveCD) with a specially adapted HardWallet Operating System (HardWallet OS) used to initially boot the computer system 14 and configure the HardWallet 10 (as illustrated in FIG. 2A). The secure HardWallet environment disables network adapters and only enables lateral communications with HardWallet 10. In order to use the HardWallet 10 with online transactions, the HardWallet 10 also installs a browser Add-on for operation that assists in syncing the HardWallet secure data with the online retailer's servers by issuing a command that instructs HardWallet 10 to initiate a bus master protocol from Hard Wallet 10 to the NIC (Network Interface Card) 16 to route the sensitive stored in the HardWallet 10 out, such as but not limited to a requester (through the Internet 18) via the routing information. The term Internet 18 will be interchangeably used with computer network 18.

Generally, this embodiment advantageously includes one or more of the following: a hardware-based and encryption key 11 protected storage device 12; single-path (i.e., trusted hardware interface 13) assured encrypted storage through existing computer system 14 and operating system 19; single-path, hardware-based encrypted output 44 to any network-connected device agnostic of the interface technology (no operating system dependencies); leveraging complete isolation between the general computer system 14 and its native operating system 19 allowing the sensitive data to be encryption key secured; an interface that is hardware-independent from the native operating system and the sensitive data; implementation of a preconfigured "all or nothing" policy for routing of secure data from networked or non-networked devices; and a system that is independent of the interface technology and easily scalable with next generation technology.

Figure 2C:
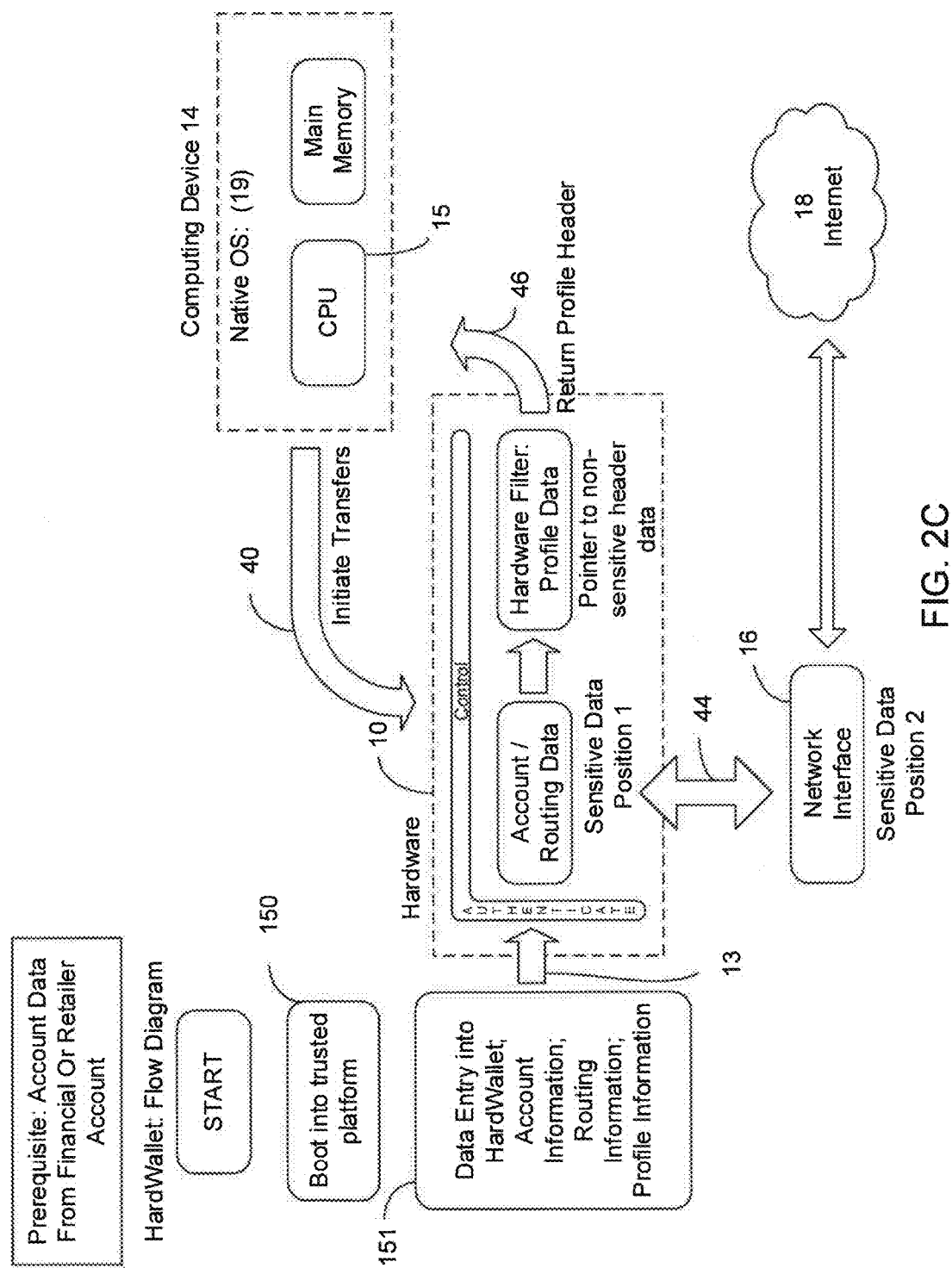
FIG. 2C shows a flow diagram illustrating an embodiment of HardWallet for unsecure source data ingest into encryption key-protected, secure HardWallet memory.

FIG. 2C shows a flow diagram illustrating an embodiment of HardWallet 10. A trusted application platform 50 is provided in which a boot process is initiated, at block 150. At block 151, data entry into the HardWallet 10 takes place, wherein the type of data entry may involve, but is not limited to, account information, routing information, profile information, etc. The information from the data entry may be stored in a secondary device, the Hard Wallet hardware, where the data is authenticated. Storing the data may be implemented simultaneously with transferring by the single-path, hardware-based encrypted output 44 the data to provide for simultaneously transferring the data to provide for data streaming to a communications interface, or communications interface component (i.e., NIC 16), which may output to a computer network 18, such as but not limited to the Internet. In addition to being authenticated, the data is controlled, such as with a programmable integrated circuit 20. A pointer to non-sensitive header data is created and a profile header 46 with the non-sensitive header data is communicated to the computing device 14. The profile header 46 may not be transferred to the computing device 14 until an initiate transfer request 40 is received from the computing device 14. With the profile header 46, a header/pointer/alias/reference/tag etc. of the document and not the document itself is being communicated to the computing device 14.

Thus, the system 5 comprises a secondary device (i.e., HardWallet 10) that comprises a programmable integrated circuit 20 and an associated secure data storage device 12. The secondary device (i.e., Hard-Wallet 10) may be connected to a computing device 14. The computing device 14 may be configured to operate via an operating system 19 with a CPU 15. The secondary device (i.e., HardWallet 10) may be adapted to receive input unilaterally via trusted hardware interface 13 from the computing device 14, store the input as source data on the secure data storage device 12, and transfer by the single-path, hardware-based encrypted output 44 the source data from the secure data storage device 12 to a communications interface (i.e., NIC 16) that connects the computing device 14 to a computer network 18, wherein the transfer is adapted to bypass the CPU 15.

In an embodiment, the system 5 may further comprise a trusted application platform 50 for inputting of initial data into the secure data storage. The trusted application platform 50 is adapted to boot the computing device 14 separate from the operating system 19 of the computing device 14, deactivate select operations of the computing device 14 for security including executables and network connections, and transmit initial data from the computing device 14 to the secure data storage device 12 via an isolated one-way communications link (i.e., trusted hardware interface 13) to store the initial data as source data. In another embodiment, the system 5 may further comprise an encryption module 21 for encrypting sensitive information of the source data, and a secure key management system 22 for generating encryption keys 11 and storing the encryption keys 11 together with the source data on the secure data storage device 12.

In an embodiment, the secondary device (i.e., HardWallet 10) may be further adapted to employ DMA or bus mastering for transferring the source data from the secure data storage device 12 to the communications interface (i.e., NIC 16) to bypass the CPU 15. In another embodiment, the secondary device (i.e., HardWallet 10) may be connected to a bus 17 of the computing device 14 and may comprise the programmable integrated circuit 20 and the secure data storage device 12. The secondary device (i.e., HardWallet 10) may be configured to receive an initiate transfer request 40 from the operating system 19 for initiating transfer of source data, authenticate the initiate transfer request, transfer by the-single-path, hardware-based encrypted output 44 the source data from the secure data storage device 12 to the communications interface (i.e., NIC 16) employing DMA or bus mastering for output to the computer network 18, and return a profile header 46 that may comprises non-sensitive header data to the operating system. In another embodiment, the secondary device (i.e., Hard Wallet 10) may be adapted to transmit the source data with bus mastering via the controller 20 configured with a source address and a destination address. The secondary device (i.e., HardWallet 10) may also be adapted to store the source data simultaneously with the transfer of the source data to provide for data streaming.

The secure data storage device 12 may comprise an internal storage medium 12a of the secondary device or an external data storage device 12b in communication with the secondary device (i.e., HardWallet 10). The communications interface component may comprise the NIC 16 in communication with a node on a computer network 18 or another peripheral on the computer network 18 as a destination for the source data.

Figure 2D:
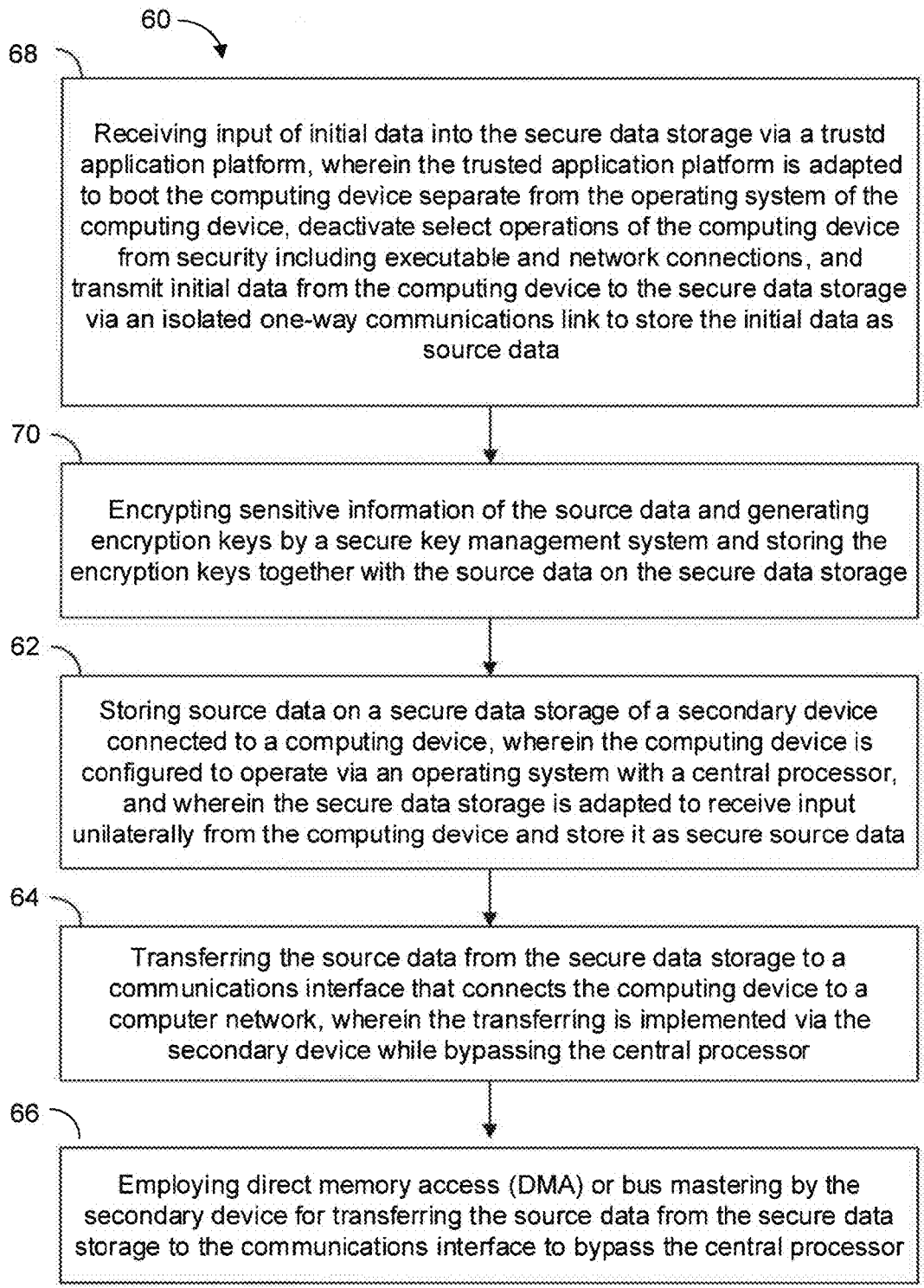
FIG. 2D shows a flowchart illustrating an embodiment of a method.

FIG. 2D shows a flowchart illustrating a method. The method 60 comprises storing source data on a secure data storage of a secondary device (i.e., HardWallet 10) connected to a computing device 14, wherein the computing device 14 is configured to operate via an operating system with a CPU 15, and wherein the secure data storage is adapted to receive input unilaterally from the computing device 14 and store it as source data, at 62. The method further comprises transferring the source data from the secure data storage device 12 to a communications interface (i.e., NIC 16) that connects the computing device 14 to a computer network, wherein the transferring is implemented via the secondary device (i.e., HardWallet 10) while bypassing the CPU 15, at 64.

The method 60 may further comprise employing DMA or bus mastering by the secondary device (i.e., HardWallet 10) for transferring the source data from the secure data storage to the communications interface to bypass the CPU 15, at 66. The method 60 may further comprise receiving input of initial data into the secure data storage via a trusted application platform 50, wherein the trusted application platform 50 may be adapted to boot the computing device 14 independent of the operating system 19 of the computing device 14, deactivate select operations of the computing device 14 for security including executables and network connections, and transmit initial data from the computing device 14 to the secure data storage via an isolated one-way communications link (i.e., trusted hardware interface 13) to store the initial data as source data, at 68. The method 60 may further comprise encrypting sensitive information of the source data and generating encryption keys 11 by a secure key management system 22 and storing the encryption keys 11 together with the source data on the secure data storage device 12, at 70. As illustrated, steps 68 and 70 may occur prior to steps 62, 64, and 66. Though the steps in FIG. 2*d* are illustrated as being in sequence, they may be performed in different orders. Furthermore, the addition of dependent steps 66, 68 and 70 may be performed independent of these other dependent steps.

Figure 3A:
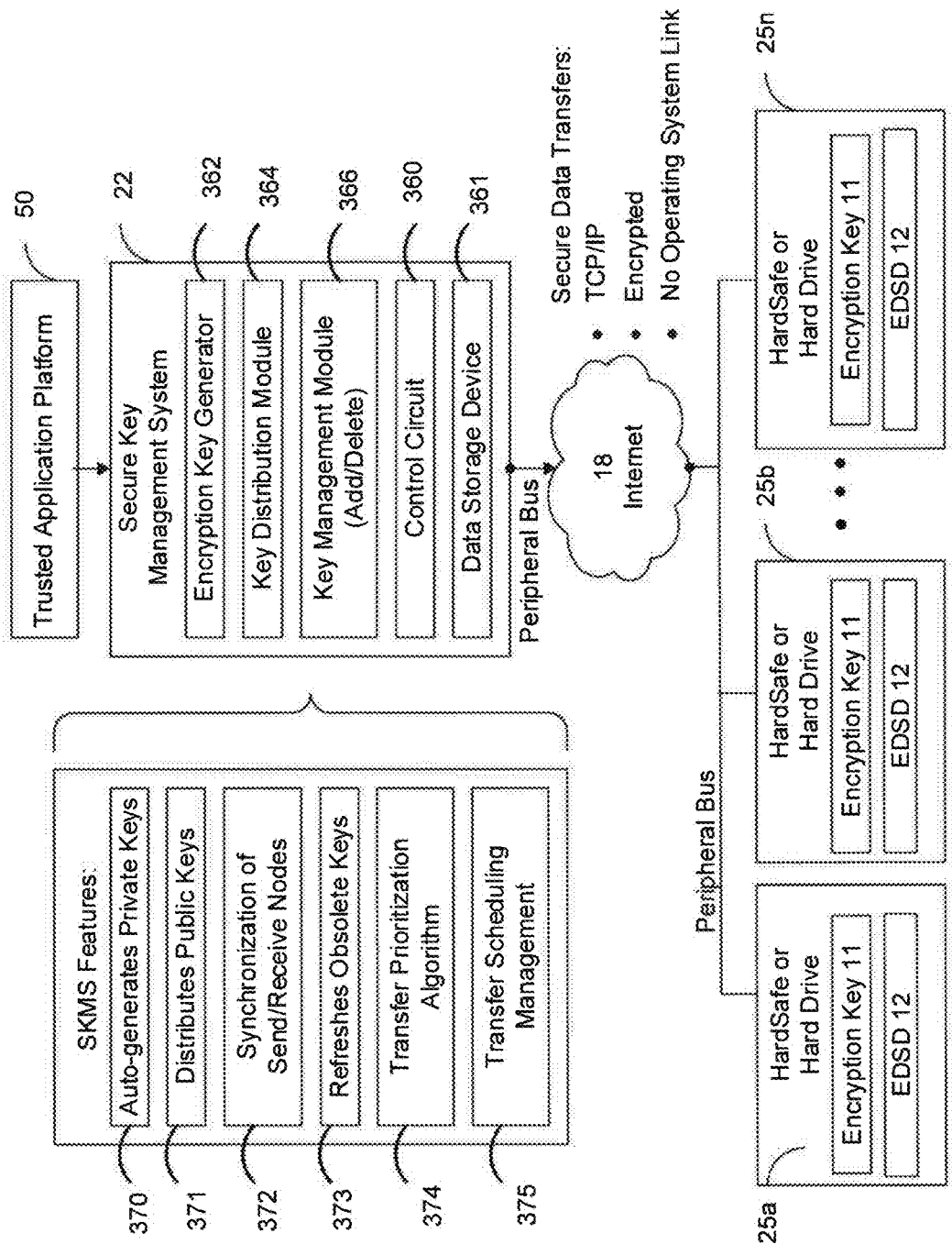
FIG. 3A is a block diagram of a secure key management system (SKMS) according to an embodiment herein.

In another embodiment, shown in FIG. 3A, a secure key management system (SKMS) is shown. The Secure Key Management System (SKMS) 22 stores encryption keys used for secure communications and is able to manage key utilization in an encrypted device. The functions of a SKMS 22 may include permission-based access, assured security of all keys from compromise and theft, and add/delete capabilities between clients. This system is highly configurable and scalable to the nodes of a secure network. The SKMS 22 can create new keys, replace keys as determined by the clients and/or the trusted application platform 50, and SKMS trust can be reestablished as desired. This SKMS 22 is independent from the native OS and data is fully secure from malicious attack. Most key features are held in software including key generation and automatic manipulations given a network.

Figure 3B:
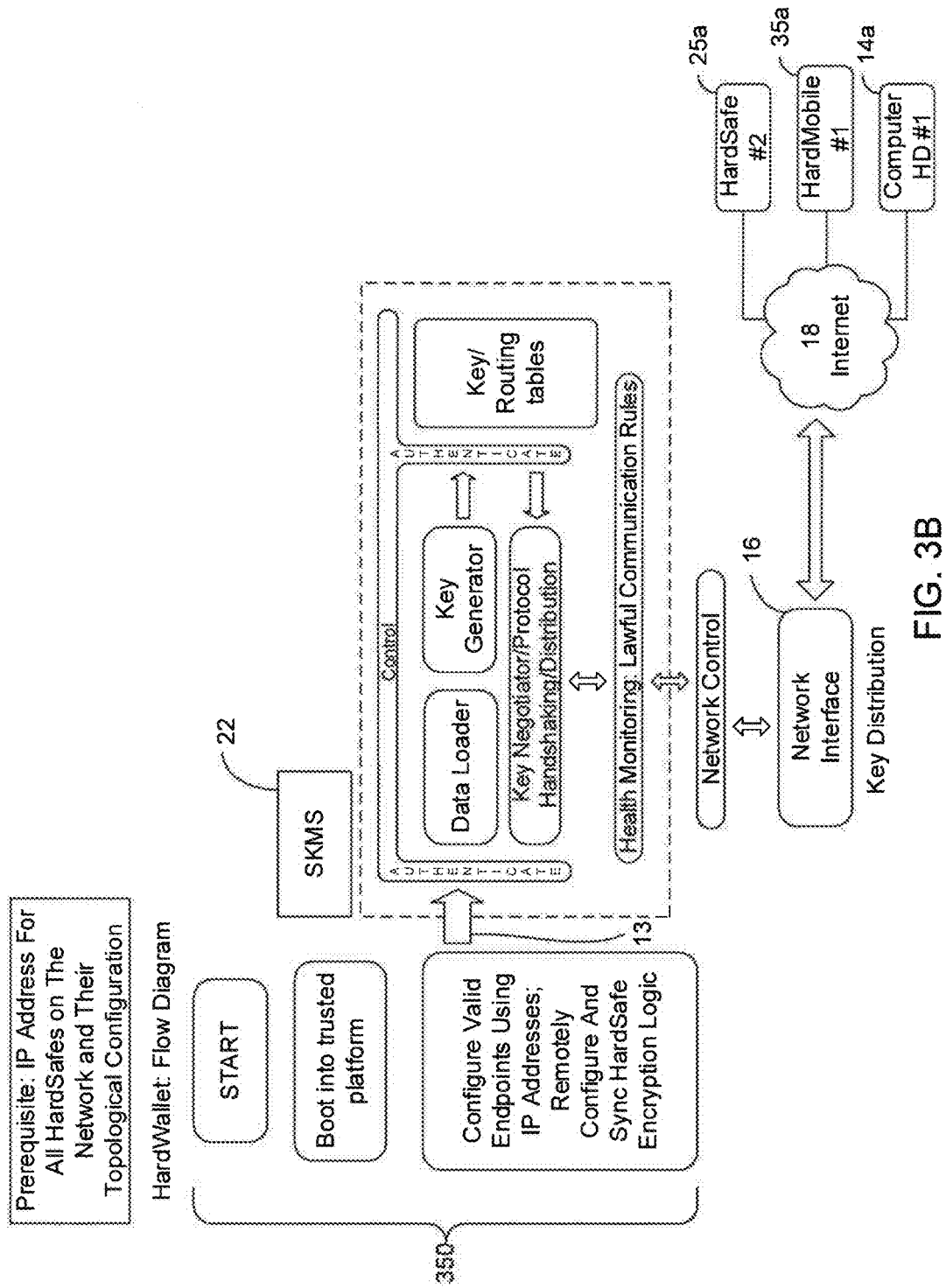
FIG. 3B shows a flowchart illustrating an embodiment of SKMS.

As further shown in FIG. 3B, a trusted application platform 50 is provided in which a boot process is initiated, at block 350. Data entry into the SKMS 22 takes place. The information is authenticated prior to generating and distributing the keys. The keys may then be communicated over the network interface (i.e., NIC 16) to a component in the HardSuite (i.e., HardSafe 25a, HardMobile 35a, or another computing system 14a).

Generally, this embodiment advantageously includes one or more of the following: programming of data through encrypted single path IN; management of encryption key distribution, routing, and authentication; management of keys through a hardware-only, mechanism to maintain security (independent of the native operating systems involved); creation of a hardware system that manages and distributes keys to networked or non-networked nodes that need security for data transmission; a source for configuring mass secure encrypted network streams.

Figure 3C:
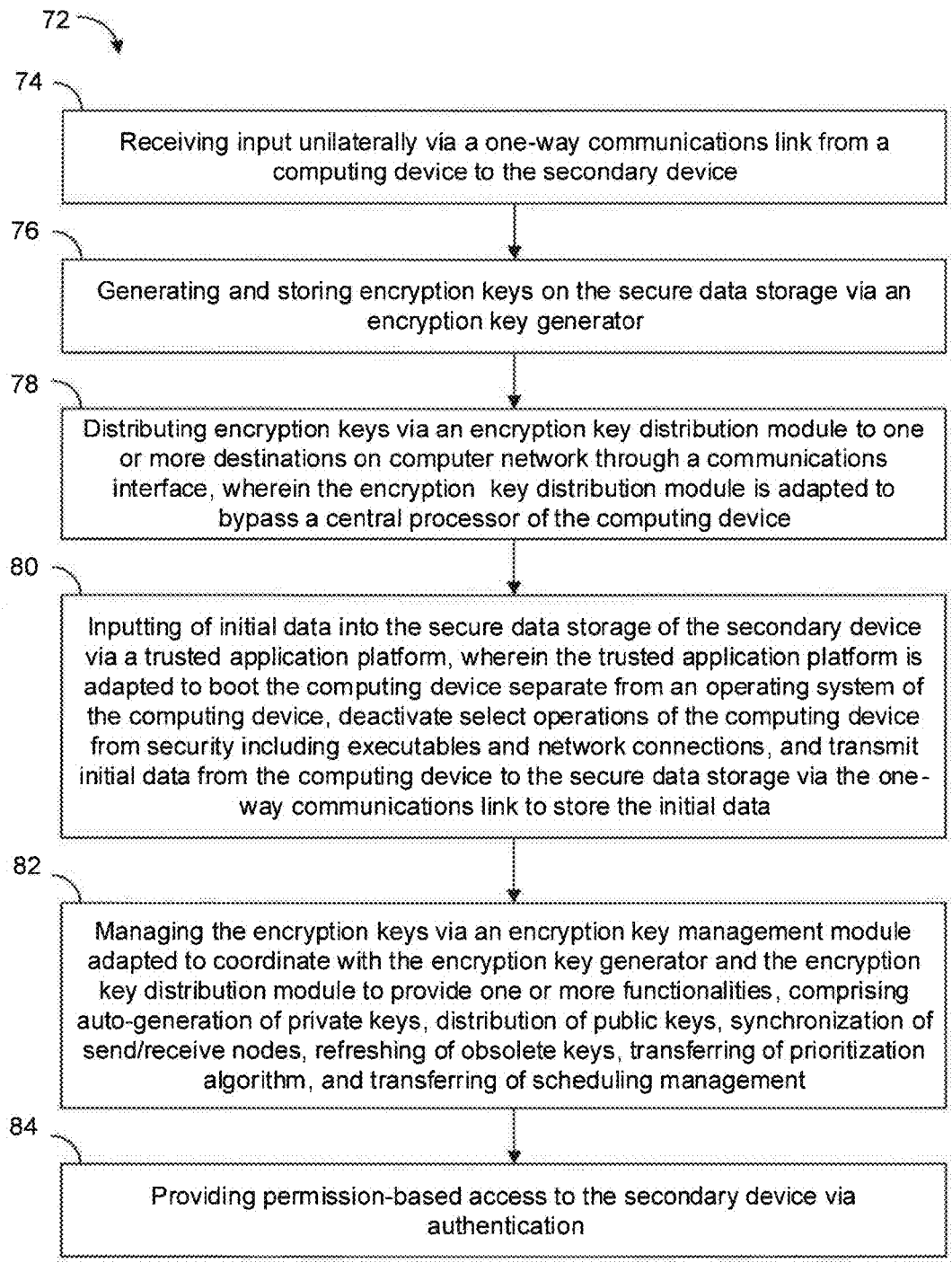
FIG. 3C shows a flowchart illustrating a SKMS method.

FIG. 3C shows a flowchart illustrating a method. The method 72 may be a computer-implemented for secure key management utilizing a secondary device (i.e., SKMS 22) comprising a programmable hardware component (i.e., control circuit 360) and an associated secure data storage device 361. The method comprises receiving input unilaterally via a one-way communications link trusted hardware interface 13) from a computing device 14 to the secondary device, at 74. The method further comprises generating and storing encryption keys on the secure data storage device 361 via an encryption key generator 362, at 76. The method 72 also comprises distributing encryption keys via an encryption key distribution module 364 to one or more destinations on computer network through a communications interface, wherein the encryption key distribution module 364 is adapted to bypass a central processor unit (CPU) 15 of the computing device 14, at 78.

The method 72 may further comprise inputting of initial data into the secure data storage device 361 of the secondary device (i.e., SMKS 22) via a trusted application platform 50, wherein the trusted application platform 50 may be adapted to boot the computing device 14 independent of an operating system 19 of the computing device 14, deactivate select operations of the computing device 14 for security including executables and network connections, and transmit initial data from the computing device 14 to the secure data storage device 361 via the one-way communications link (i.e., trusted hardware interface 13) to store the initial data, at 80. The method may further comprise managing the encryption keys via an encryption key management module 366 adapted to coordinate with the encryption key generator 362 and the encryption key distribution module 364 to provide one or more functionalities, comprising auto-generation of private keys 370, distribution of public keys 371, synchronization of send/receive nodes 372, refreshing of obsolete keys 373, transferring of a prioritization algorithm 374, and transferring of scheduling management 375, at 82. The method 72 may further comprise providing permission-based access to the secondary device via an authentication module, at 84. Though the steps in FIG. 3c are illustrated as being in sequence, they may be performed in different orders. Furthermore, the addition of dependent steps 80, 82 and 84 may be performed independent of these other dependent steps.

Distributing the encryption keys comprises DMA or bus mastering that bypasses the CPU 15 of the computing device 14. The initial data comprises addressing and routing information for the one or more destinations on the computer network. The one or more destinations on the computer network comprise further secure data storage devices adapted to securely store the encryption key and further encrypted data. The secure data storage comprises an internal storage medium of the secondary device or an external data storage device in communication with the secondary device. The secondary device (i.e., SKMS 22) is connected to a bus of the computing device 14 for input and connected to the communications interface for output. The communications interface may comprises a NIC 16 in communication with a node on a computer network or another peripheral on the computer network. Furthermore, the secondary device (i.e., SKMS 22) may be adapted to execute input, processing, and output related functions simultaneously to provide for data streaming.

Figure 4A:
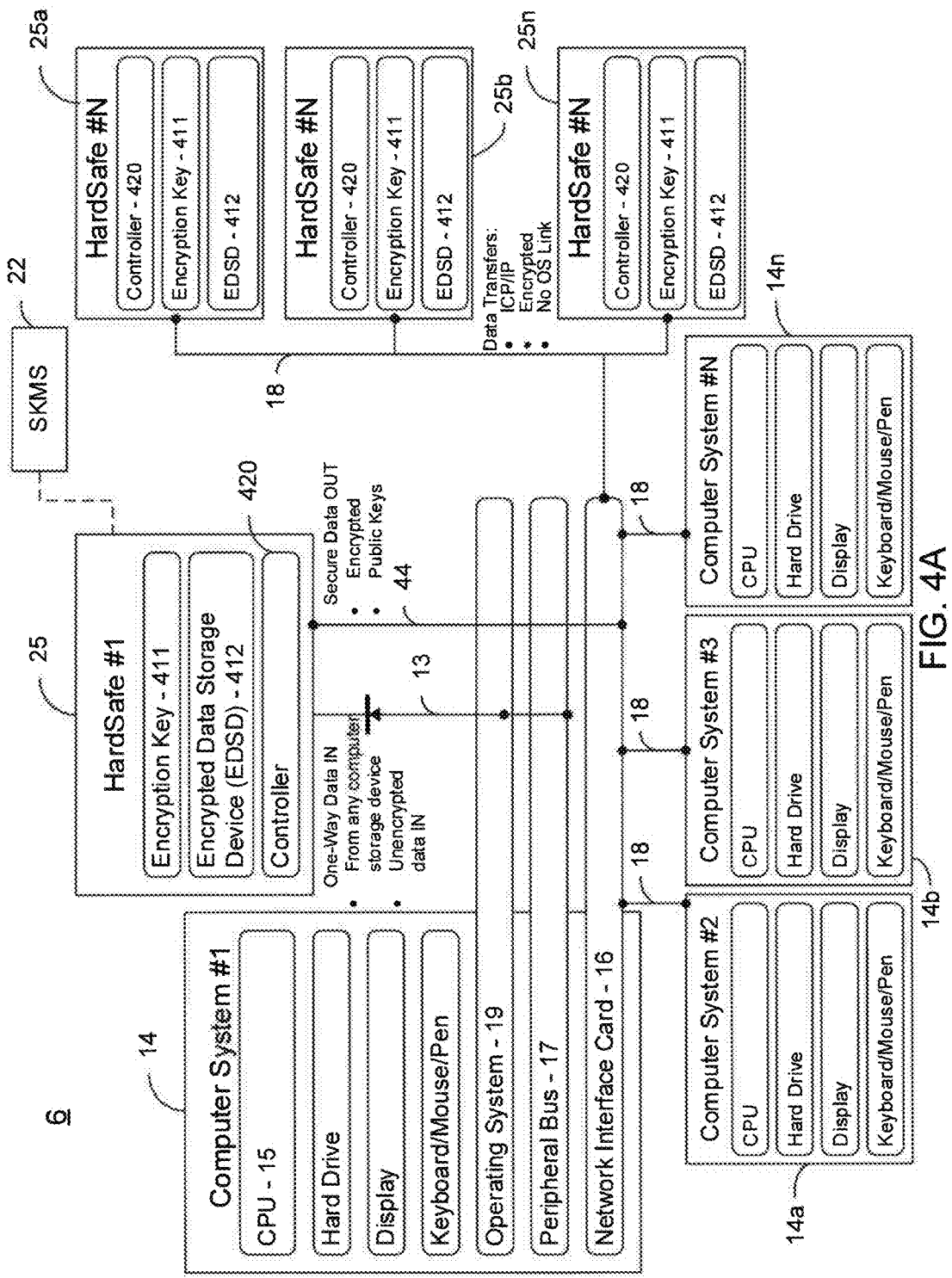
FIGS. 4A-4C show block diagrams of an independent hardware-based system for storing and transmitting sensitive data referred to as "HardSafe," of an embodiment herein.
Figure 4B:
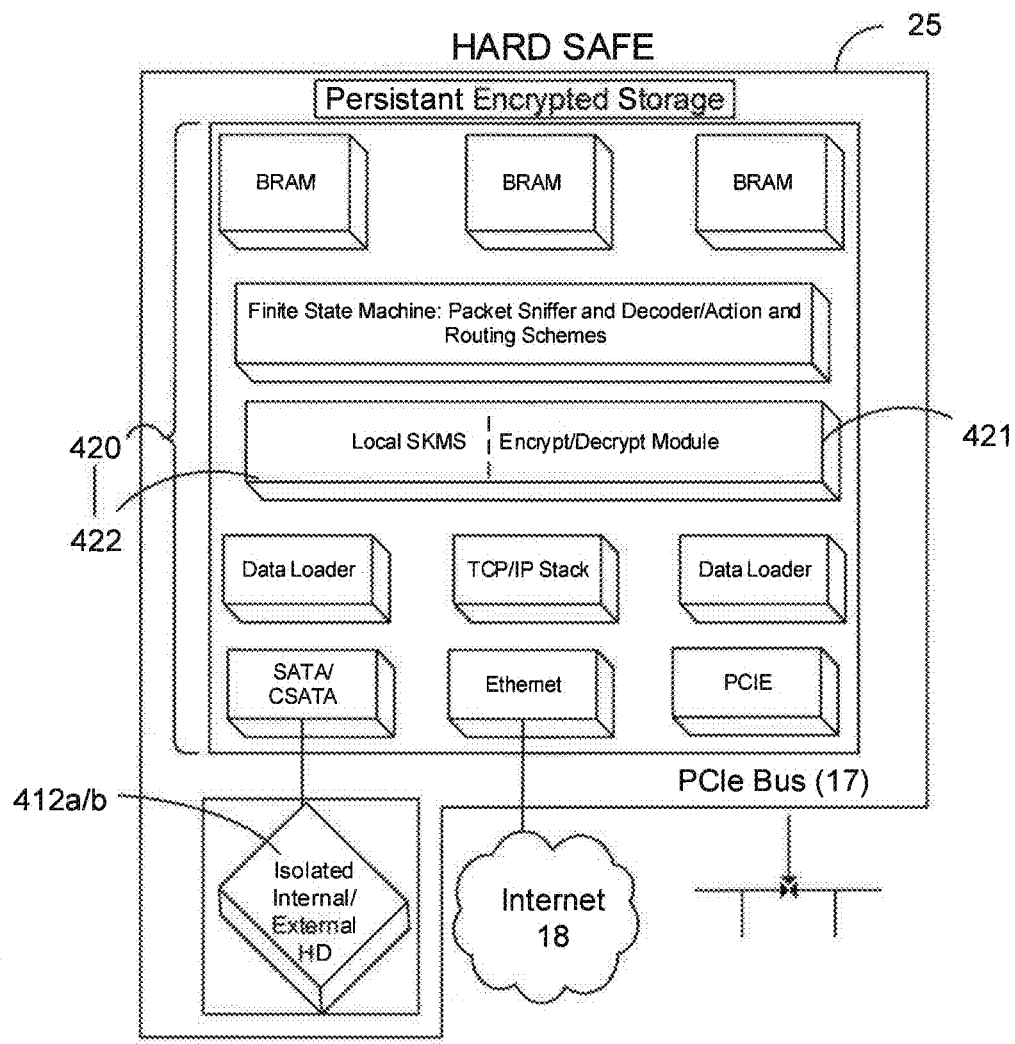
Figure 4C:
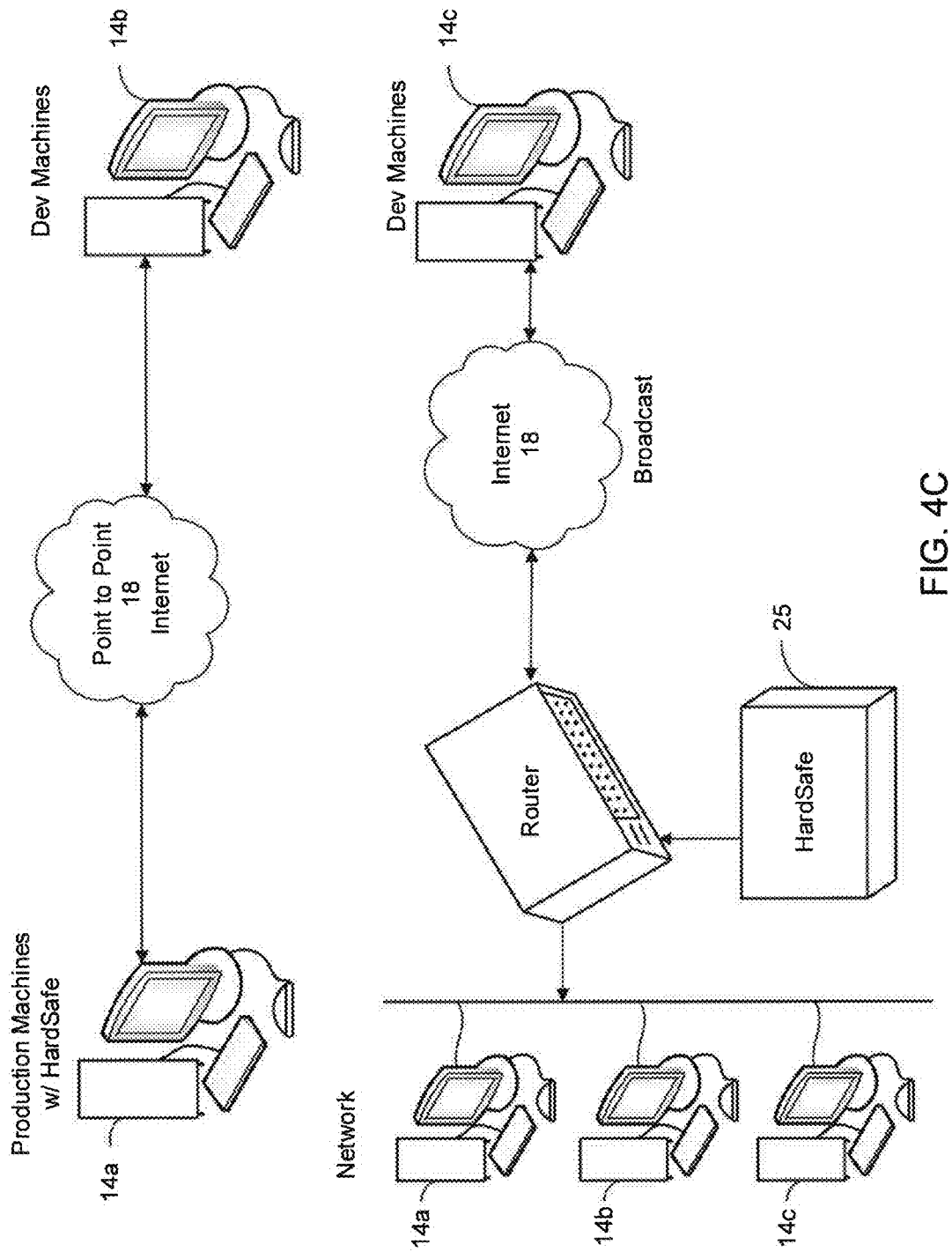

In another embodiment, shown in FIGS. 4A-4C, sensitive data is protected by an independent hardware-based component referred to herein as "HardSafe 25." The system 6 provides fully secure transfer of sensitive data between two storage mediums (i.e., encrypted data storage device (EDSD) 412, computer systems 14a-n, HardSafes 25a-n or networks) using open and public network connections, such as, but not limited to the Internet 18 via encrypted data and encrypted keys 11. HardSafe 25 creates a secure point-to-multipoint hardware system storage system that allows for the transfer and storage of sensitive data across multiple nodes via Internet 18. HardSafe 25 manages routes, schedules, and prioritizes the sensitive data kept in local or distributed secure storage. Sensitive data in such a system will remain uncompromised even after physical theft as the encryption key is also encrypted onboard.

As illustrated in further detail in FIG. 4B, the HardSafe 25 comprises control circuitry (controller) 420 and a secure (encrypted) data storage device (EDSD) 412. Communication portals are provided to communicate to a computer network (illustrated as the Internet) and a bus 17, Additional information about the communication protocols are provided herein.

To initially store sensitive data onto the HardSafe 25, the system 6 uses a one-way entrance trusted hardware interface 13 to the HardSafe 25 via a trusted software interface to store the sensitive data (see also FIG. 7 described in more detail hereinafter). The data entered into the HardSafe 25 is initially and always encrypted, as is the encryption key 411 itself, and thus both are fully secure from any system read or recovery method or mechanism.

The HardSafe 25 may be adapted for many uses, including transmitting sensitive data between two storage mediums (i.e., computer system 14, computer systems 14a-n, and HardSafes 25 a-n) (described in more detail hereinafter with reference to FIGS. 8A-8D). As further illustrated in FIG. 4c, if a user wishes to transfer sensitive data (e.g., binaries) from a secure jump drive 412b (e.g., removable USB drive 140) to an external hard drive, a computer adapted for HardSafe support with the appropriate hardware and software will allow for safer transfer. As further illustrated in FIG. 4C, the HardSafe 25 may be used in association with a router.

Figure 4D:
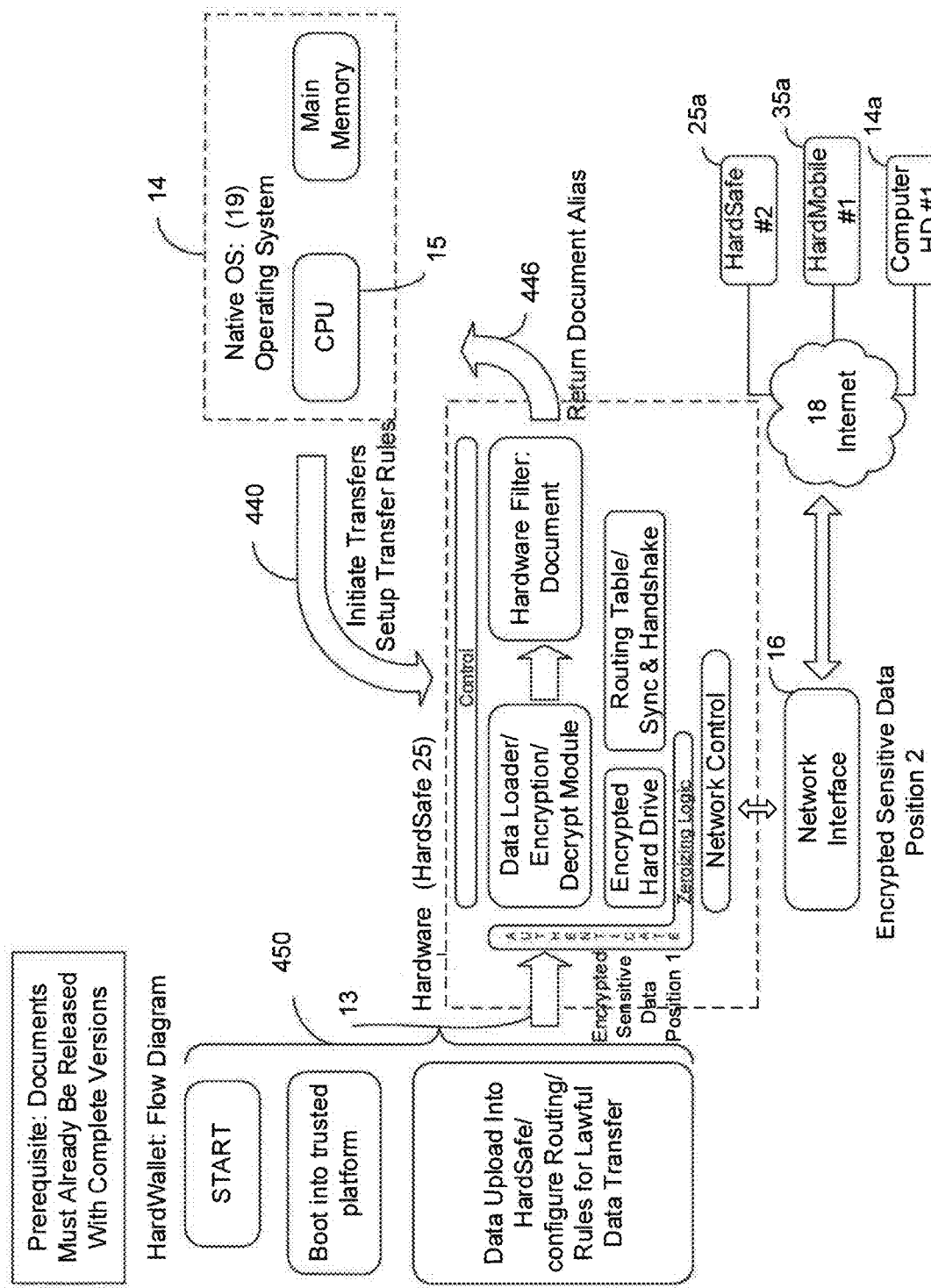
FIG. 4D shows a flowchart illustrating an embodiment of the HardSafe.

As further illustrated in FIG. 4D, to implement the transfer, the user connects both storage mediums to the user's computer and boots a HardSafe partition with HardSafe OS (or uses a bootable CD with HardSafe OS), such as but not limited to via a trusted application platform 50 via blocks 450 to set up the routing information which includes, for example, file name(s) and, IP address (which can include wild cards *), with scheduling data regarding when to deploy. Public and privates keys, such as, but not limited to generated by HardSafe software, are generated for both source and target nodes and places them on the source and target file systems and scrambles it so that both nodes are now synced and authenticated. Each HardSafe 25 can stage data in its external encrypted hard drive 412a and send data based on scheduled releases. Endpoints that are not HardSafe 25 (i.e., Hard Drive—HD) will be immediately copied to destination.

The data transfer is then initiated via the Hard Safe Partition or through normal OS function (where only the data header will be available to OS) or scheduling is setup for when the data needs to be deployed. In this manner, the data copying will be handled all in hardware with no main memory interference or CPU intervention. There is external memory that is isolated by HardSafe 25 that allows software to be staged until the scheduler either manually kicks it off, or when it is due. In a distributed scenario, data can be received from a CIFS based protocol directly into HardSafe 25, encrypted and stored.

Generally, this embodiment advantageously includes one or more of the following: an assured, tamper-safe, trusted delivery of data to any network-connected peripheral device; a single-path, protected data input; a one-to-many prioritization, scheduling and delivery of encrypted data; a mechanism to recover physically lost data when a hardware re-connection is made to any connected network by providing data on where the hardware connection was made (valuable for identification); a mechanism to initiate encryption key permanent destruction/deletion; an internal monitor and self-destruction mechanism; accommodation of multiple encryption keys and multiple encrypted storage devices; configurable to be self-aware of the allowable environments and when violated, deletes any encryption keys that are being held in HardSafe 25, which renders the data unusable and permanently lost (i.e., similar to an aircraft Black Box only being readable by a known environment. If any other environment attempts to retrieve data, it is permanently destroyed); permits data recovery in the event it has been physically compromised, by a trusted environment; configuration of a single system in a point-to-point fashion, or a single system can accommodate multiple unsecure systems in a server-connected network architecture; support of multiple secure storage mediums with their own respective encryption keys; segmentation of data for added security and implements hardware-accelerated compression; and operation without requiring an operating system on the computer environment (Data is pushed to unsecure storage medium through hardware, and the operating system cannot request a data transmission. Data is routed via the scheduler and routing tables).

Thus, the system 6, as illustrated in FIG. 4B, may comprise a secondary device (i.e., HardSafe 25) that has a control circuitry 420 and associated secure data storage device 412. The plurality of components are illustrated with respect to the control circuitry 420, other embodiments of the control circuitry 420 may be used. This secondary device may be considered the HardSafe 25. The secondary device (i.e., HardSafe 25) is connected to a computing device 14. The computing device 14 is configured to operate with an operating system 19 and a CPU 15. The secondary device (i.e., HardSafe 25) is adapted to receive input unilaterally, through a trusted hardware interface 13, from the computing device 14. The input may include one or more of routing, scheduling, and prioritization information for one or more destinations, Which may comprise other network-connected storage mediums or network-connected peripheral devices (i.e., computer systems 14*a-n*, HardSafes 25*a-n*). The secure data storage device 412 is provided to store the input as source data. The source data may be transferred from the secure data storage device 412 to the one or more destinations through the communications interface (i.e., NIC 16) connected to the computer network 18. The transfer bypasses the CPU 15 and is in accordance with the one or more of routing, scheduling, and prioritization information.

The system 6 may further receive input of initial data into the secure data storage device 412 via a trusted application platform 50. The trusted application platform 50 may be adapted to boot the computing device 14 separate from the operating system 19 of the computing device 14, deactivate select operations of the computing device 14 for security including executables and network connections, and transmit initial data from the computing device 14 to the secure data storage device 412 via the isolated one-way (communications link) trusted hardware interface 13 to secure the initial data as source data. In another embodiment, the system 6 may further comprise an encryption/decryption module 421 for encrypting sensitive information of the source data, a secure key management system 422 for generating encryption keys 411 and storing the encryption keys 411 together with the source data on the secure data storage device 412, and a monitoring mechanism for monitoring connections of the secondary device (i.e., HardSafe 25) and initiating destruction of encryption keys 411 upon detection of a connection of the secondary device (i.e., HardSafe 25) to an unknown environment.

The secondary device (i.e., HardSafe 25) may comprise control circuitry 420 and the secure (encryption) data storage device 412. The secondary device (i.e., HardSafe 25) may be connected to a bus 17 of the computing device 14 for data input and connected to a communications interface (i.e., NIC 16). In another embodiment, secondary device is configured to receive an initiate transfer request 440 from the operating system 19 for initiating transfer of the source data, authenticate the initiate transfer request, access the one or more of routing, scheduling, and prioritization information for the one or more destinations, transfer by the single-path, hardware-based encrypted output 44 the source data, employing DMA or bus mastering to bypass the CPU 15, from the secure data storage device 412 to the one or more destinations via the communications interface (i.e., NIC 16) for output to the computer network 18, and return a profile header 446 comprising non-sensitive header data to the operating system. The secure data storage device 412 may also comprise an internal storage medium 412*a/b* of the secondary device or an external data storage device 412*a/b* in communication with the secondary device (i.e., HardSafe 25). Additionally, the secondary device (i.e., HardSafe 25) may be adapted to transmit the source data with bus mastering via a controller (i.e., control circuitry 420) configured with one or more of routing, scheduling, and prioritization information for the one or more destinations. The secondary device (i.e., HardSafe 25) may be adapted to store the source data simultaneously with the transfer of the source data to provide for data streaming to the one or more destinations.

The communications interface may comprise the NIC 16 in communication with a node on a computer network 18 or another peripheral on the computer network 18 as a destination for the source data.

Figure 4E:
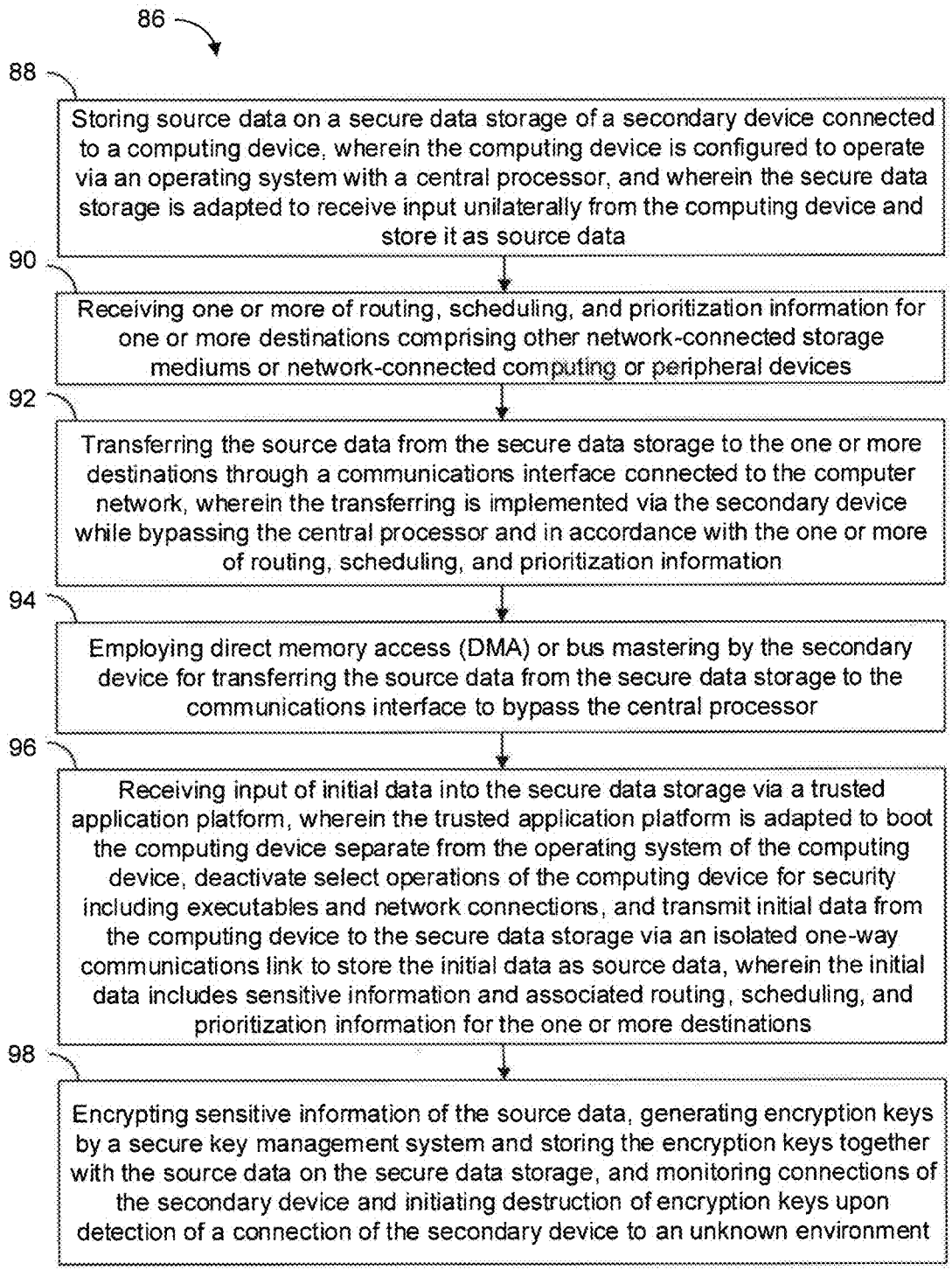
FIG. 4E shows a flowchart illustrating an embodiment of a HardSafe method.

FIG. 4E shows a flowchart illustrating an embodiment of a method. The method 86 may be computer-implemented. The method 86 comprises storing source data on a secure data storage of a secondary device (i.e., HardSafe 25) connected to a computing device 14, at 88. The computing device 14 is configured to operate via an operating system 19 with a CPU 15, and the secure data storage device 412 is adapted to receive input unilaterally from the computing device 14 and store it as source data. The method 86 further comprises receiving one or more of routing, scheduling, and prioritization information for one or more destinations comprising other network-connected storage mediums or network-connected computing or peripheral devices, at 90. The method 86 further comprises transferring the source data from the secure data storage to the one or more destinations through a communications interface connected to the computer network, at 92. The transferring is implemented via the secondary device (i.e., HardSafe 25) while bypassing the central processor and in accordance with the one or more of routing, scheduling, and prioritization information.

In an embodiment, the method 86 may further comprise employing DMA or bus mastering by the secondary device (i.e., HardSafe 25) for transferring the source data from the secure data storage to the communications interface to bypass the central processor, at 94. In another embodiment, the method 86 may further comprise receiving input of initial data into the secure data storage via a trusted application platform, at 96. The trusted application platform 50 may be adapted to boot the computing device 14 independent of the operating system 19 of the computing device 19, deactivate select operations of the computing device 14 for security including executables and network connections, and transmit initial data from the computing device to the secure data storage via an isolated one-way communications link (i.e., trusted hardware interface 13) to store the initial data as source data. The initial data may include sensitive information and associated routing, scheduling, and prioritization information for the one or more destinations. In another embodiment, the method 86 may further comprise encrypting sensitive information of the source data, generating encryption keys by a secure key management system 422 and storing the encryption keys together with the source data on the secure data storage, and monitoring connections of the secondary device and initiating destruction of encryption keys upon detection of a connection of the secondary device to an unknown environment, at 98. Though the steps in FIG. 4E are illustrating being in sequence, they may be performed in any different order. Furthermore, the addition of dependent steps 94, 96 and 98 may be individually performed independent of the other dependent steps.

In another embodiment, shown in FIGS. 5A-5B, secure transfer of sensitive data for mobile devices is shown, hereinafter referred to as "HardMobile." HardMobile permits the secure transfer of sensitive data (such as credit/debit card number, security code, name, address, social security number, phone number, etc. as desired) from one HardMobile device to another without needing to process the data. As a non-limiting example, the HardMobile device may allow for purchasing an item from a merchant at a flea market using a hardware interface that is fully secure for the consumer and vendor, validated by the banking institution (as is done today), and only synchronization information (not sensitive information) is shared with the merchant. The synchronization/encrypted data may be a credit-alias that the bank recognizes and pays the merchant accordingly. A second non-limiting capability may be when pre-established pairings exist, and the mobile device triggers a transaction to take place, while sharing no data, and not using the mobile device software. This implementation changes the architecture of the mobile device to include fully secure authentication. i.e., if a biometric fingerprint were used to initiate the transaction, the fingerprint storage is encrypted and therefore unreadable if the mobile device is lost and no transactions can occur.

Figure 5A:
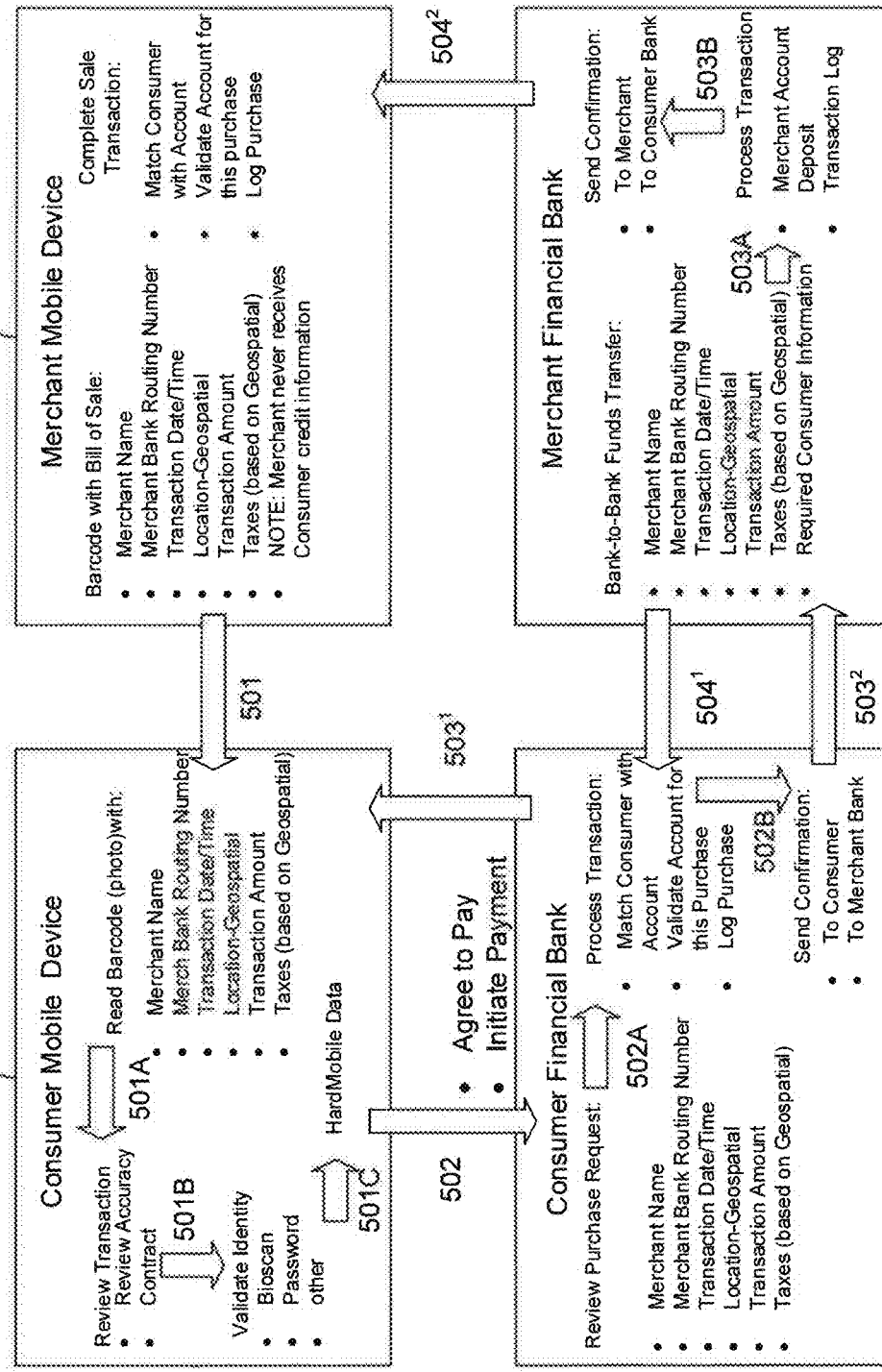
FIGS. 5A-5B show flow and block diagrams of a secure transfer of sensitive data for mobile devices, hereinafter referred to as "HardMobile," of an embodiment herein.

As illustrated in FIG. 5A, a merchant may have a HardMobile device which interacts with a mobile device used by the user. As a non-limiting example, the user's HardMobile device may be a part of a cell phone or smart phone. A communication then takes place between the user's HardMobile device and device at the user's financial institution. The device at the user's financial institution matches and validates the user with the user's HardMobile device. A merchant-to-merchant transaction then takes place between the user's financial institution and the merchant's financial institution, wherein this transaction may take place through devices at each financial institution. Merchant mobile device 38a communicates with consumer mobile device 38b, denoted by arrow 501. Barcode is read, then from arrow 501A, transaction reviewed. From arrow 50113, identity validated and from arrow 501C, communications follow along arrow 502 to consumer financial bank 540a. Purchase request reviewed, then from arrow 502A, transaction processed. From arrow 502B, confirmation is sent to consumer mobile device 38b and Merchant Financial Bank 540b along arrows $503^1$ and $503^2$, respectively. Bank-to-bank funds are transferred, then from arrow 503A, the transaction is processed. Then from arrow 503B, confirmation is sent to merchant mobile device 38a on arrow $504^2$ and consumer bank on arrow $504^1$, At the merchant mobile device 38a, sale is completed.

Figure 5B:
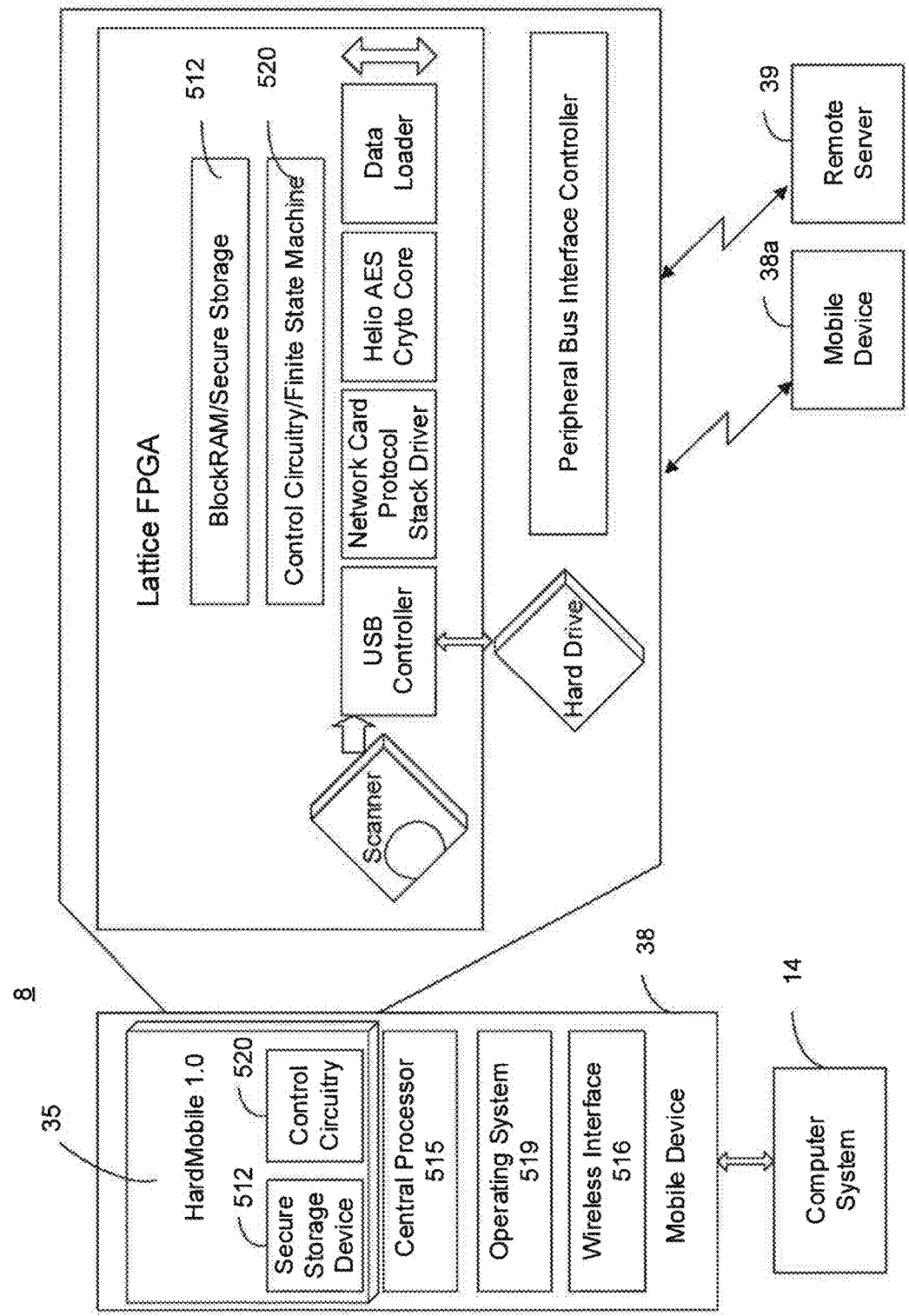

FIG. 5B illustrates a block diagram of hardware that may be within the HardMobile device 35. As illustrated a controller (control circuitry/finite state machine) 520, such as, but not limited to a programmable integrated circuit is provided along with a secure data storage device 512, A processor 515 and operating system 519 are also included. A wireless interface 516, such as, but not limited to, Bluetooth® or Wi-Fi, etc., is provided. In the exploded view, the HardMobile device 35 may be within a mobile phone on an internal FPGA card (such as, but not limited to, a Lattice® FPGA as used within certain smart phones). The HardMobile device 35 may be connected to a computer system 14, or a trusted input platform, for initial input. In a non-limiting example, the FPGA may control the wireless interface 516 (Wi-Fi or Bluetooth®) similar to how the Hard Wallet 10 controls the NIC 16.

Generally, this embodiment advantageously includes one or more of the following: remotely triggering of sensitive data transmission with an encrypted key, fully independent of the mobile device operating system 519 (This is a hardware architecture difference to mobile devices, and is NOT a mobile device application); direct hardware storage of unique authentication information (password, biometric, etc.); an ad hoc mechanism to temporarily pair mobile devices for secure point-of-sale directly to the consumer/vendor financial institution; creation of a hardware system that remotely triggers secure data transfer between multiple trusted local or distributed nodes (via modified mobile device architecture employing a hardware-based, encrypted authentication mechanism); a hardware user verification layer that uniquely authenticates each user; a trusted ad-hoc connection to a single or multiple wireless devices and servers allowing for secure point of sales transactions (i.e., the system is able to pair and synchronize transactions in a point of sales, including isolated secure storage or sensitive data which cannot be accessed through the OS, furthermore, the system does not allow any intermediate (middle men) to see sensitive data as well as not allow transmission to any unauthorized destinations).

Thus, a system 8 may comprise a secondary device (i.e., HardMobile 35) comprising a programmable hardware component (i.e., control circuitry 520) and an associated secure data storage device 512. The secondary device (i.e., HardMobile 35) may be connected to a mobile device 38. The mobile device 38 may be configured to operate via an operating system 519 with a central processor 515. The secondary device (i.e., HardMobile 35) may be adapted to receive input unilaterally from the mobile device 38, encrypt sensitive information of the input, store the input as source data on the secure data storage, and transfer the source data from the secure data storage to a wireless interface 516 that connects the mobile device 38 to another mobile device 38a or remote server 39. The transferring is implemented via the secondary device (i.e., HardMobile 35) while bypassing the central processor 515.

The system 8 may further be capable of employing DMA or bus mastering by the secondary device (i.e., HardMobile 35) for transferring the source data from the secure data storage device 512 to the wireless interface 516 to bypass the central processor 515 and pairing the wireless interface 516 of the mobile device 38 to another mobile device 38a or remote server 39. In another embodiment, the system 8 may further comprise a trusted application platform 50 capable of running on a computing device 14 connected to the mobile device 38 for receiving input of initial data into the secure data storage device 512, The trusted application platform 50 may be adapted to boot the computing device 14 independent of the operating system of the computing device 14, deactivate select operations of the computing device 14 for security, including executables and network connections, and transmit initial data from the computing device to the secure data storage device 512 in the connected mobile device 38 via an isolated one-way communications link to store the initial data as source data.

In another embodiment, the system 8 may further comprise a connected device for receiving input into the mobile device 38 for input of initial data into the secure data storage device 512 or for transaction initiation and authentication, wherein the connected device comprises one or more of an imaging input device, audio input device, a scanner, an external storage medium, a human interface device, or a connected computing device.

In an embodiment, the source data relates to business transactions between a vendor and a customer across an unsecured mobile or computer network and comprises customer account information for transacting with the vendor, routing information for communicating with the vendor, and profile information for the customer. In another embodiment, the secondary device 35 may comprise the programmable integrated circuit (i.e., control circuitry 520) and the secure data storage device 512. In another embodiment, the secure data storage device 512 may, comprise an internal storage medium of the secondary device or an external data storage device in communication with the secondary device. In another embodiment, the communications interface may comprise a wireless interface 516 in communication with a node on a mobile or computer network or another peripheral connected to the mobile device as a destination for the source data.

In another embodiment, the secondary device (i.e., HardMobile 35) may be adapted for receiving, encrypting, and storing unique authentication information into the secure data storage. In another embodiment, the secondary device (i.e., HardMobile 35) is adapted to authenticate and trigger the transfer of the source data from the secure data storage to the communications interface that connects the mobile device 38 to another mobile device 38a or remote server 39 independent of the operating system, central processor, or mobile applications running via the central processor 515 of the mobile device 38.

Figure 5C:
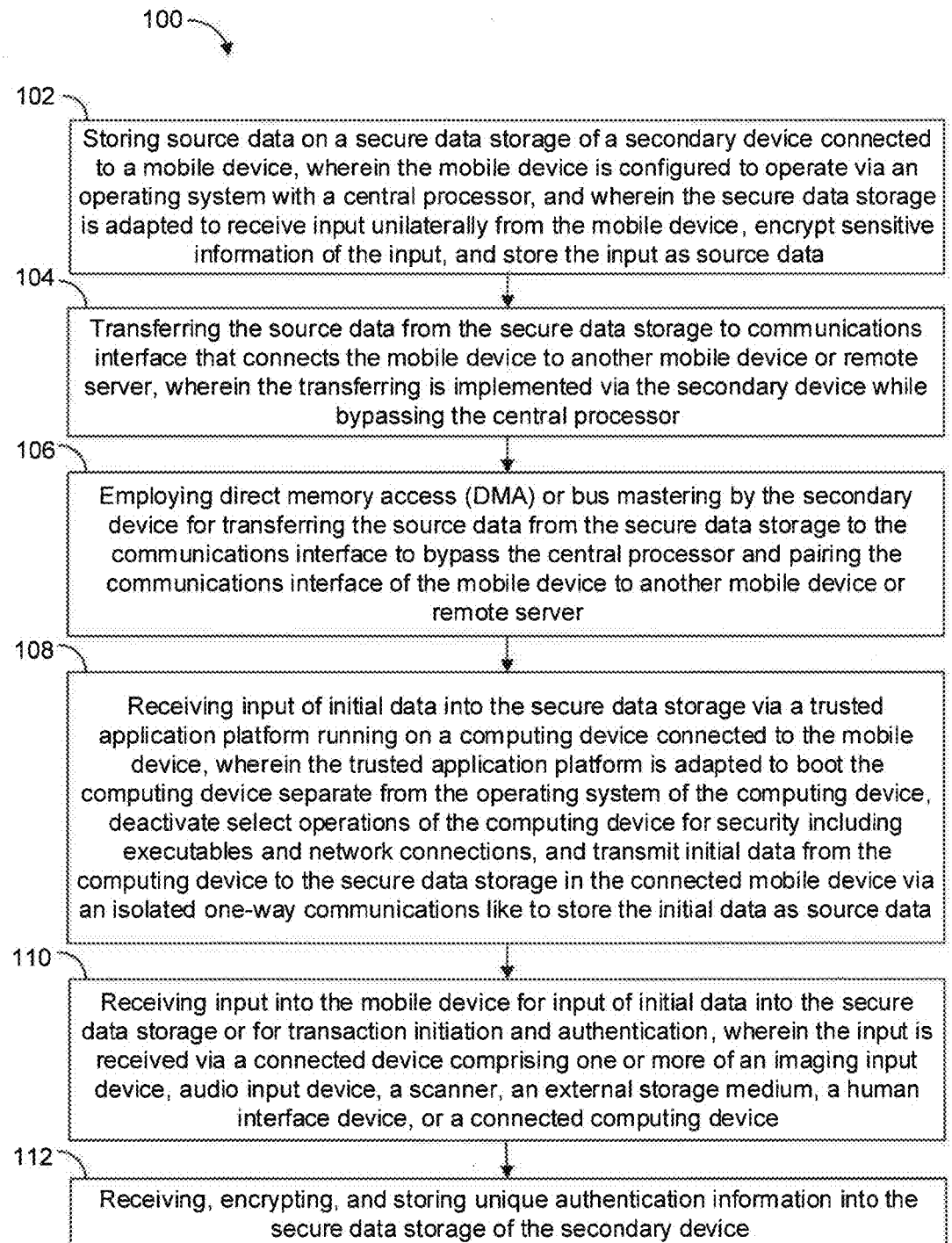
FIG. 5C shows a flowchart illustrating an embodiment of a HardMobile method.

FIG. 5C is a flowchart illustrating a method. The method 100 may be a computer-implemented method for storing and transmitting sensitive information from a mobile device 38 to another mobile device 38a or remote server 39, The method 100 comprises storing source data on a secure data storage of a secondary device (i.e., HardMobile 35) connected to a mobile device 38, at 102. The mobile device 38 is configured to operate via an operating system 519 with a central processor 515. The secure data storage is adapted to receive input unilaterally from the mobile device 38, encrypt sensitive information of the input, and store the input as source data. The method 100 may further comprise transferring the source data from the secure data storage to a communications interface that connects the mobile device 38 to another mobile device 38a or remote server 39, wherein the transferring is implemented via the secondary device (i.e., HardMobile 35) while bypassing the central processor 515, at 104.

The method 100 may further comprise employing DMA or bus mastering by the secondary device (i.e., HardMobile 35) for transferring the source data from the secure data storage to the communications interface to bypass the central processor 515, and pairing the communications interface of the mobile device 38 to another mobile device 38a or remote server 39, at 106. In another embodiment, the method 100 may further comprise receiving input of initial data into the secure data storage via a trusted application platform running on a computing device 14 connected to the mobile device 38, wherein the trusted application platform is adapted to boot the computing device 14 independent of the operating system of the computing device 14, deactivate select operations of the computing device 14 for security including executables and network connections, and transmit initial data from the computing device 14 to the secure data storage in the connected mobile device 38 via an isolated one-way communications link to store the initial data as source data, at 108. The method 100 may further comprise receiving input into the mobile device 38 for input of initial data into the secure data storage or for transaction initiation and authentication, wherein the input is received via a connected device comprising one or more of an imaging input device, audio input device, a scanner, an external storage medium, a human interface device, or a connected computing device, at 110.

With respect to the method 100, as disclosed above, the source data relates to business transactions between a vendor and a customer across an unsecured mobile or computer network and comprises customer account information for transacting with the vendor, routing information for communicating with the vendor, and profile information for the customer. In another embodiment, the secondary device may comprise a programmable integrated circuit and the secure data storage. The secure data storage may comprise an internal storage medium of the secondary device or an external data storage device in communication with the secondary device. The communications interface component may comprise a wireless interface in communication with a node on a mobile or computer network or another peripheral connected to the mobile device as a destination for the source data.

The method 100 may further comprise receiving, encrypting, and storing unique authentication information into the secure data storage of the secondary device, at 112. The step of receiving, encrypting, and storing may further comprise authenticating and triggering the transfer of the source data from the secure data storage to the communications interface that connects the mobile device to another mobile device or remote server by the secondary device independent of the operating system, central processor, or mobile applications running via the central processor of the mobile device.

Though the steps in FIG. 5C are illustrating being in sequence, they may be performed in any different order. Furthermore, the addition of dependent steps 106, 108, 110 and 112 may be individually performed independent of the other dependent steps.

Figure 6:
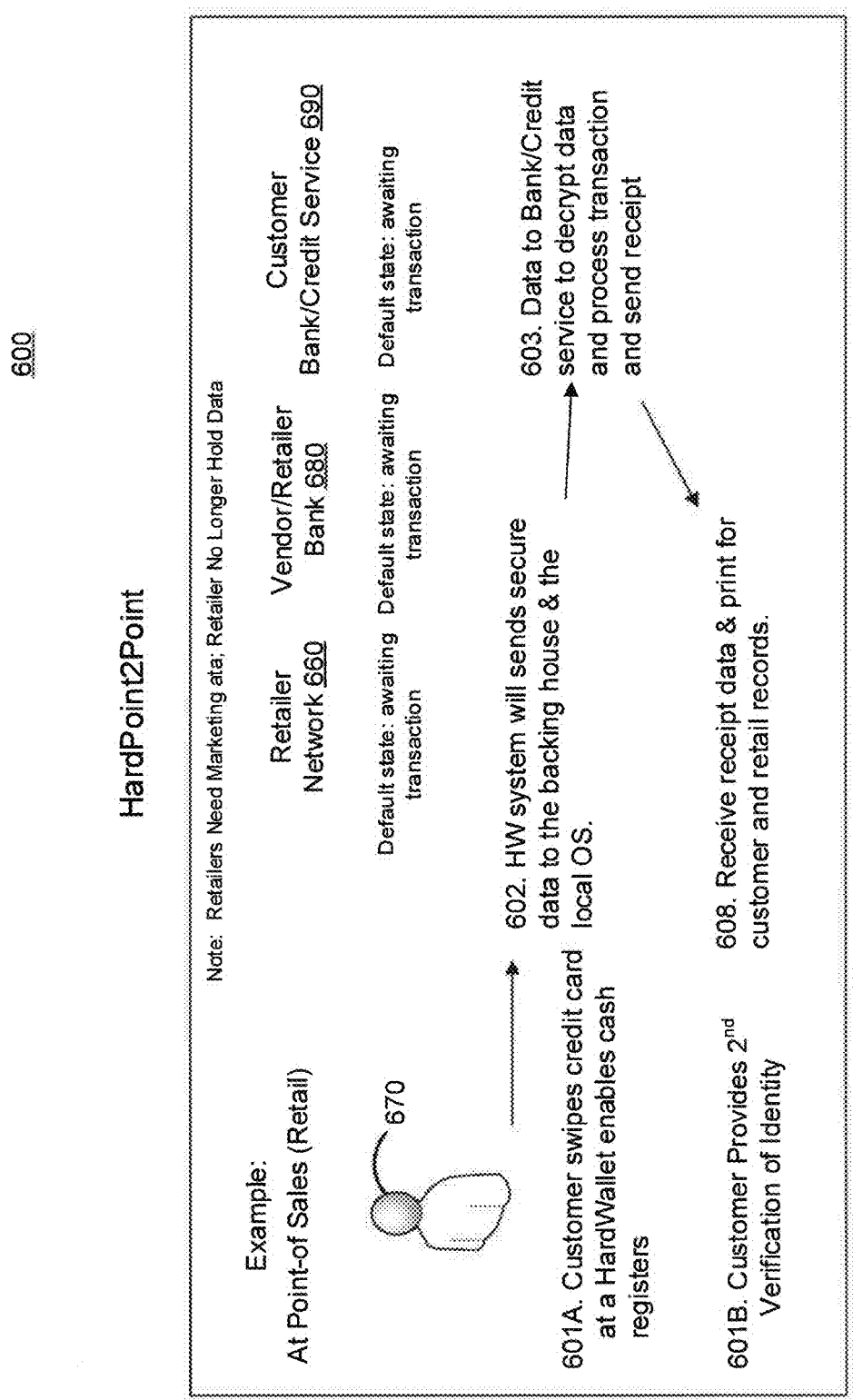
FIG. 6 shows a flow diagram of a hardware system for secure and selective transmission between system and banking institution, hereinafter referred to as "HardPoint2Point," of an embodiment herein.

In another embodiment, shown in FIG. 6, a hardware system 600 for secure and selective transmission between system and banking institution is shown, hereinafter referred to as "HardPoint2Point." The system allows for purchases to be made through electronic means directly from a customer 670 to the banking institution to complete a purchase. The customer 670 swipes credit card at a HardWallet and enables cash registers at 601A. The customer 670 may provide a second verification of identity at 601B, such as, but not limited to, a bioscan, personal identification number (PIN), etc. The HardWallet will send secure data to the backing house and the local OS at 602. The system carries a private key that is used to form a virtual private connection between customer (leveraging vendor (retailer) network 660 for marketing purposes) and bank (i.e., Customer Bank/Credit Service 690). Key management system is solely based at the banking institution. The system synchronizes a purchase transaction and auditable data (such as receipts for accountability) provided by the banking institution to the retail store at 603. At 608, the receipt data is received and printed for customer 670 and retail records. The system also has a user validation layer for authentication of user. The system also provides for configuration by multiple banking institutions through a trusted platform. This system allows for multiple accounts to be profiled on a single device. The system does not allow the OS access to the sensitive data after programming. The data on the Hard Wallet 10 may already be encrypted. Thus, there is no need to verify encrypted data whereas the "Bank/Credit Service" 690 is the only entity with decryption keys.

Figure 7:
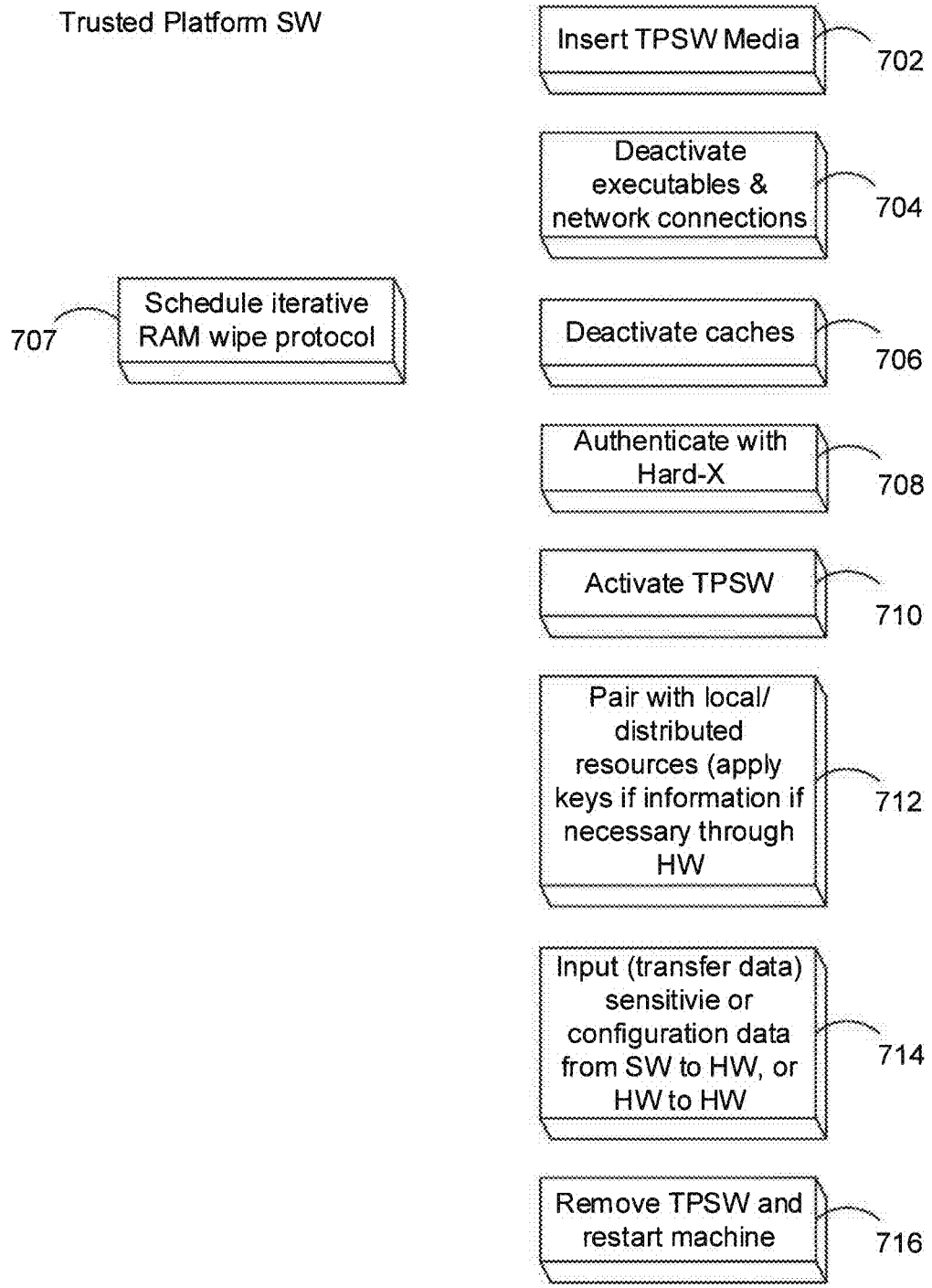
FIG. 7 shows a trusted data input platform of an embodiment herein.
Figure 8A:
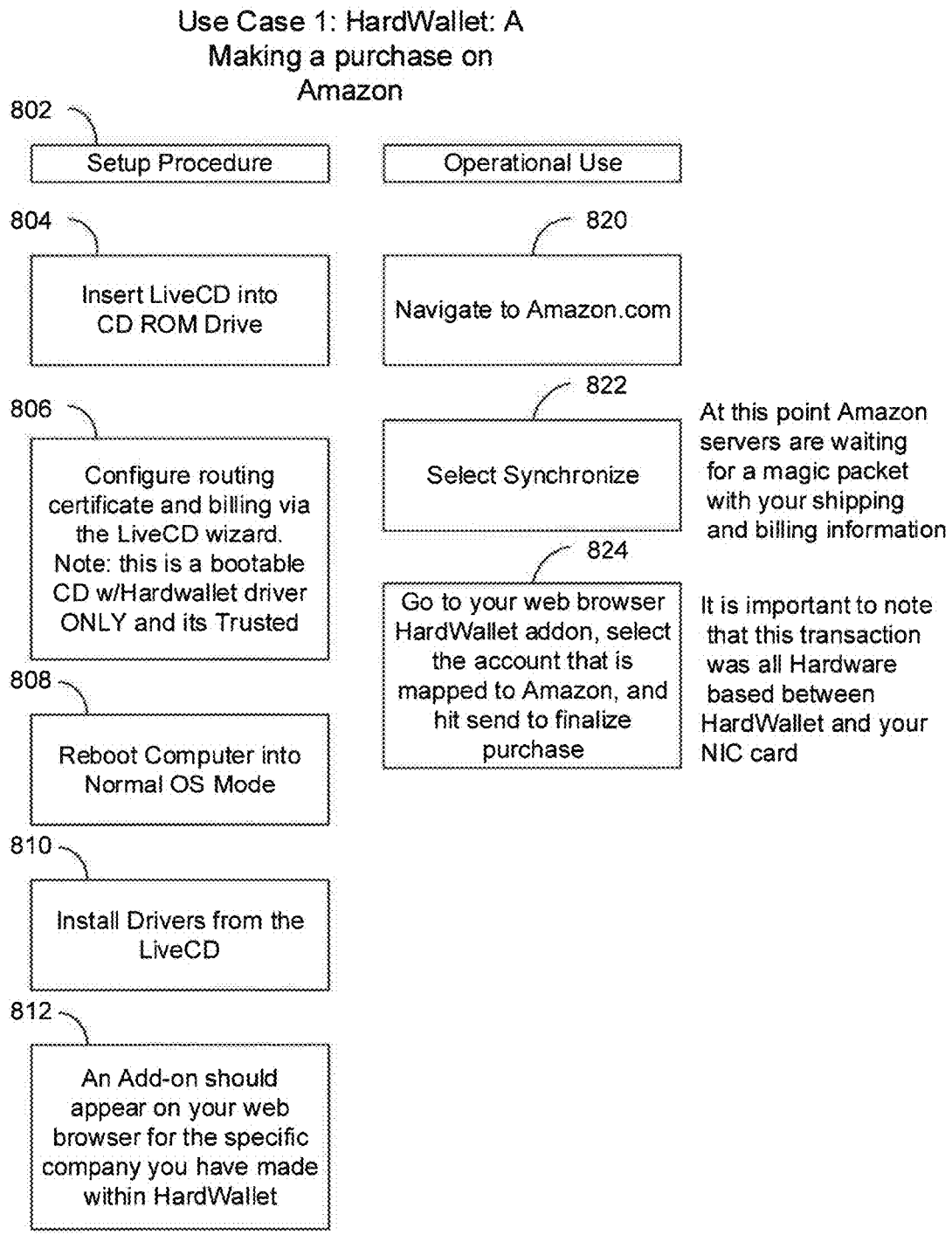
FIGS. 8A-8D illustrate a number of use cases for a number of embodiments.
Figure 8B:
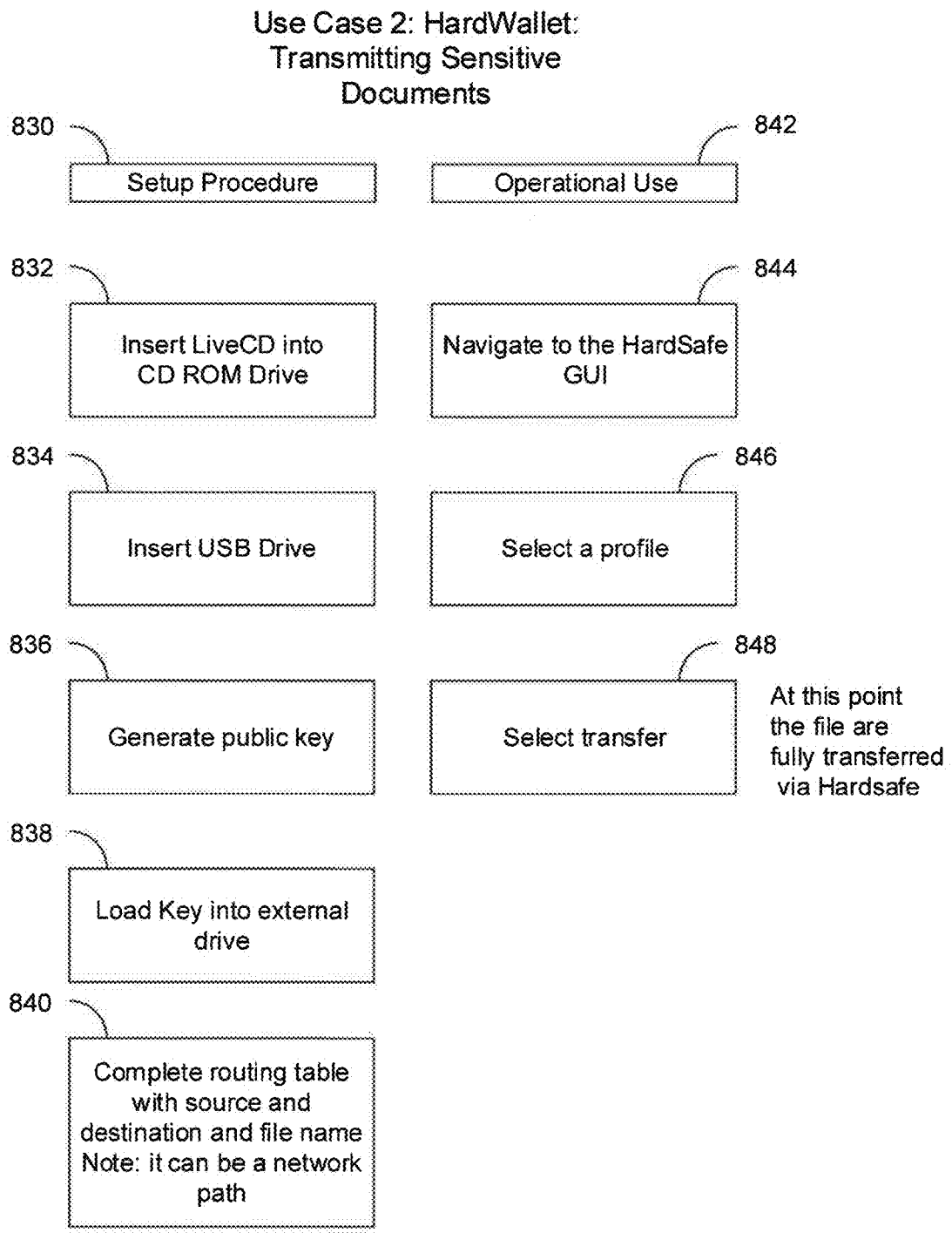
Figure 8C:
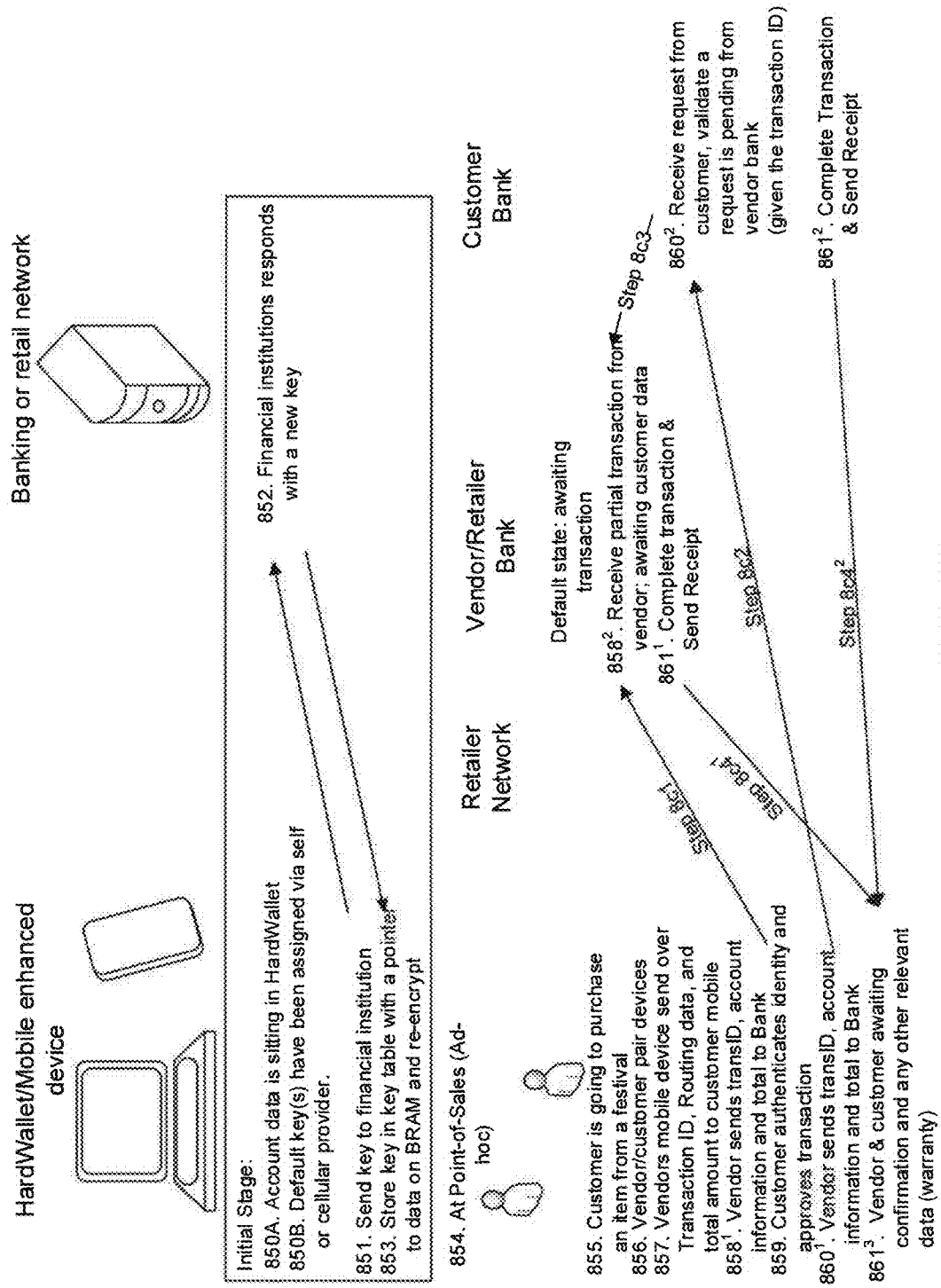
Figure 8D:
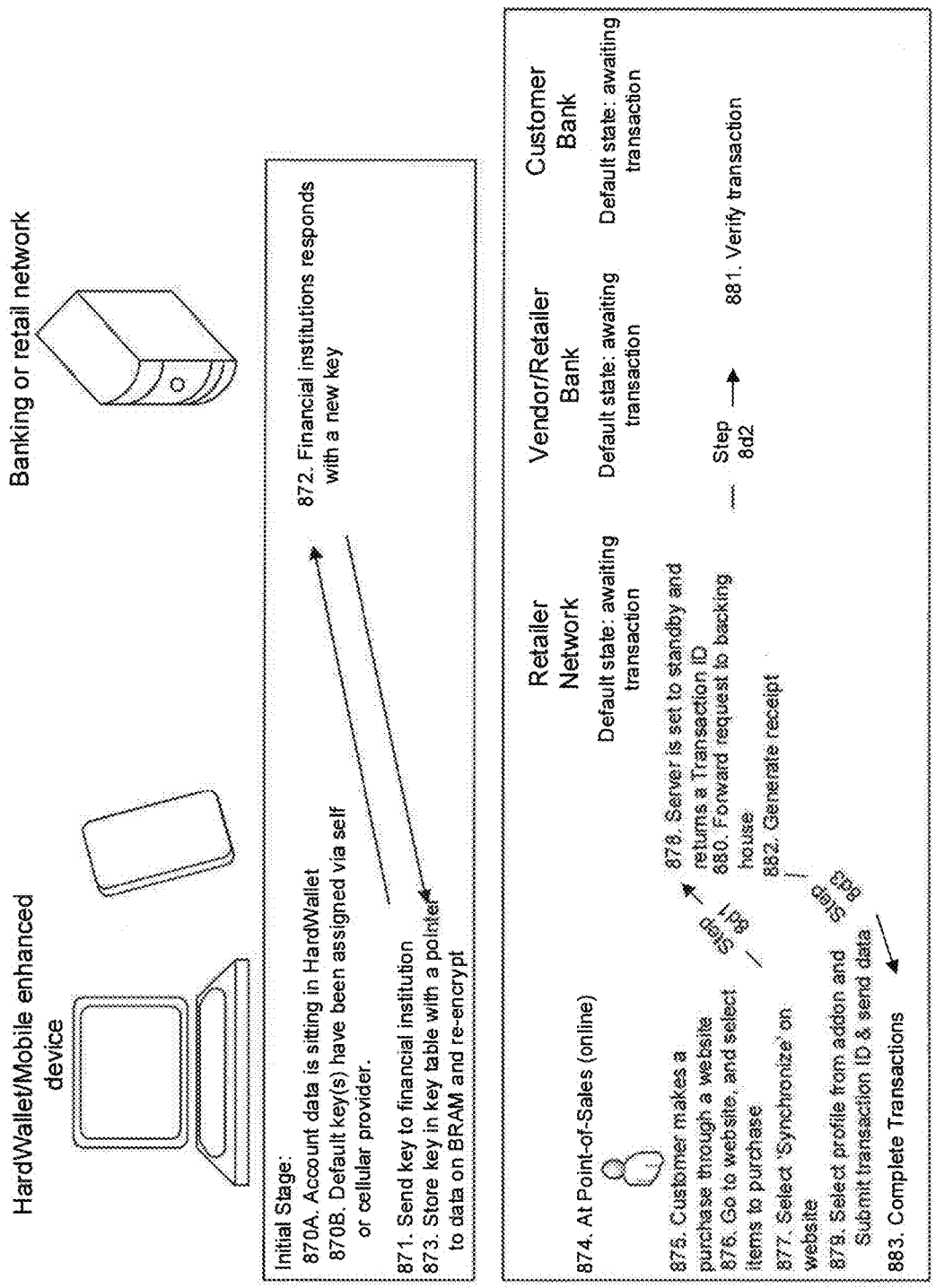

FIG. 7 shows a trusted data input platform (trusted platform software (TPSW)) adapted to be used with the embodiments herein that require input of data. This software (and/or hardware) system allows for a pre-boot environment where data can be inputted into a standalone trusted transmission network. The system is uniquely paired with hardware to be single source of inputting data into the hardware for assured delivery. The system is independent of the operating system. This system only allows for unidirectional inputting of data and does not support query or extracting data from the hardware. System allows for the loading of data in an all or nothing policy and cannot be partially reprogrammed. The system allows for the use of a keyboard and monitor to input the data and observe the data.

In operation, the TPSW may be implemented as follows: A TPSW media is provided and inserted (at 702) into the computing device. The TPSW is adapted to deactivate executables and network connections (at 704) and deactivate caches (at 706). It may also schedule an iterative RAM wipe protocol (at 707). Appropriate authentication with the current HardSuite (also referred to as Hard-X) is completed (at 708). Then the TPSW is activated (at 710) to pair with local/distributed resources where keys are generated and applied in HW (at 712) if data is needed by the HardSuite (e.g., Hard Wallet). Data is then transferred by inputting the sensitive data or a configuration of data is accomplished from software to hardware or hardware to hardware (at 714). Then the TPSW media may be removed and the computing device re-started (at 716) using its normal operating system.

The embodiments described herein provide for a number of commercial applications and can be illustrated via a number of use case scenarios as shown in FIGS. 8A-8D. For example, embodiments herein provide the capability for banking instituting to reduce risk of credit/debit card and other sensitive identity data from their customers. The process includes being able to support secure transmission from the customer directly to the banking institution at the moment of point of sales. The process will allow a customer to authorize a transaction between a banking institution and a retail store. This process will listen to a request for a transfer to a retail store on a per customer bases, and will provide some form of audit (such as a receipt) to the retail store. The process will protect the identity and sensitive data between the customer and the banking institution. The process does not allow for middle man access to marketing information (address, time, items purchased) unless otherwise approved by a consumer institution.

For Ad-hoc transactions between two individuals (not retail), the process will support partial transactions, such that a request constituting a monetary value, account information, and a source and destination will come from separate and trusted streams (TCP/IP). The process will allow a request for transaction between a sender and/or receiver at discrete times and vice-verse. The process will allow for a whole transaction to be gathered and executed real-time on the financial institution's system.

With respect to retail stores, this process allows for retail stores to asynchronously compete transactions through a hardware process instead of a software process for greater security. The process will allow customers to send sensitive data separately from the mean of selecting the items of purchase. The process will allow hardware/software (HW/SW) at the retailer end to await final shipping and billing information through a pre-configured trusted means isolated from the operating system. This process also supports the means of receiving confirmation from unique point of sales purchases from the customer to the banking institution for auditing. The process will allow customers to use the retailer's network to conduct a secure transmission to the banking institution.

Specific use case examples are described below (See FIGS. 8A-8D) to illustrate the embodiments herein that transmit sensitive information to different nodes in a network (i.e., personal desktop or mobile device to online remote servers) in a secure manner where the OS is not involved in the processing for transmission of the sensitive data.

Use case 1 (FIG. 8A) describes an example of making a purchase from an online retailer, such as from Amazon.com, Inc. using HardWallet 10. Initially, a user may configure the user's HardWallet 10 using a Setup Procedure (at 802). This may be accomplished using a specially adapted bootable CD (at 804) or bootable USB drive (such as a LiveCD—a complete bootable computer installation including an operating system (OS) which runs in a computer's memory, rather than loading from a hard disk drive) with the HardWallet driver. The user may boot the user's computer and a Basic Input/Output System (BIOS) may appear with an option to load the operating system normally, or configure HardWallet 10. The user can then configure his HardWallet 10 with account information specifically for the vendor/online retailer, such as Amazon.com, including Internet Protocol (IP) Address, billing and shipping information, wherein a profile for that vendor is created. A wizard interface may be provided to configure the routing, certificates, and billing (at 806). The secure HardWallet OS disables network adapters and only enables lateral communications with HardWallet 10. Appropriate drivers are installed (at 810) from the HardWallet bootable CD to the computer. These drivers provide for an add-on to appear in the web browser for the online retailer for which the HardWallet 10 was set up to operate (at 812).

In operation, the computer is booted into its normal OS mode (at 808). The user can begin his secure online shopping experience. The user opens a web browser on his client machine and navigates to an online retailer, such as Amazon.com (at 820). The users shops and adds items to his online shopping cart (e.g., three books). The user then synchronizes with the vendors servers with his HardWallet 10 by selecting a "Sync Purchase" button (at 822) on the online retailer's site (this prepares the online retailer's servers to receive the final purchasing data, such as credit/debit card, shipping, etc.) After selecting "Sync Purchase" from the site, the online retailer's servers are waiting for billing and shipping information to finalize purchase. To accomplish this, a software driver is configured to instruct HardWallet 10 to bus master to the NIC 16 where then it creates a secure packet of final purchasing data (i.e., sensitive data) to the NIC 16 (without OS intervention) with the address to the online retailer's billing servers (routing information) to complete the transaction. The HardWallet browser add-on is used to select the account that is mapped to this particular retailer and send the final purchasing data (at 824). This transaction remains hardware based between the HardWallet 10 and the NIC 16. Optionally an encryption scheme may be included. A similar case for mobile devices works essentially the same as Use case 1 described above but is applied via a wireless physical layer (PHY).

The HardWallet 10 can also be used to send sensitive documents where data from an external machine, scanner, or fax is loaded directly into HardWallet 10 without the OS knowing the contents of that transaction. These devices are adapted to have the capability of sending and accepting data to/from HardWallet 10, so, the same principle applies to documents being transmitted without OS knowledge. The principle is that HardWallet 10 can bus master data from a scanner, fax, jump drive or external machine, without OS intervention. Packets are generated by the NIC 16 and the Payload is housed in HardWallet 10, and the bus mastering mechanism connects those two devices independently of the CPU (running the OS).

Use case 2 (FIG. 8B) describes an example of using the HardSafe to send sensitive documents. Initially, a user must configure his HardSafe using a Setup Procedure (similar to that of HardWallet) (at 830). This may be accomplished using a specially adapted bootable CD (at 832) or bootable USB drive or partition having the HardWallet OS. After setup, the user inserts the storage device having the secure source data (such as a USB drive) (at 834). A public key is generated (at 836) and loaded on to the destination external drive (at 838). The routing table information is completed with source and destination and file name (e.g., a network path) (at 840). The computer may then be re-booted under its normal OS and the HardSafe drivers are installed. In operation and use (at 842), a HardSafe GUI (graphical user interface) (at 844) may be provided where the user selects a profile (at 846) and then selects to transfer (at 848) the data between the source and destination. The HardSafe software driver is configured to instruct HardSafe to transfer the data. The data copying and routing information will be handled all in hardware with no main memory interference or CPU intervention.

Figure 9:
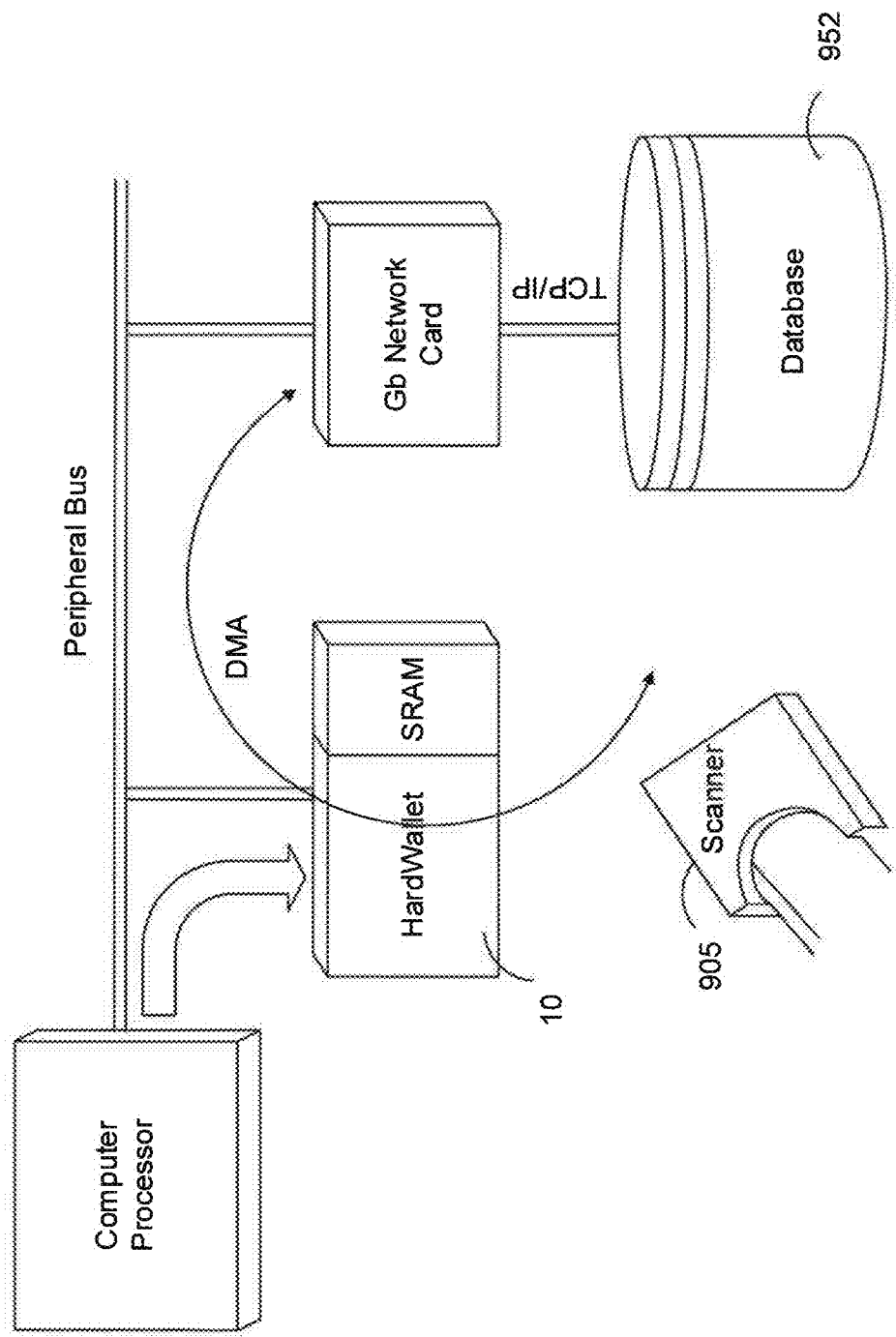
FIG. 9 shows a block diagram of HardWallet in use for a retail store.

Use case 3 (FIG. 8C and FIG. 9) describes an example of using the HardWallet 10 to make a purchase in a retail brick-and-mortar store (not online) 854 using a credit/debit card. In this case, the vendor implements the set up procedure using a bootable CD/LiveCD with HardWallet OS and has a peripheral device for receiving credit/debit card information (e.g., credit/debit card scanner 905). Setup will configure routing information for audit data and destination address for credit. Thereafter, the computer is re-booted into normal OS mode. At 850A, account data is sitting in HardWallet 10. At 850B, default key(s) have been assigned via self or cellular provider. At 851, key is sent to financial institution. At 852, financial institution responds with a new key. At 853, key is stored in key table with a pointer to data in BRAM and re-encrypted.

In use, a customer swipes the user's credit/debit card with the peripheral device for receiving credit/debit card information (e.g., credit/debit card seamier). A pseudo key is generated and sent to the local database 952. The encrypted credit/debit card information is sent to the card processor (e.g., MasterCard, Visa, Banks) for processing. In this manner, customer information does not need to be saved at the retailer's site. There is a pseudo key that is generated that can lead to an audit trail, but credit data is sent directly to the card processor. At 855, the customer is going to purchase an item from a festival. At 856, vendor/customer pair devices. At 857, vendor's mobile device send over Transaction ID, Routing data, and total amount to customer mobile. At $858^1$, vendor sends Transaction ID, account information and total to Vendor/Retail Bank at arrow step 8$c$1. At $858^2$, the Vendor/Retail Bank receives partial transaction from vendor and awaits customer data. At 859, customer authenticates identity and approves transaction. At $860^1$, vendor sends Transaction ID, account information and total to Customer Bank at arrow step 8$c$2. At $860^2$, Customer Bank receives request from customer, validates a request is pending from Vendor/Retail Bank (given the Transaction 11)). At $861^1$, the Customer Bank completes the transaction and send a receipt at step 8$c$4$^1$. At $861^2$, Vendor/Retailer Bank completes transaction and send receipt at step 8$c$4$^2$. At $861^3$, the vendor and customer await confirmation and any other relevant data (warranty).

Use case 4 (FIG. 8D) describes an example of using the HardMobile to make a purchase using a mobile device, such as a mobile phone (e.g., Samsung Galaxy mobile phone). This example uses a setup procedure similar in some respects to HardWallet 10. The set up procedure uses a bootable CD/LiveCD with HardWallet OS. The mobile device (e.g., mobile phone) is connected to the computer. HardWallet 10 is uploaded into FGPA and configured with routing data based on the retailer's information, shipping and billing data. The mobile device may thereafter be disconnected. A HardWallet Mobile App is then installed on the mobile device.

In use, the user browses to the online retailer's site with his mobile device, shops and adds items to his online shopping cart. The user then synchronizes the vendor with his HardWallet to prepare the online retailer's servers to receive the final purchasing data, such as credit/debit card, shipping, etc. The online retailer's servers wait for billing and shipping information to come through. The HardWallet Mobile App is then used to select the account that is mapped to this particular retailer and send the final purchasing data. This transaction remains hardware based between Hard Wallet 10 and the NIC 16. At 870A, account data is sitting in HardWallet 10. At 870B, default key(s) have been assigned via self or cellular provider. At 871, key is sent to financial institution. At 872, financial institution responds with a new key. At 873, key is stored in key table with a pointer to data in BRAM and re-encrypted. At 875, customer makes a purchase through a website. At 876, the customer goes to website and selects items to purchase. At 877, "synchronize" is selected on website. From step 8$d$1, at 878, server is set to standby and returns a Transaction ID. At 879, customer selects profile from add-on, submits transaction ID and sends data. At 880, Retailer Network forwards request to backing house. From step 8$d$2, at 881, transaction is verified. At 882, receipt is generated. From step 8$d$3, at 883, transactions are completed.

A number of advantages are seen herein, including no Software or Firmware, Hardware accelerated Advanced Encryption Standard (AES) 128/256, Transmission impervious to SW attacks, All or nothing configuration policy, Partial Read Only memory access from OS perspective, HW Only transfer mechanism (no SW monitoring or intervention), Data is never seen by the OS or Main Memory, Enterprise use: account information is not stored on retailer networks, External HD encryption with scrambled keys, Multiple Industries: Point of Sales, home use, mobile use, and industrial use, Time delay/Priority routing from HardSafe to Host, Supports multiple types of deployment plans to save on throughput, Swarm routing/updating of data within HardSafe, Synchronization Monitoring of data across multiple hardware using hashing, Support hardware distribution of public key for trusted communications, Magic Packet transaction initiation to HardSafe, Data staging and secure routing, Hardware accelerated data compression, Auto deletion of keys when updating HardSafe keys through a trusted or untrusted for FIPS L4 compliance.

Advantageously, the HardSuite described herein ensures that there is no software intrusion that can occur to infiltrate or corrupt sensitive information after it is input into the HardSuite. Data is input into the HardSuite through a trusted platform (TPSW), in many examples, with a LiveCD that is paired with the HardSuite hardware. Public and private keys can only be configured through a trusted platform such as a live CD paired to the hardware or a trusted pre-boot environment. If attempts are made to alter the existing key through any means (whether trusted or not) the current key can be overwritten and data on the hard drive will be unable to be decrypted. Therefore, HardSafe will essentially format the HD and start fresh with the new key. Also, through synchronization mechanism, when the HardSafe comes back online, the Swarm routing table will ensure that the data in that specific HardSafe is in sync with all other HardSafes, hence, getting updated data from its neighboring HardSafes. Any authorized or unauthorized access to any HardSafe will cause the key to essentially auto delete and data will be irretrievable, data is re-updated based on the Swarm updating via the Swarm routing table from other trusted HardSafe. The routing tables are trusted IP addresses that are known to be good. If someone were to attempts to physically compromise a HardSafe, it will conduct a series of checks for physical awareness, such as IP address, GPS location, etc. . . . . If HardSafe deems it's in a location it shouldn't be, it will execute a protocol to flush unique and delete key data.

Moreover, information (data, keys and routing data) can easily be put in the HardSuite by either a bootable jump drive, trusted partition, or a LiveCD. Through the jump drive, LiveCD or trusted partition, the only data that can be pulled out is partial routing and timing, and priority data. One cannot retrieve keys, or sensitive data after they have been inputted. Data is transmitted to other HardSuites, via the hardware mechanism through an AES (or other encryption standard) encrypted TCP/IP link. The network interface device described in US 2012/0266230 A1 can be used as the trusted partition, assuring that the entry point into HardSafe is virus and malware free.

The HardSuite described herein protects against Keylogging, RAM scrapping, cold booting, malware, and physical intrusion. HardWallet is used to store small data structures and routing information such as billing and shipping data through a LiveCD or trusted partition. After being input into HardWallet, the data is no longer accessible through the OS; only profile header data is accessible. Then purchases can be made without the OS awareness of the underlying data. Since the data does not exist in RAM during normal operating procedure, or during transmission, there is no need to worry about ram scrapping or cold booting scenarios. Each stream in the computer is either encrypted or the data in the stream is encrypted, therefore if you even attempt to probe the lines with sophisticated equipment, data is not accessible without the key.

An exemplary system for implementing the invention includes a computing device or a network of computing devices with appropriate hardware/software adapted to implement the HardSuite sensitive data storing and transmitting system. In a basic configuration, computing device may include any type of stationary computing device or a mobile computing device. Computing device typically includes at least one processing unit and system memory. Depending on the exact configuration and type of computing device, system memory may be volatile (such as RAM), non-volatile (such as read only memory (ROM), flash memory, and the like) or some combination of the two. System memory typically includes operating system, one or more applications, and may include program data. Computing device may also have additional features or functionality. For example, computing device may also include additional data storage devices (removable and/or non-removable) such as, for example, magnetic disks, optical disks, or tape. Computer storage media may include volatile and non-volatile, non-transitory, removable and non-removable media implemented in any method or technology for storage of data, such as computer readable instructions, data structures, program modules or other data. System memory, removable storage and non-removable storage are all examples of computer storage media. Computer storage media includes, but is not limited to, RAM, ROM, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device. Any such computer storage media may be part of device. Computing device may also have input device(s) such as a keyboard, mouse, pen, voice input device, touch input device, etc. Output device(s) such as a display, speakers, printer, etc. may also be included. Computing device also contains communication connection(s) that allow the device to communicate with other computing devices, such as over a network or a wireless network. By way of example, and not limitation, communication connection(s) may include wired media such as a wired network or direct-wired connection, and wireless media such as acoustic, radio frequency (RE), infrared and other wireless media.

Computer program code for carrying out operations of the invention described above may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the present invention is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD). The present invention can be configured for use in a computer or a data processing apparatus which includes a memory, such as a central processing unit (CPU), a RAM and a ROM as well as a storage medium such as a hard disc.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps of the present invention creating a new machine. The general purpose computer becomes a special purpose computer once it is programmed to perform particular functions pursuant to instructions from program software of the present invention. The instructions of the software program that carry out the algorithm/steps electrically change the general purpose computer by creating electrical paths within the device. These electrical paths create a special purpose machine for carrying out the particular algorithm/steps.

Figure 10A:
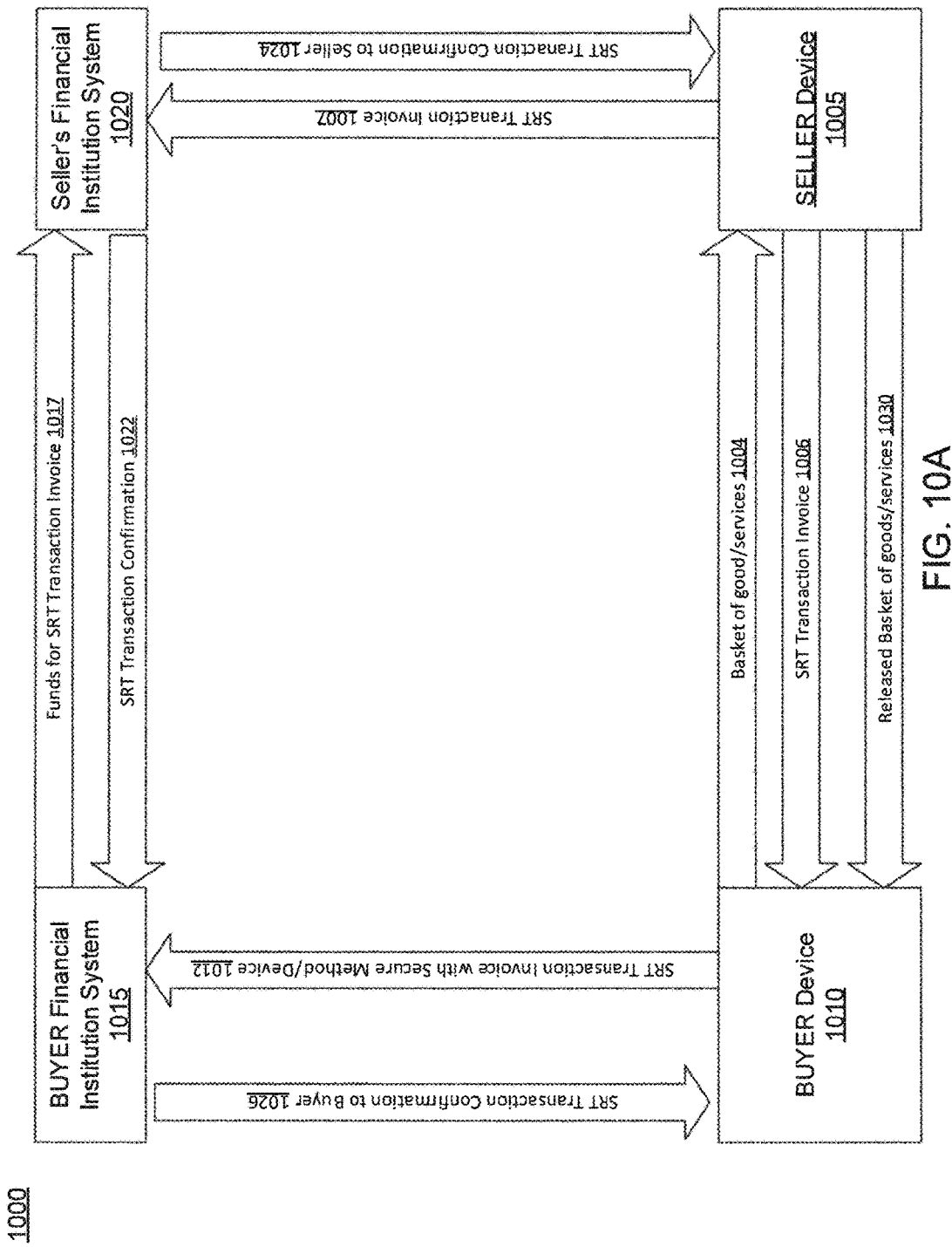
FIG. 10 shows a block diagram of a communication handshaking protocol of a secure retail transaction (SRT) for effectuating a secure payment method over a network.
FIG. 10B shows a block diagram of a Buyer's Financial Institution System.
FIG. 10C shows a block diagram of a Seller's Financial institution System.

FIG. 10A shows a block diagram of a communication handshaking protocol of a secure retail transaction (SRT) for effectuating a secure payment method over a network such as the Internet.

In an embodiment, prior to conducting secure retail transaction (SRT) process, at least one Buyer SRT account for the Buyer is set up with at least one financial institution (FI) (herein after sometimes referred to as "Buyer FI system" 1015). In an embodiment, the Buyer sets up a SRT compatible buyer device 1010. The SRT buyer device may include HardSafe, HardWallet, etc., previously described.

In an embodiment, the Buyer may have a Buyer SRT compatible device or the Buyer's Device 1010 is altered to be compatible with a SRT compatible device. Additionally, at least one Seller SRT account for the Seller is set up with at least one financial institution (FI) (herein after sometimes referred to as "Seller FI system" 1020). In an embodiment, the FI may be a Federal Deposit Insurance Corporation (FDIC) that offers SRT transactions.

In an embodiment, when the Seller sets up the at least one SRT Seller account with at least one Seller FI system. 1020, a point-of-sale (POS) system 1100 (FIG. 11) is installed if not already existing. The Seller Device 1005 may also include a cash register or some type of device capable of generating a transaction invoice with a transaction total. The POS system 1100 may be hardware, software or firmware. When conducting on-line purchases, the POS system 1100 may be web-browser enabled. When conducting brick and mortar purchases, the POS system 1100 may include a combination of hardware and software to carry the functions described herein below.

Returning now to FIG. 10A, the communication handshaking protocol includes sending a selection of goods and services to the Seller or Seller Device 1005 at 1004. The selection of goods and services may take place online during an online communication session. In a brick and mortar shopping experience, the purchases may be scanned in a bar code reader autonomously with autonomous checkout or manually.

At 1006, the handshake protocol may include communicating an SRT transaction invoice to the Buyer device 1010 by the Seller device 1005. The Seller device 1005 may also communicate the SRT transaction invoice to the Seller's FI system 1020 at 1007.

At 1012, the Buyer Device 1010 may communicate a SRT transaction invoice secure communication to the Buyer FI system 1015. The Buyer FI system 1015 may communicate the funds for the SRT transaction invoice at 1017. At 1022, the Seller's FI system 1020 may communicate an SRT transaction confirmation or status to the Buyer FI system 1015 and at 1024, the Seller device 1005 receives a SRT transaction confirmation.

At 1026, the Buyer FI system 1015 may communicate a SRI transaction confirmation to the Buyer Device 1010. Additionally, the Seller device 1015 may communicate a communication representation of a release of goods/services at 1030. Alternately, the goods and services may be hand carried or services performed. Nonetheless, there may be a need for a communication representing a release or completion.

Figure 10B:
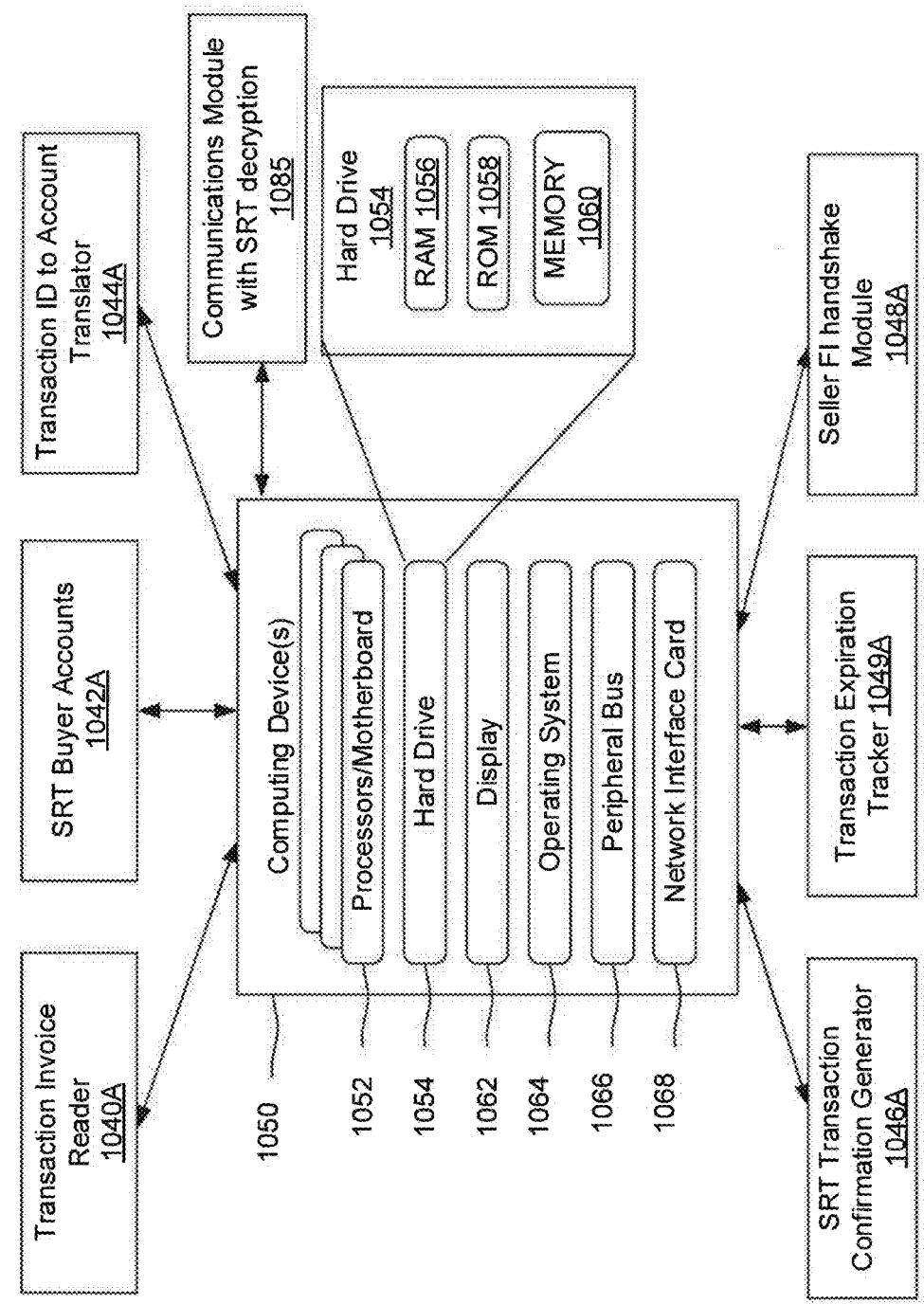
Figure 16:
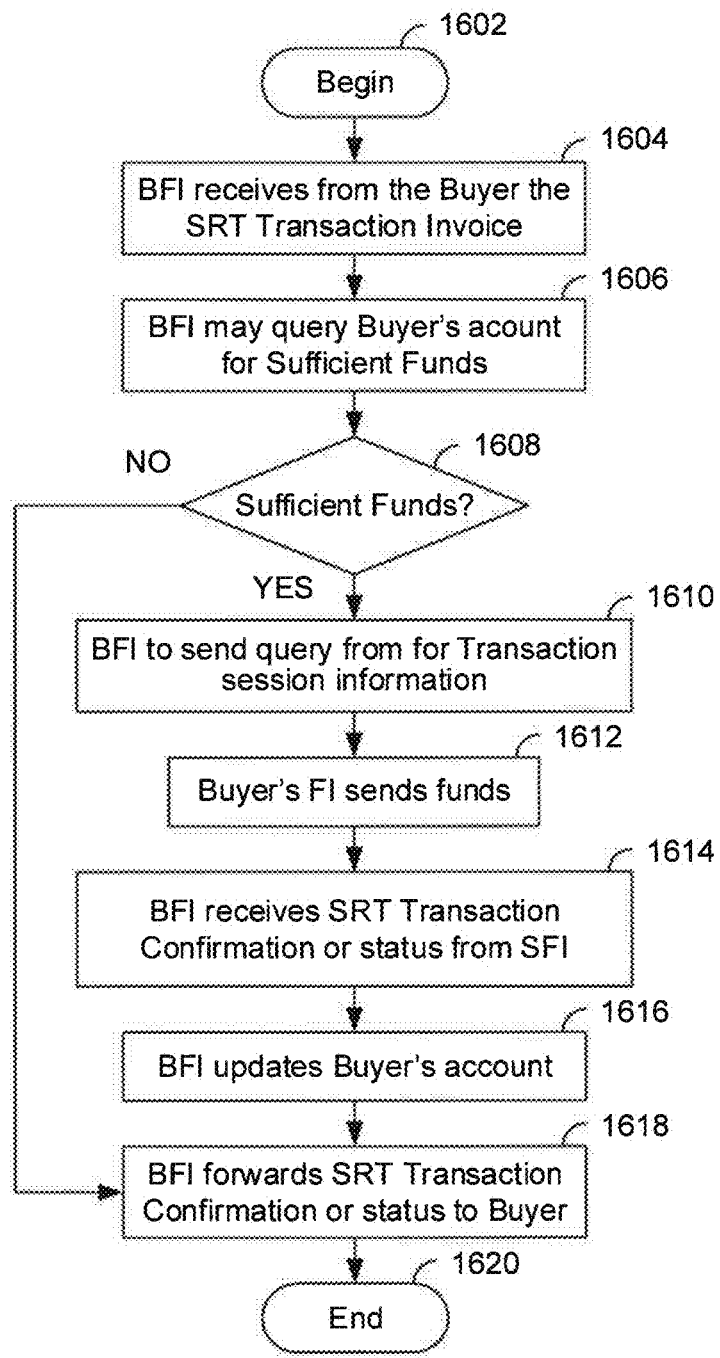
FIG. 16 shows a Buyer's financial institution (FI) SRI' process.

FIG. 10B shows a block diagram of a Buyer's Financial Institution (BFI) System 1015, The BFI system 1015 is shown including electronics for carryout the processes described herein by the BFI system 1015. The BFI system 1015, may comprise in a basic configuration, computing device 1050. The computing device 1050 may include a mobile or wireless computing device. Computing device 1050 may include multiple computing devices 1050 as financial institutions may be located at various sites each of which may communicate with each other. Each location may have numerous computing devices 1050 networked together such as in an intranet or local area network (LAN). Nonetheless, each computing include one or more processors 1052 and system memory in hard drive 1054. Depending on the exact configuration and type of computing device, system memory may be volatile (such as RAM 1056), non-volatile (such as read only memory (ROM 1058), flash memory 1060, and the like) or some combination of the two. System memory may store operating system 1064, one or more applications, and may include program data for performing processes or methods described in at least FIG. 16. The computing device 1050 and other electronics of the BFI system 1015 may carry out one or more blocks of process 1200 and 1600. Computing device 1050 may also have additional features or functionality. For example, computing device 1050 may also include additional data storage devices (removable and/or non-removable) such as, for example, magnetic disks, optical disks, or tape. Computer storage media may include volatile and non-volatile, non-transitory, removable and non-removable media implemented in any method or technology for storage of data, such as computer readable instructions, data structures, program modules or other data. System memory, removable storage and non-removable storage are all examples of computer storage media. Computer storage media includes, but is not limited to, RAM, ROM, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device. Any such computer storage media may be part of device.

Each computing device 1050 may also include or have interfaces for input device(s) (not shown) such as a keyboard, mouse, pen, voice input device, touch input device, etc. The computing device 1050 may include or have interfaces for connection to output device(s) such as a display 1062, speakers, etc. Each computing device 1050 may include a peripheral bus 1066 for connecting to peripherals. Each computing device 1050 may contain communication connection(s) that allow the device to communicate with other computing devices, such as over a network or a wireless network. By way of example, and not limitation, communication connection(s) may include wired media such as a wired network or direct-wired connection, and wireless media such as acoustic, radio frequency (RE), infrared and other wireless media. Each computing device 1050 may include a network interface card 1068 to connect (wired or wireless) to a network or in an intranet.

The embodiments may be configured for use in a computer or a data processing apparatus which includes a memory, such as a central processing unit (CPU), a RAM and a ROM as well as a storage medium such as a hard disc.

The BFI system 1015 may further include one or more of a transaction invoice reader 1040A, SRT buyer accounts 1042A, a transaction ID to account translator 1044A, a communications module 1085 for communicating SRT secure communications, an SRT transaction confirmation generator 1046A, a transaction expiration tracker 1049A and a Seller FI handshake module 1048A. Each of the transaction invoice reader 1040A, SRT buyer accounts 1042A, the transaction ID to account translator 1044A, the communications module 1085 for communicating SRT secure communications, the SRT transaction confirmation generator 1046A, the transaction expiration tracker 1049A and the Seller FI handshake module 1048A may each require their own processor 1052 or computing device 1050. Each of the transaction invoice reader 1040A, SRT buyer accounts 1042A, the transaction ID to account translator 1044A, the communications module 1085 for communicating SRT secure communications, the SRT transaction confirmation generator 1046A, the transaction expiration tracker 1049A and the Seller FI handshake module 1048A may each be coupled to the computing device 1050.

The transaction invoice reader 1040A may be configured to read the communication at 1012 from the Buyer device 1010 for initiating the payment process using the SRT secure transactions. The SRT buyer accounts 1042A may be configured to interface with the transaction ID to account translator 1044A to correlate the buyer or Buyer device 1010 to the account without sending accounting information over an open network. The SRT buyer accounts 1042A also conducts general accounting for entering and tracking debits and credits as would a conventional banking institution. The SRT buyer accounts 1042A may be configured to conduct on-line banking initiated by the Buyer.

The transaction ID to account translator 1044A may parse the transaction ID and obtain the information for correlating to the buyers account. The communications module 1085 communicates with at least the Seller's FI 1020 and the Buyer device 1010. The communications are secure. In an embodiment, only the BFI 1015 has the decryption key to decrypt the Buyers SRT transaction communication.

The SRT transaction confirmation generator 1046A generates a confirmation back to the Buyer device 1010 once a confirmation from the SRT transaction confirmation from the SFI system 1020 is received. There may be a need to communicate banking information such as insufficient funds, low balance alerts, etc. The BFI system 1015 may include a transaction expiration tracker 1049A configured to track the payment session established by the SFI system 1020. The payment session may be an allotted time window established by the seller. The BFI system. 1015 may include a Seller FI handshake module 1048A for establishing a communication session with the SFI system 1020 and make a payment according to the SFI system's specific rules. The rules may change based on each State or Country banking rules/procedures for accepting a payment through a network.

The BFI system 1015 may be configured to send the transaction packet information to the seller's financial institution system for pairing with a unique, one-time-only seller encrypted transaction invoice within the allotted time window established by the seller.

Figure 10C:
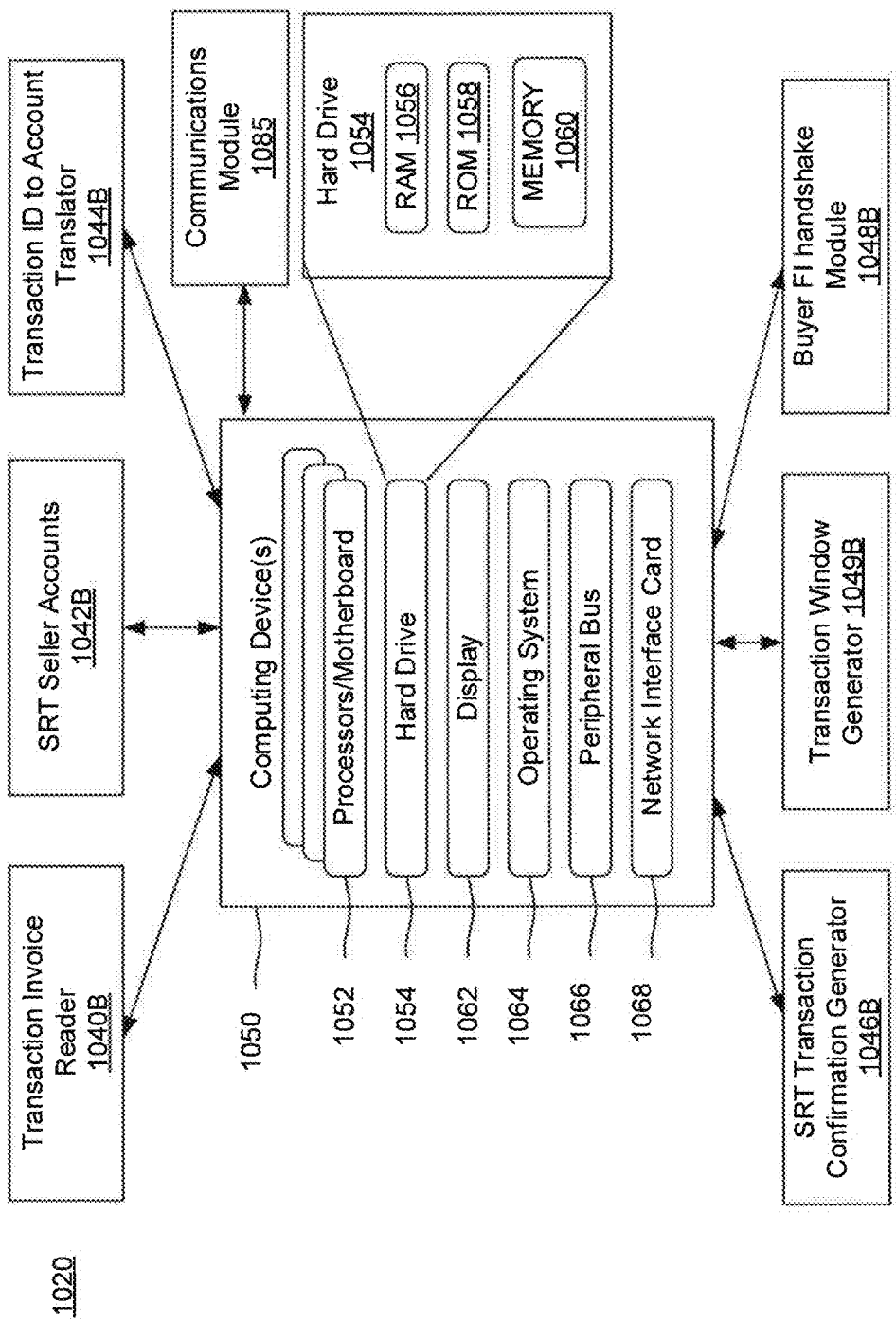

FIG. 10C shows a block diagram of a Seller's Financial Institution (SFI) System 1020. The SFI system 1020 is shown including electronics for carryout the processes described herein by the SFI system 1020. The SFI system 1020, may comprise in a basic configuration, computing device 1050 previously described above in relation to FIG. 10B. Thus no further discussion is necessary. The computing device 1050 and other electronics of the SFI system 1020 may carry out one or more blocks of process 1200 and 1500.

The SFI system 1020 may further include one or more of a transaction invoice reader 1040B, SRI seller accounts 1042B, a transaction II) to account translator 1044B, a communications module 1085 for communicating SRT secure communications, an SRT transaction confirmation generator 1046B, a transaction window generator 1049B and a BFI system handshake module 1048B. Each of the a transaction invoice reader 1040B, SRT seller accounts 1042B, transaction ID to account translator 1044B, communications module 1085, SRI' transaction confirmation generator 1046B, transaction window generator 1049B and BFI system handshake module 1048B may each require their own processor 1052 or computing device 1050. Each of a transaction invoice reader 1040B, SRT seller accounts 1042B, a transaction ID to account translator 1044B, a communications module 1085, an SRT transaction confirmation generator 1046B, a transaction window generator 1049E and BFI system handshake module 1048B may each be coupled to the computing device 1050.

The transaction invoice reader 1040A may be configured to read the communication at 1007 from the Seller device 1005 for initiating the payment receipt process using the SRT secure transactions. The SRT seller accounts 1042B may be configured to interface with the transaction ID to account translator 10449 to correlate the seller or Seller device 1005 to the account without sending accounting information over an open network. The SRT seller accounts 10429 may also conduct general accounting for entering and tracking debits and credits as would a conventional banking institution. The SRT seller accounts 1042B may' be configured to conduct on-line banking initiated by the Seller.

The transaction ID to account translator 1044B may parse the transaction ID and obtain the information for correlating to the Seller's account. The communications module 1085 communicates with at least the BH system 1015 and the Seller device 1005. The communications are secure, The SFI system 1020 determines if the unique, one-time-only transaction pairing is valid, then completes the transaction with transaction notification back to the BFI system 1015 at 1022 and to the Seller device 1005 at 1024.

The SRT transaction confirmation generator 1046B generates a confirmation back to the Seller device 1005 once payment is received from the BFI system 1015 and processed. There may be a need to communicate status banking information such as insufficient funds, low balance alerts, void or cancelled transactions, etc. The SFI system 1020 may include a transaction window generator 1049B configured to establish a communication session with the BFI system 1015 for a predetermined amount of time (time limit) for completing the payment transaction. The SFI system 1020 may include a Buyer FI system handshake module 1048B for establishing a communication session with the 13H system 1015 and make a payment according to the BFI system's specific rules. The rules may change based on each State or Country banking rules/procedures when transferring a payment through a network. The time limit is placed on the validity of the unique, one-time-only packet transaction identification. The Buyer's financial institution must "close the transaction" with the Seller's financial institution before the time limit expires.

Pos System:

A Point-of-Sale (POS) system 1100 may comprise a seller interface 1130, a buyer interface 1120 and a transaction manager 1140. The seller interface 1130 may be configured to generate seller information representative of received seller information associated with a SRT financial transaction, a unique transaction identification and seller's financial institution data from a Seller device 1005. The unique transaction identification is a one-time-only transaction identification. The POS system 1100 further comprises a computing device 1150. The computing device 1150 may be similar to the computing device described in relation to FIG. 1050. Therefore, no further discussion is necessary in relation to the components of the computing device 1150. The computing device 1150 may communicate with a seller interface 1130, a buyer interface 1120 and a transaction manager 1140 and provide the memory and processors to support their functions described herein.

The seller interface 1130 may further comprises a network interface (i.e., network interface card 1068) configured to receive a confirmation of said payment from the SFI system 1020. The seller interface 1130 may include a transaction receiving module 1132 which receives a bill of sale or invoice, seller bank information (SFI information) and a unique, one-time only transaction ID such as a SRT transaction ID. The seller interface 1130 may include a transmission module 1134 which communicates data representative of the unique transaction ID confirmation. Arrows 1135A and 1135B represent communication paths whether wireless, wired or communication taking place within the same device. The communications may be configured to be direct to the Seller device 1005. The Seller device 1005 may be a cash register at a retail outlet, on a computing device, or mobile computing device with means for generating an invoice total. The device may scan or capture barcodes or other item tracking indicia. The invoice may include one or more of product codes, or product manufacturing data. The seller bank information may include the financial institution routing number. The seller bank information may include the seller hank account information.

The Buyer device 1010 may be configured to receive a transaction invoice having transaction invoice information data via the buyer interface 1120 and generate encrypted buyer data with the transaction invoice information data. The buyer interface 1120 may be configured to interface with a Buyer device 1010 (i.e., mobile device with a HardWallet) to communicate a transaction invoice with the transaction invoice information data and receive encrypted buyer data via encryption data module 1112 with the SRT transaction invoice information data. The buyer interface 1120 may further comprise a network interface (i.e., network interface card 1068) configured to receive a confirmation from the BFI system 1015 of the payment to the SFI system 1020. The encrypted transaction data packet is decrypted by the BFI system 1015 using a decryption key dedicated to the BFI system 1015. The buyer interface 1120 may include a HardWallet Reader with an encrypted data module 1112. The buyer interface 1120 is configured to communicate with the Buyer device 1010 via communication paths 1126A and 1126B. The Buyer device 1010 may use biometric or other form of secondary device protection scheme to release the encrypted buyer data from the buyer's device. In an embodiment, the PUS system 1100 may require input of biometric verification data or buyer security information via the buyer interface 1120 for approving access and carrying out SRT transaction payments described herein.

The transaction manager 1140 may be configured to generate a transaction data packet based on received encrypted buyer data from the buyer interface 1120 and the seller information from the seller interface 1130 and establish a communication session for the Buyer or Buyer device 1010 to communicate an encrypted transaction data packet to a buyer's financial institution to effectuate payment associated with the financial transaction. The financial transaction is a secure retail transaction (SRT) created autonomously, the transaction invoice comprising an itemized bill, and a seller's Secure Retail Transaction ID for goods and/or services to be purchased. The transaction manager 1140 assembles the encrypted buyer data, the bill of sale data (transaction invoice), the SFI information or SFI system information, and the unique SRT transaction ID created by the Seller device 1005. In an embodiment, the unique SRT transaction ID may be created by the seller interface 1130. The transaction manager 1140 may be configured to generate a single transaction data packet comprised of the encrypted buyer data from the buyer device and the seller information transmitted from the seller device and establish a communication session from the buyer to transmit the encrypted transaction data packet to a buyer's financial institution.

Figure 11:
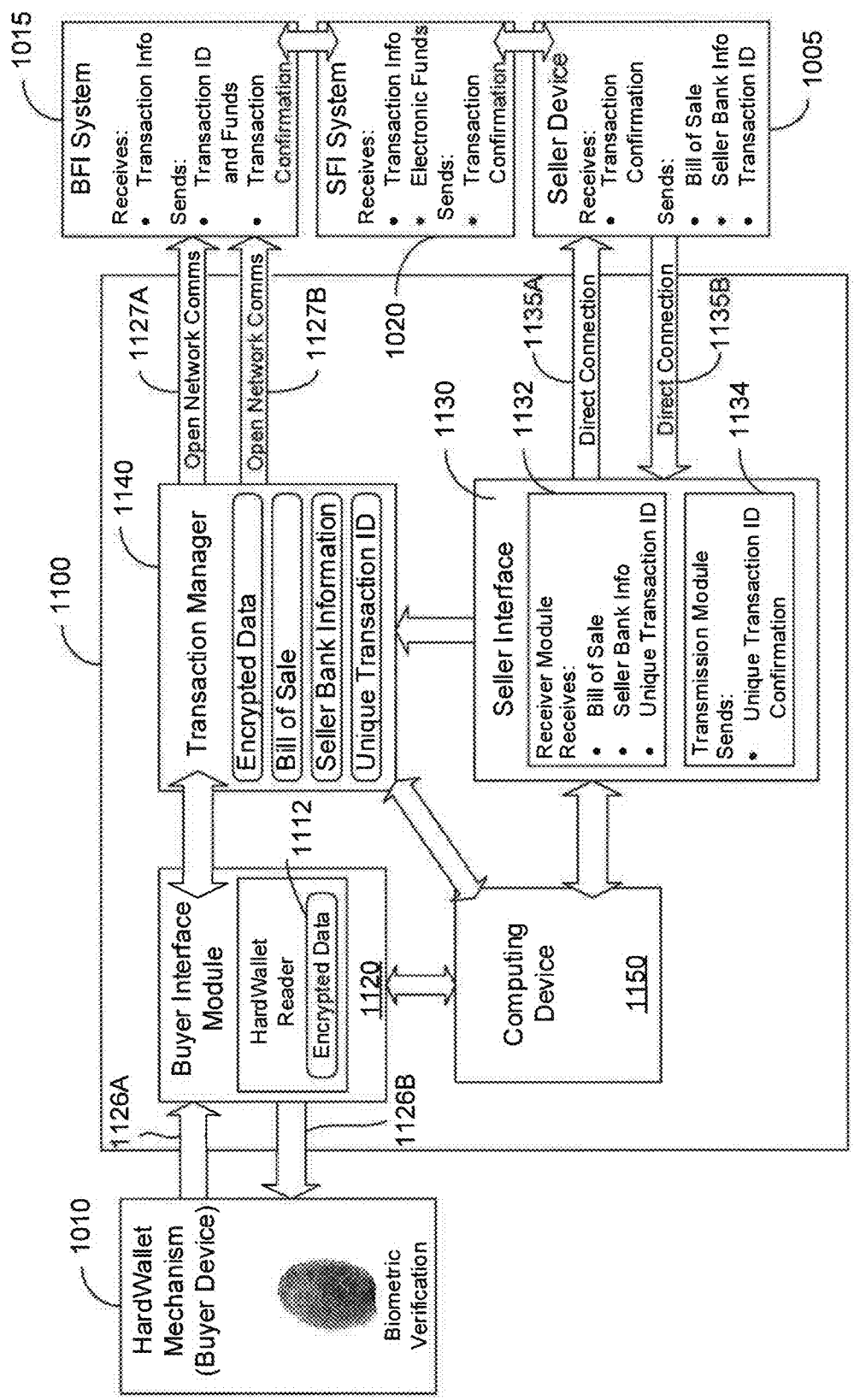
FIG. 11 shows a block diagram of a Point of Sale system.

The transaction manager 1140 communicates with the BFI system 1015 via an open network communications along paths 1127A and 1127B to and from the BFI system 1015. In FIG. 11, communications paths are shown between the BFI system 1015 and the SFI system 1020 previously described. The Seller device 1005 is shown communicating with the SFI system 1020 previously described. The transaction manager further comprises a network interface (i.e., network interface card 1068) to receive a confirmation of payment by the BFI system 1015. Upon the SFI system receiving a receipt for payment from the BFI system, the SFI system returns an encrypted transaction status (confirmation or denial) to the BFI system via a network interface where the BFI system then sends or forwards the confirmation or status to the Buyer device. The transaction status, now local to both the point-of-sales (POS) system 1100 and the buyer device 1010 may be utilized to perform a "handshake" via communication paths 1126A and 1126B. Upon "handshake," the items in the SRT transaction invoice 1006 may be released to the buyer.

The transaction manager 1140 may be configured to generate a single transaction data packet comprised of the encrypted buyer data from the buyer device and the seller information transmitted from the seller device and establish a communication session from the buyer to transmit the encrypted transaction data packet to a buyer's financial institution.

In operation, the seller interface may generate seller information representative of received seller information associated with a financial transaction, a unique transaction identification and seller's financial institution data from a seller device. The buyer interface may receive a transaction invoice for transaction invoice information data. The buyer interface may generate encrypted buyer data with the transaction invoice information data. The transaction manager may generate a transaction data packet based on received encrypted buyer data from the buyer interface and the seller information from the seller interface. The transaction manager may establish a communication session for the buyer to communicate an encrypted transaction data packet to a buyer's financial institution to effectuate payment associated with the financial transaction.

The seller interface may receive a confirmation of said payment from the seller's financial institution. The buyer interface may receive a confirmation from the buyer's financial institution of said payment to the seller's financial institution. The financial transaction is a secure retail transaction (SRT) created autonomously, the transaction invoice comprising an itemized bill, and a seller's Secure Retail Transaction ID for goods and/or services to be purchased.

SRT Process:

The SRT process is configured so that the Buyer's personal financial information never goes to the Seller or Seller device, AND never goes over communication paths without being encrypted. This may maximize safety of the sensitive information (i.e., Buyer's personal financial information). A one-time-only, unique transaction package identification is formed that "even if somehow stolen" could never be reused, and thus is secure. A time limit is placed on the validity of the unique, one-time-only packet transaction identification, thus the Buyer's financial institution must "close the transaction" with the Seller's financial institution before the time limit runs out (expires). If the time limit expires, the transaction is null and void. Again, even if stolen, after this short time limit, the unique, one-time-only packet transaction identification cannot be used again.

In the SRT process, biometric or other form of secondary device protection scheme is used to release the transaction packet from the buyer's device to the buyer's financial institution (or POS system) (thus precluding theft of the buyer's device to act as a secure capability).

Figure 12A:
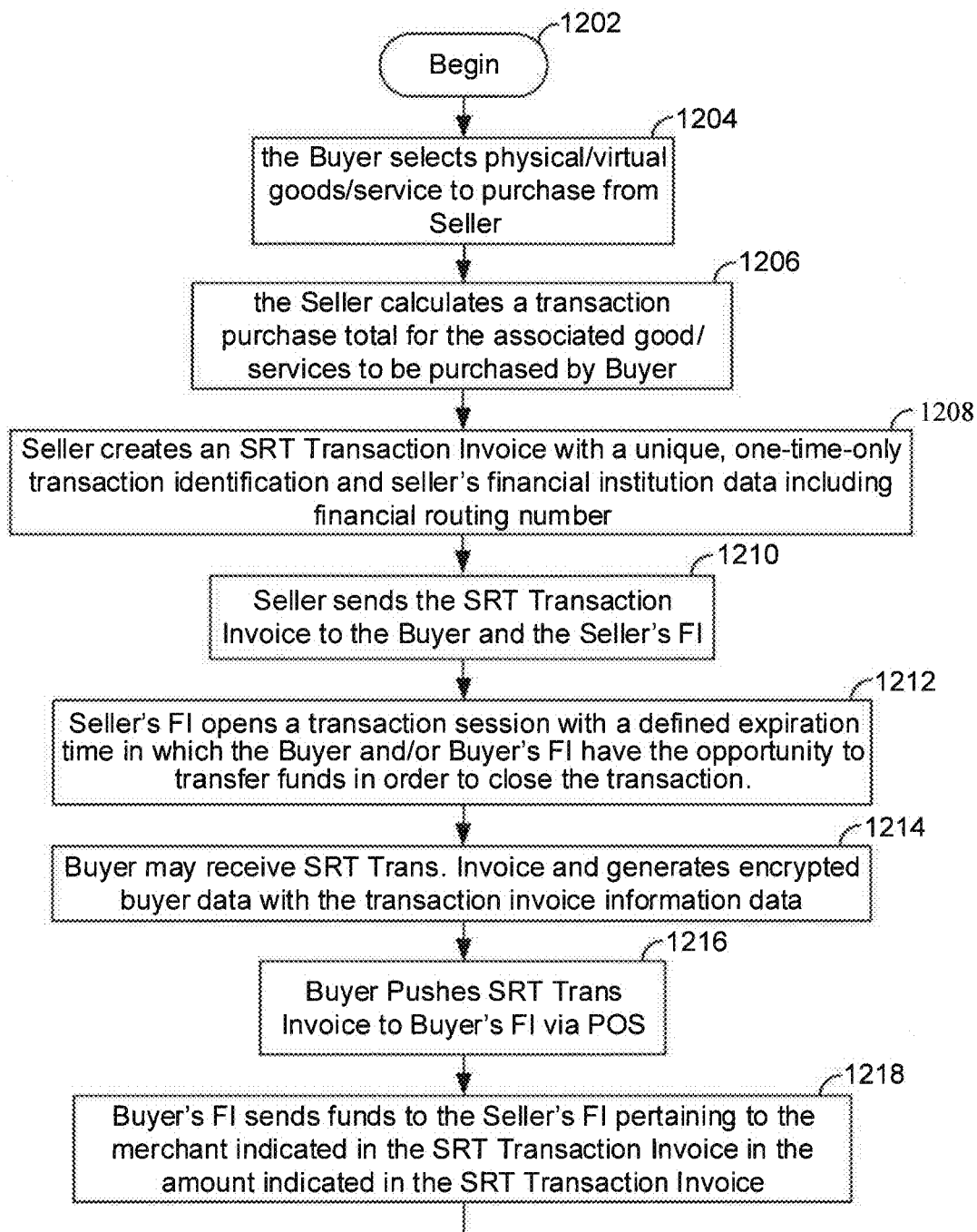
FIGS. 12A-12B show a flowchart of the system SRT process for the exchange of physical/virtual goods/services and payment without the need for the Buyer to release financial information to the Seller.
Figure 12B:
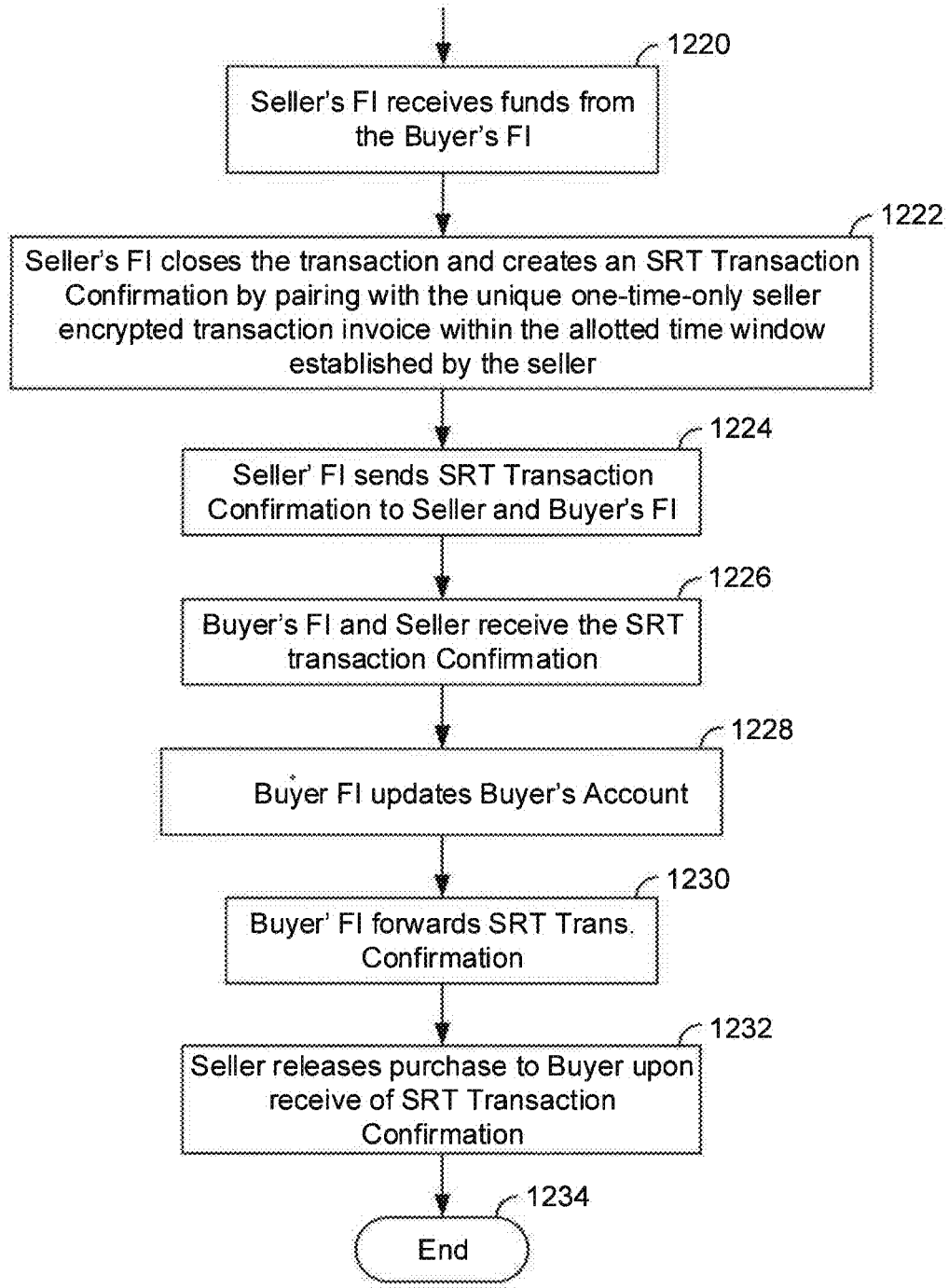

FIGS. 12A-12B illustrate a flowchart of the system SRT process 1200 for the exchange of physical/virtual goods/services and payment without the need for the Buyer to release financial information to the Seller. The description set forth below is related to a Buyer and a Seller. However, the Buyer may be a first party and the Seller may be a second party, where the first party and second conduct a transaction where an exchange takes place. The Seller may be a medical facility (i.e., doctor, doctors office, hospital, clinic), the Buyer may be a patient, the Buyer's FT may be, such as without limitation, a Buyer's medical insurance company or Buyer's medical saving account. The Seller's FI system may be the Seller's FI system. In this embodiment, the exchange may medical services for payment through medical insurance, medical savings account or other currency including, US dollars, Euro, Yuan, bitcoin, etc.

The exchange of medical services may be on-line as well.

The SRT process 1200 begins at block 1202. At block 1204, the Buyer or Buyer Device 1010 (hereinafter sometimes referred to as the "Buyer") selects physical/virtual goods/service to purchase from Seller via a Seller device 1005 (hereinafter sometimes referred to as "Seller"). At block 1206, the Seller calculates a transaction purchase total for the associated good/services to be purchased by Buyer. At block 1208, the Seller creates an SRT Transaction Invoice with a unique, one-time-only transaction identification and seller's financial institution data including financial routing number. By way of non-limiting example, the POS system (FIG. 11) may autonomously create the SRT transaction Invoice. The SRI Transaction Invoice may include an itemized bill, merchant's Secure Retail Transaction (SRT) ID and Secure Retail Transaction ID. At block 1210, the Seller sends the SRT Transaction Invoice to the Buyer Device 1010, such as via a POS system 1100) and the SFI system 1020. In an embodiment, the SRT Transaction Invoice may be sent simultaneously to both the BFI system and the SD system. The communications from the POS system 1100 may employ a wireless or hardwire-capable hardware interface to transmit the SRT transaction invoice from POS system to the Buyer's device (i.e., Buyer's SRT device).

At block 1212, the Seller's FI system opens a transaction session with a defined expiration time in which the Buyer and/or BFI system 1015 have the opportunity to transfer funds in order to close the transaction.

At block 1214, the Buyer device 1010 may receive the SRI Transaction Invoice and generate encrypted buyer data with the transaction invoice information data and, at block 1216, the Buyer communicates the SRT Transaction Invoice information to the BFI system via an open communications infrastructure (e.g. Wi-Fi, landline, HardWallet). At block 1218, the BFI system 1015 sends funds to the SFI system 1020 pertaining to the merchant (Seller) indicated in the SRT Transaction Invoice in the amount indicated in the SRI Transaction Invoice. By way of non-limiting example, the BFI system 1015 may query the SFI system 1020 (financial institution indicated in the SRT transaction invoice) for the open transaction session pertaining to the transaction ID indicated in the SRT transaction invoice.

At block 1220, SFI system 1020 receives funds from the BFI system 1015. At block 1222, the SFI system 1020 processes the funds and closes the transaction session or window and creates an SRT Transaction Confirmation by pairing with the unique, one-time-only seller encrypted transaction invoice within the allotted time window established by the seller. At block 1224, the SFI system 1020 sends the SRT Transaction Confirmation to both the BFI system 1015 and the Seller device 1005. In an embodiment, the SRT Transaction Confirmation may be sent simultaneously to the BFI system 1015 and the Seller device 1005.

At block 1226, the BFI system 1015 and Seller device 1005 receive the SRT Transaction Confirmation. At block 1228, the BFI system 1015 updates the Buyer's SRT account information. The SRT account may be a dedicated account for making certain transaction. At block 1230, the BFI system 1015 forwards the SRT Transaction Confirmation to the Buyer device 1010. At block 1232, the Seller device 1005 releases physical/virtual goods/services to Buyer and/or may send a release communication to the Buyer device 1010. The release may be sent upon receipt of SRT Transaction Confirmation from SFI system 1020. The process ends at 1234.

The term "confirmation" may include a status which could be an approval, denial or cancellation of the transaction.

Figure 13:
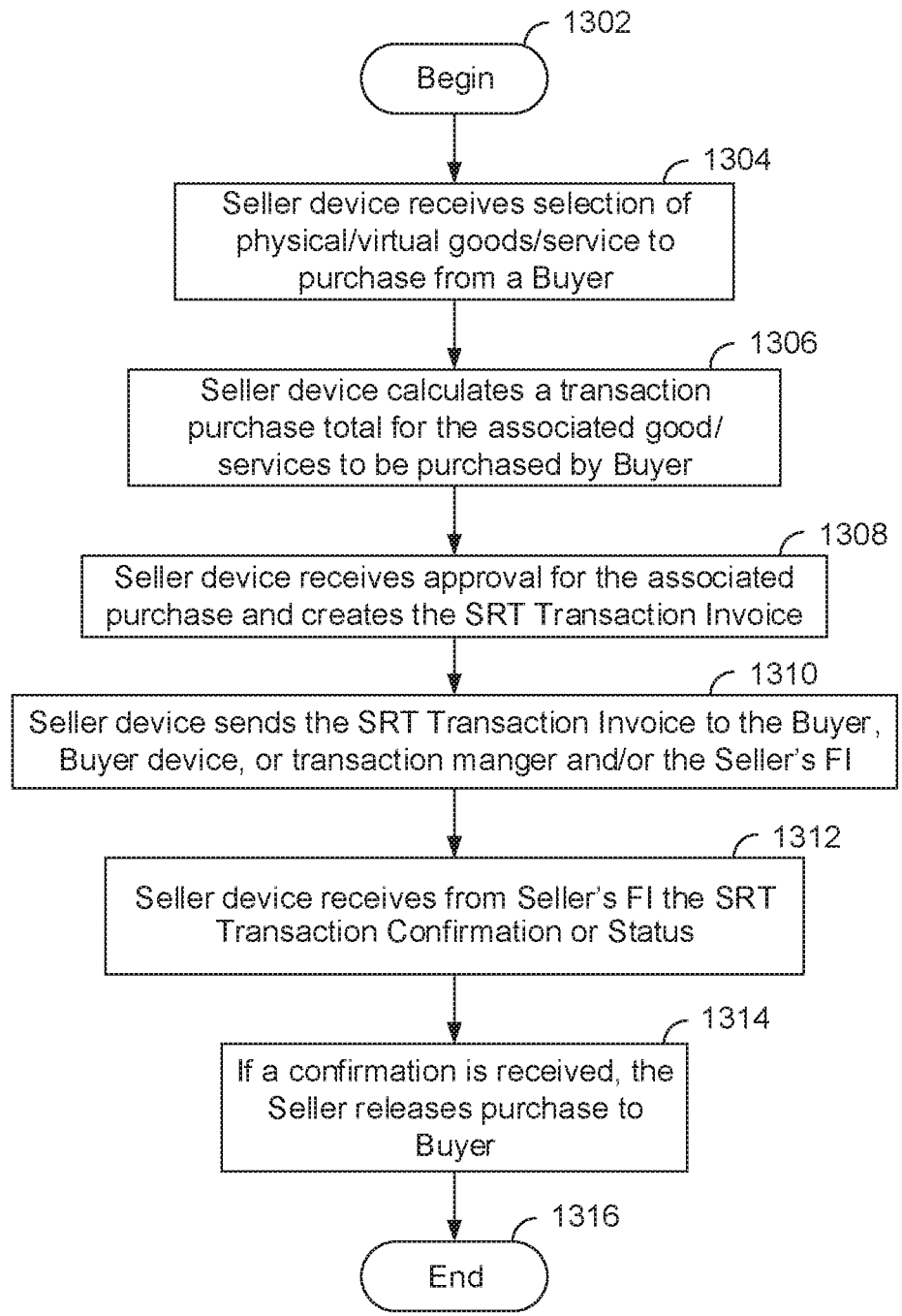
FIG. 13 shows a Seller SRT process.

The Seller SRT Process:

Referring now to FIG. 13, the Seller SRT process 1300 begins at block 1302. A Seller device 1005 may be configured to generate seller information associated with a financial transaction, a unique, one-time-only transaction identification and seller's financial institution data including financial routing number. Thus, at block 1304, the Seller or Seller device 1005 may receive a selection of physical/virtual goods/service for purchase or exchange from the Buyer or Buyer device 1010. In an embodiment, the transaction takes place on-line, thus, the selection is sent via a communication session through a network. A purchasing kiosk may be used in a store to communicate a selection.

At block 1306, the Seller device 1005 may calculate a transaction purchase total for the associated good/services to be purchased by Buyer. At block 1308, the Seller or Seller device 1005 may receive approval of the purchase from Buyer and creates an SRT Transaction Invoice. By way of non-limiting example, the POS system 1100 may autonomously create the SRT transaction Invoice. The SRT Transaction Invoice may include an itemized bill, merchant's Secure Retail Transaction ID and Secure Retail Transaction ID. At block 1310, the Seller device 1005 communicates the SRT Transaction Invoice to the Buyer, Buyer device 1010, or transaction manger and/or the SFI system 1020. In an embodiment, the SRT Transaction Invoice may be sent simultaneously to both the Buyer and the Seller's FI. The communications from the POS system 1100 may employ a wireless or hardwire-capable hardware interface to transmit the SRT transaction invoice from POS system to Buyer device 1010. The seller or Seller device as part of the transaction invoice may include a code or number for use by the SFI system to start a clock or window for the session to clear/complete the payment.

At block 1312, the Seller device 1005 may receive from the SFI system the SRT Transaction Confirmation or status where the SRT Confirmation or status was sent to both the BFI system 1015 and the Seller device 1005. The SRT Transaction Conformation or status may be a transaction completion indicator between the FI systems. At block 1314, if the confirmation is received, the Seller or Seller device 1005 may communicate a release or manually release physical/virtual goods/services to the Buyer or Buyer device 1010 upon receipt of the SRT Transaction Confirmation from SFI system 1020.

For on-line purchases, the Buyer device 1010 would be communicated a release communication. By way of non-limiting example, if purchasing software on-line, the processes for software download may be initiated. If purchasing product on-line the release communication may trigger warehouse communications for packing and deliver of goods purchased.

For purchases which may include on-line reservations and pre-payments, the release communication may be used by the Buyer and presented at the pre-scheduled date.

As can be appreciated, there are numerous types of purchasing transaction, all of which are impossible to set forth herein.

Figure 14:
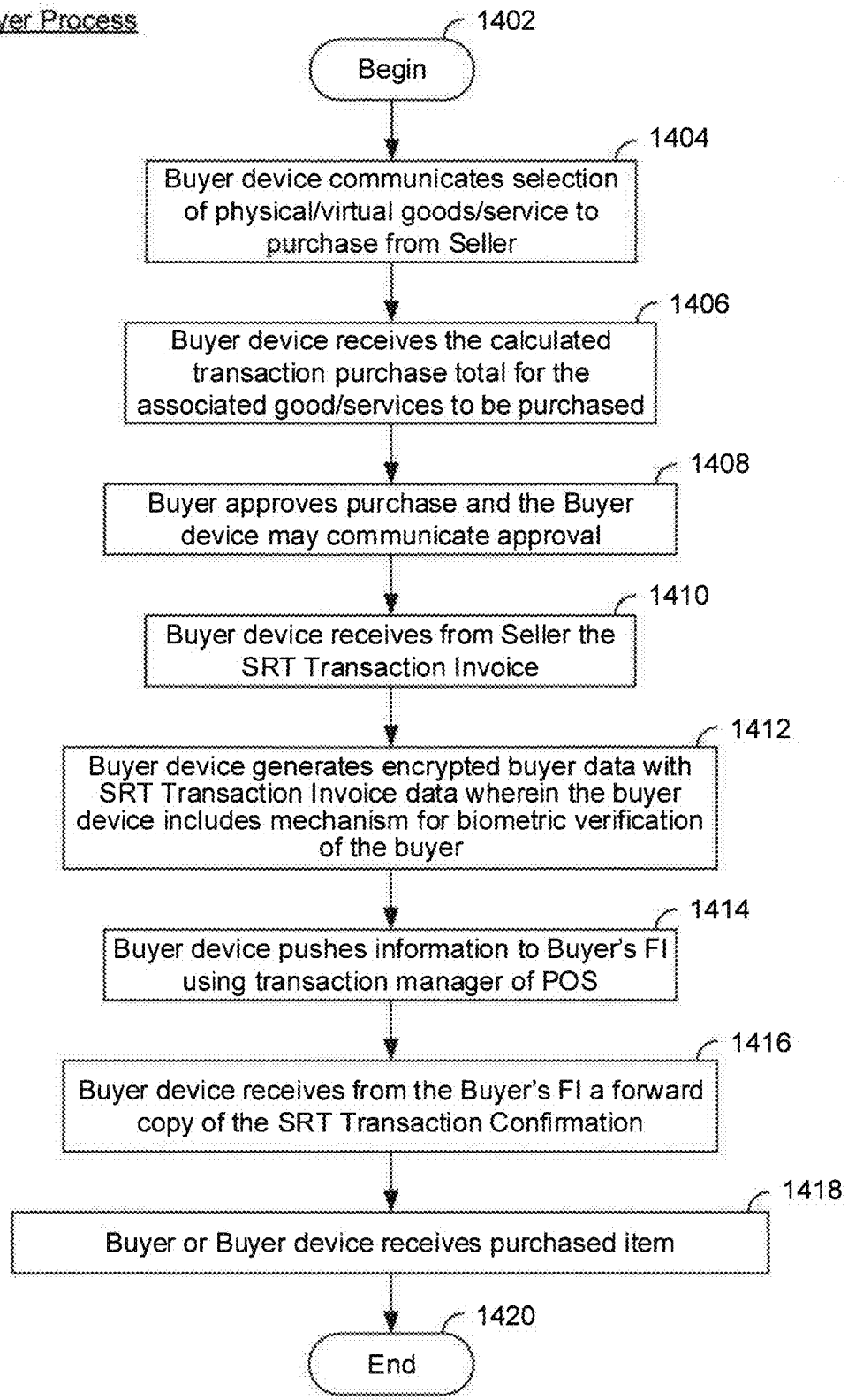
FIG. 14 shows a Buyer SRT process.

Buyer SRT Process:

Referring now to FIG. 14, the Buyer SRT process 1400 begins at block 1402. The buyer device 1010 may be configured to receive a transaction invoice having transaction invoice information data and generate encrypted buyer data with the transaction invoice information data. Thus, at block 1404, the Buyer or Buyer device 1010 may communicate selected physical/virtual goods/service to purchase to Seller or Seller device 1005. If the transaction is conducted on-line via an Internet session, the Buyer makes a selection through a web browser and the selection is communicated to the Seller's Internet Website portal. If the Buyer conducts the purchase at a Retail Store, the purchased items are brought to a checkout counter. At block 1406, the Buyer device 1010 may receive the calculated transaction purchase total for the associated good/services to be purchased. At block 1408, the Buyer via Buyer device 1010 may approve purchase and may communicate the approval to the Seller or Seller device 1005. At block 1410, the Buyer or Buyer device 1010 may receive from Seller or Seller device 1005 the SRT Transaction Invoice. The SRT Transaction Invoice may include an itemized bill, merchant's Secure Retail Transaction ID and Secure Retail Transaction ID. Other information may include location data, and date data.

At block 1412, the Buyer device 1010 may generate encryption buyer data with the SRT Transaction Invoice data wherein the Buyer device 1010 includes mechanism for biometric verification of the buyer and, at block 1414, the Buyer device 1010 may causes the communication to the BFI system 1015 via an open communications infrastructure (e.g. Wi-Fi, landline. HardWallet). The communication may use transaction manager of the POS system 1100. At block 1416, the Buyer device 1005 may receive from the BFI system 1015 a forward copy of the SRT Transaction Confirmation. At block 1418, the Buyer or Buyer device 1010 receives the physical/virtual goods/services. The process ends at 1420. As can be appreciated, the transaction nay include purchased goods for the Buyer to consume or use. The transaction may include purchased services to be scheduled. The transaction may include goods or services for the Buyer device 1010 or other electronic devices for the Buyer.

The Seller may include a Retailer (i.e., Retail Store); a Square System for remote/wireless purchases; an online site or store (Amazon, etc.); Apple Pay and similar systems.

Figure 15:
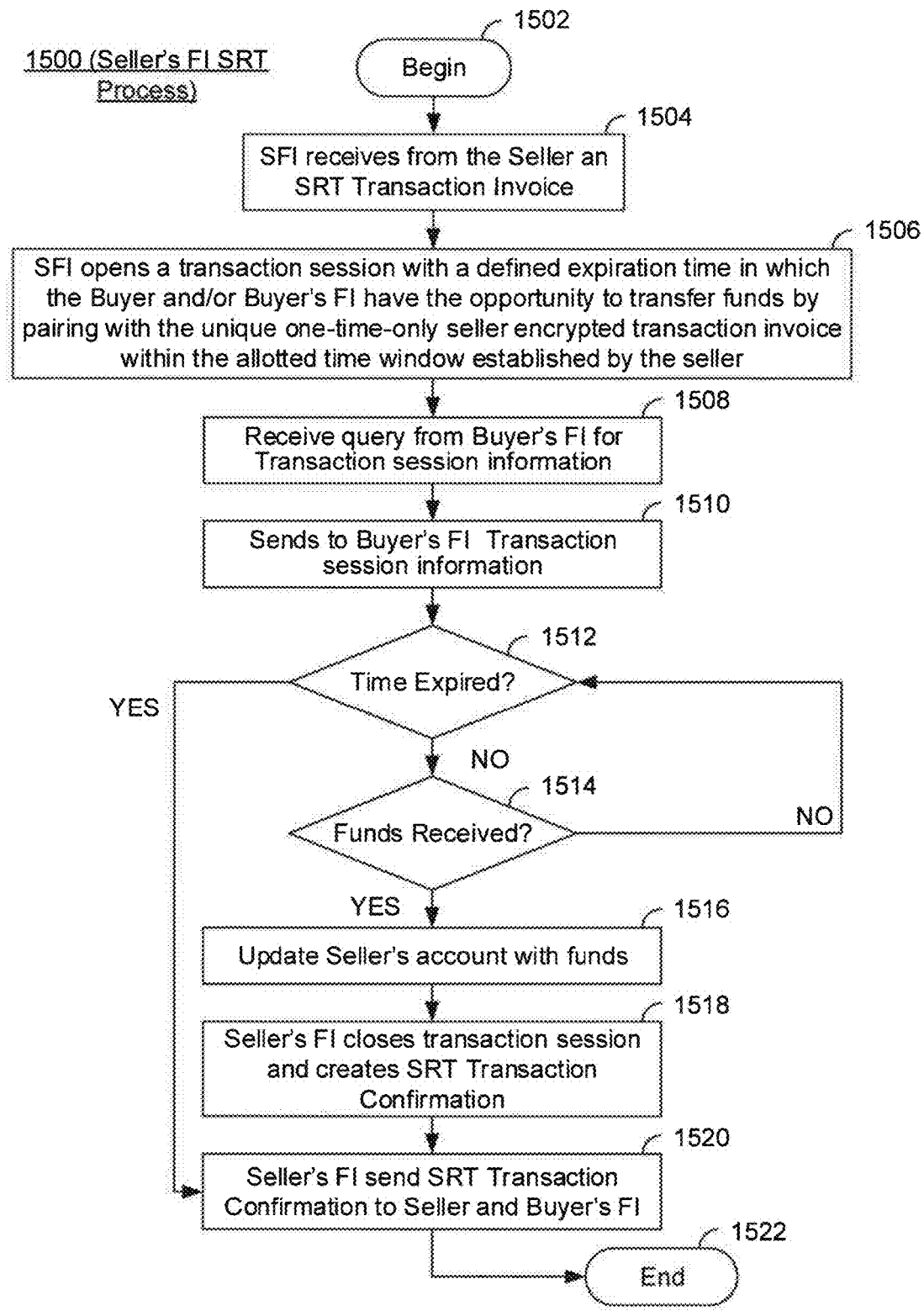
FIG. 15 shows a Seller's financial institution (FI) SRT process.

Seller's FI System SRT Process:

Referring now to FIG. 15, the SFI system. SRT process 1500 begins at block 1502. The seller's institution may determine if the unique, one-time-only transaction pairing is valid, then completes the transaction with transaction notification back to the BFI and to the seller. Thus, at block 1504, the SFI system 1020 may receive from the Seller device 1005 a communication packet which may include an SRI Transaction Invoice where the SRT Transaction Invoice was sent to both the SFI system 1020 and the Buyer device 1010. The communication packet of the SRT Transaction Invoice may include an itemized bill, merchant's Secure Retail Transaction ID and Secure Retail Transaction ID. The seller communication packet may include information associated with a financial transaction, a unique, one-time-only transaction identification and seller's financial institution data including financial routing number. The seller communication packet may include a number or code to start and establish the allotted window for the payment session.

At block 1506, the SFI system 1020 opens a transaction session with a defined expiration time in which the Buyer and/or BH system 1015 may have the opportunity to transfer funds in order to close or complete the transaction by pairing with the unique, one-time-only seller encrypted transaction invoice within the allotted time window established by the seller. The SFI system 1020 may determine from the communication packet or the SRT Transaction Invoice the Seller to correlate the seller account with the transaction.

At block 1508, the SFI system 1020 may receive a query from the BFI system 1015 (financial institution indicated in the SRT transaction invoice) for the open transaction session pertaining to the transaction ID indicated in the SRT transaction invoice while the session is active/open. At block 1510, the SFI system 1020 sends to the BFI system 1015, the open transaction session information. At block 1512, the SFI system 1020 tracks the time until funds can be received Where a determination is made whether the time for the session is expired. The seller's financial institution determines if the unique, one-time-only transaction pairing is valid.

The funds to the SFI system 1020 pertain to the merchant (Seller) indicated in the SRT Transaction Invoice in the amount indicated in the SRT Transaction Invoice. If the determination at block 1512 is NO, a determination may be made at block 1514 whether the funds are received. If the funds are not received, the process loops back to block 1512. The SFI waits to receive funds from the BFI until time expires.

At block 1512, if time is expired, the SFI system 1020 may close the transaction session and may generates a cancellation communication to at least the Seller or Seller device 1005 at block 1518. The Confirmation at block 1518 is a confirmation of termination.

The allotted time window may be established by the seller.

If the RI system 1020 receives funds at block 1514, then the SFI system 1020 may update the Seller's account with funds at block 1516. At block 1518, the SFI system 1020 closes the transaction and creates an SRT Transaction Confirmation or status. At block 1520, the SFI sends the SRT Transaction Confirmation to both the BFI system 1015 and the Seller or Seller device 1005. In an embodiment, the SRT Transaction Confirmation or status communications may be sent simultaneously to the BFI system 1015 and the Seller device 1005. At block 1522, the process 1500 ends.

Buyer's FI System SRT Process:

The BFI system SRT process 1600 begins at block 1602. The BFI may be configured to send a transaction packet information to the SFI for pairing with a unique, one-time-only seller encrypted transaction invoice within the allotted time window established by the seller. Thus, at block 1604, the BFI system 1015 may receive the SRT Transaction Invoice from the Buyer device 1010 via an open communications infrastructure (e.g. Wi-Fi, landline, HardWallet). In an embodiment, the BFI system 1015 may query the Buyer's account balance to determine if there are sufficient funds, at block 1606. If there are insufficient funds, the BFI sends and NSF communication to the Buyer, at block 1618 and the process ends at block 1620. At block 1618, instead of a confirmation, the communication packet would represent insufficient funds status, for example.

At block 1610, if there are sufficient funds, the BFI system 1015 may query the SFI system for the open transaction session associated with the SRT transaction invoice. At block 1612, the BFI system 1015 may communicate a packet representing funds for the transaction Seller to the SFI system 1020. At block 1614, the BFI system 1015 receives from the SFI system 1020 the SRT Transaction Confirmation or status where both the BM system and the Seller device may receive the SRT Transaction Confirmation or status.

At block 1616, the BFI system 1015 may updates Buyer's account information. At block 1618, the BFI system 1015 may forward a communication representing the SRT Transaction Confirmation or status to the Buyer device 1015. The process 1600 ends at block 1620.

The BB may be configured to send the transaction packet information to the seller's institution for pairing with a unique, one-time-only seller encrypted transaction invoice generated by the BFI within the allotted time window established by the seller.

In one or more embodiments, one or more non-transitory, tangible computer storage media having stored thereon multiple instructions causing the one or more processors to perform one or more blocks of the Seller SRT Process, the Buyer. SRT Process, the Buyer's FI system SRT Process and/or the Seller's FI system SRT Process.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

The embodiments described above provide advantages over conventional cyber security systems and methods. It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the claims and their equivalents. Furthermore, the foregoing description of the disclosure are provided for the purpose of illustration only and not for the purpose of limitation—the disclosure being defined by the claims.

We claim:

1. A systematic system comprising:

a. a point of sale seller device to interact with a buyer device and communicate with a seller's financial institution system, the seller device further generates seller information including a financial transaction invoice with a unique, one-time-only transaction identification and seller's financial institution data associated with the seller's financial institution system including financial routing number, wherein the seller information is generated based on a purchase being initiated with a buyer device in which buyer's financial data from the buyer device is never provided by the buyer device to the seller device;

b. the buyer device including a controller, the buyer device receives a transaction invoice having transaction invoice information data and generate encrypted buyer data that includes buyer identification information and buyer's financial data based on the purchase;

c. a transaction manager generates a single transaction and time limited data packet comprised of the encrypted buyer data associated with the buyer device during the purchase and the seller information transmitted from the seller device to the buyer device and, for the buyer device, establish a communication session to transmit the encrypted transaction data packet directly to a buyer's financial institution system associated with the buyer's financial data;

d. the buyer's financial institution system sends transaction packet information to the seller's financial institution system for pairing with a unique, one-time-only seller encrypted transaction invoice within an allotted time window of a payment session established by the seller as directed by the transaction manager and provides transaction confirmation to the buyer device; and e. the seller's financial institution system determines that the unique, one-time-only transaction pairing is valid, and in response to the valid determination completes the transaction with transaction notification back to the buyer's financial institution system and to the seller device wherein the seller device further comprises a network interface, the network interface receives a confirmation of said payment from the seller's financial institution system and the transaction invoice generated by the seller device includes data associated with the time allotted window established by the seller for establishing the time allotted window for the payment session.

2. The system of claim 1, wherein the buyer device further comprises a network interface which receives a confirmation from the buyer's financial institution system of said payment to the seller's financial institution system wherein the controller comprises a field-programmable gate array.

3. The system of claim 1, wherein the financial transaction is a secure retail transaction (SRT) created autonomously, the transaction invoice comprising an itemized bill, and a seller's unique and time-sensitive Retail Transaction ID for goods or services to be purchased.

4. The system of claim 1, wherein the encrypted transaction data packet is decrypted by the buyer's financial institution system using a decryption key dedicated to the buyer's financial institution system.

5. The system of claim 1, wherein the transaction manager further comprises a network interface to receive a confirmation of payment by the buyer's financial institution system.

6. The system of claim 1, wherein the buyer device includes mechanism to receive biometric verification of the buyer via the buyer device before sending the transaction invoice information data.

7. A systematic method comprising:
a. generating, by a point of sale seller device, seller information representative of seller information including a financial transaction invoice with a unique, one-time-only and time limited transaction identification and seller's financial institution data associated with a seller's financial institution system including financial routing number from the seller device based on a purchase being initiated with a buyer device in which buyer's financial data from the buyer device is never provided by the buyer device to the seller device;
b. generating, by the buyer device, encrypted buyer data that includes financial transaction invoice information data received from the seller device and the buyer's financial data based on the purchase;
c. generating, by a transaction manager, a single transaction data packet, the single transaction data packet comprised of encrypted buyer data from the buyer device during the purchase and the seller information transmitted from the point of sale seller device to the buyer device;
d. establishing, by the transaction manager, a communication session from the buyer device to transmit the encrypted transaction data packet directly to a buyer's financial institution system associated with the buyer's financial data;
e. sending, by the buyer's financial institution system as directed by the transaction manager, the transaction packet information to the seller's financial institution system for pairing with a unique, one-time-only and time-limited seller encrypted transaction invoice within an allotted time window established for a payment session by the seller;
f. determining, by the seller's financial institution system, that the one-time-only and time-limited transaction pairing is valid, and in response to the valid determination completing, by the seller's financial institution system, the transaction with transaction notification back to the buyer's financial institution system and to the seller device; and
g. receiving, by a network interface of the seller device, a confirmation of said payment from the seller's financial institution system wherein the transaction invoice generated by the seller device includes data associated with the time allotted window established by the seller for establishing the time allotted window for the payment session.

8. The method of claim 7, further comprising receiving, by a network interface of the buyer device, a confirmation from the buyer's financial institution system of said payment to the seller's financial institution system.

9. The method of claim 7, wherein the financial transaction is a secure retail transaction (SRT) created autonomously, the transaction invoice comprising an itemized bill, and a seller's Secure Retail Transaction ID for goods or services to be purchased.

10. The method of claim 7, further comprising, decrypting the encrypted transaction data packet by the buyer's financial institution system using a decryption key dedicated to the buyer's financial institution system.

11. The method of claim 7, wherein the transaction manager further comprises a network interface; and
further comprising:
receiving, by the network interface of the transaction manager, a confirmation of payment by the buyer's financial institution system within the allotted time window established by the seller.

12. The method of claim 7, further comprising receiving, by the buyer device, biometric verification of the buyer before sending the transaction invoice information data.

13. One or more non-transitory, tangible computer storage media having stored thereon multiple instructions causing the one or more processors to:
a. generate, by a point of sale seller device, seller information representative of seller information including a financial transaction invoice with a unique, one-time-only and time-limited transaction identification and seller's financial institution data associated with a seller's financial institution system including financial routing number from the seller device based on a purchase being initiated with a buyer device in which buyer's financial data from the buyer device is never provided by the buyer device to the seller device;
b. generate, by the buyer device, encrypted buyer data that includes financial transaction invoice information data received from the seller device and the buyer's financial data based on the purchase;
c. generate, by a transaction manager, a single transaction data packet comprised of encrypted buyer data from the buyer device during the purchase and the seller information transmitted from the point of sale seller device to the buyer device;
d. establish, by the transaction manager, a communication session from the buyer device to transmit the encrypted transaction data packet directly to a buyer's financial institution system associated with the buyer's financial data;

e. send, by the buyer's financial institution system as directed by the transaction manager, the transaction packet information to the seller's financial institution system for pairing with a unique, one-time-only seller encrypted transaction invoice within an allotted time window established for a payment session by the seller;

f. determine, by the seller's financial institution system, that the unique, one-time-only transaction pairing is valid, and in response to the valid determination completing, by the seller's financial institution system, the transaction with transaction notification back to the buyer's financial institution system and to the seller device; and g. receive, by a network interface of the seller device, a confirmation of said payment from the seller's financial institution system wherein the transaction invoice generated by the seller device includes data associated with the time allotted window established by the seller for establishing the time allotted window for the payment session.

14. The one or more non-transitory, tangible computer storage media of claim 13, further comprising multiple instructions causing the one or more processors to receive, by a network interface of the buyer device, a confirmation from the buyer's financial institution system of said payment to the seller's financial institution system.

15. The one or more non-transitory, tangible computer storage media of claim 13, wherein the financial transaction is a secure retail transaction (SRT) created autonomously, the transaction invoice comprising an itemized bill, and a seller's Secure Retail Transaction ID for goods or services to be purchased.

16. The one or more non-transitory, tangible computer storage media of claim 13, further comprising multiple instructions causing the one or more processors to decrypt the encrypted transaction data packet by the buyer's financial institution system using a decryption key dedicated to the buyer's financial institution system.

17. The one or more non-transitory, tangible computer storage media of claim 13, wherein the transaction manager further comprises a network interface; and further comprising multiple instructions causing the one or more processors to:
receive, by the network interface of the transaction manager, a confirmation of payment by the buyer's financial institution system.

18. The one or more non-transitory, tangible computer storage media of claim 15, further comprising multiple instructions causing the one or more processors to receive, by the buyer device, biometric verification of the buyer before sending the transaction invoice information data.

19. A systematic system comprising:
a. a point of sale seller device to interact with a buyer device and communicate with a seller's financial institution system, the seller device further generates seller information including a financial transaction invoice with a unique, one-time-only transaction identification and seller's financial institution data associated with the seller's financial institution system including financial routing number, wherein the seller information is generated based on a purchase being initiated with a buyer device in which buyer's financial data from the buyer device is never provided by the buyer device to the seller device;

b. the buyer device including a controller, the buyer device receives a transaction invoice having transaction invoice information data and generate encrypted buyer data that includes buyer identification information and buyer's financial data based on the purchase;

c. a transaction manager generates a single transaction and time limited data packet comprised of the encrypted buyer data associated with the buyer device during the purchase and the seller information transmitted from the seller device to the buyer device and, for the buyer device, establish a communication session to transmit the encrypted transaction data packet directly to a buyer's financial institution system associated with the buyer's financial data;

d. the buyer's financial institution system sends transaction packet information to the seller's financial institution system for pairing with a unique, one-time-only seller encrypted transaction invoice within an allotted time window of a payment session established by the seller as directed by the transaction manager and provides transaction confirmation to the buyer device; and e. the seller's financial institution system determines that the unique, one-time-only transaction pairing is valid, and in response to the valid determination completes the transaction with transaction notification back to the buyer's financial institution system and to the seller device wherein the financial transaction is a secure retail transaction (SRT) created autonomously, the transaction invoice comprising an itemized bill, and a seller's unique and time-sensitive Retail Transaction ID for goods or services to be purchased.

20. The system of claim 19, wherein the seller device further comprises a network interface receives a confirmation of said payment from the seller's financial institution system and the transaction invoice generated by the seller device includes data associated with the time allotted window established by the seller for establishing the time allotted window for the payment session.

21. The system of claim 19, wherein the buyer device further comprises a network interface receives a confirmation from the buyer's financial institution system of said payment to the seller's financial institution system wherein the controller comprises a field-programmable gate array.

22. The system of claim 19, wherein the encrypted transaction data packet is decrypted by the buyer's financial institution system using a decryption key dedicated to the buyer's financial institution system.

23. The system of claim 19, wherein the transaction manager further comprises a network interface to receive a confirmation of payment by the buyer's financial institution system; and the seller device further comprises a network interface to receive a communication representative of a confirmation of payment by the seller's financial institution system.

24. The system of claim 19, wherein the buyer device includes mechanism to receive biometric verification of the buyer via the buyer device before sending the transaction invoice information data.

25. A systematic method comprising:
a. generating, by a point of sale seller device, seller information representative of seller information including a financial transaction invoice with a unique, one-time-only and time limited transaction identification and seller's financial institution data associated with a seller's financial institution system including financial routing number from the seller device based on a purchase being initiated with a buyer device in which buyer's financial data from the buyer device is never provided by the buyer device to the seller device;

b. generating, by the buyer device, encrypted buyer data that includes financial transaction invoice information data received from the seller device and the buyer's financial data based on the purchase;

c. generating, by a transaction manager, a single transaction data packet, the single transaction data packet comprised of encrypted buyer data from the buyer device during the purchase and the seller information transmitted from the point of sale seller device to the buyer device;

d. establishing, by the transaction manager, a communication session from the buyer device to transmit the encrypted transaction data packet directly to a buyer's financial institution system associated with the buyer's financial data;

e. sending, by the buyer's financial institution system as directed by the transaction manager, the transaction packet information to the seller's financial institution system for pairing with a unique, one-time-only and time-limited seller encrypted transaction invoice within an allotted time window established for a payment session by the seller; and f. determining, by the seller's financial institution system, that the one-time-only and time-limited transaction pairing is valid, and in response to the valid determination completing, by the seller's financial institution system, the transaction with transaction notification back to the buyer's financial institution system and to the seller device wherein the financial transaction is a secure retail transaction (SRT) created autonomously, the transaction invoice comprising an itemized bill, and a seller's Secure Retail Transaction ID for goods or services to be purchased.

26. The method of claim 25, further comprising receiving, by a network interface of the seller device, a confirmation of said payment from the seller's financial institution system wherein the transaction invoice generated by the seller device includes data associated with the time allotted window established by the seller for establishing the time allotted window for the payment session.

27. The method of claim 25, further comprising receiving, by a network interface of the buyer device, a confirmation from the buyer's financial institution system of said payment to the seller's financial institution system.

28. The method of claim 25, further comprising, decrypting the encrypted transaction data packet by the buyer's financial institution system using a decryption key dedicated to the buyer's financial institution system.

29. The method of claim 25, wherein the transaction manager further comprises a network interface and the seller device further comprises a network interface; and further comprising:
receiving, by the network interface of the transaction manager, a confirmation of payment by the buyer's financial institution system within the allotted time window established by the seller; and
receiving, by the network interface of the seller device, a communication representative of a confirmation of payment by the seller's financial institution system.

30. The method of claim 25, further comprising receiving, by the buyer device, biometric verification of the buyer before sending the transaction invoice information data.

31. One or more non-transitory, tangible computer storage media having stored thereon multiple instructions causing the one or more processors to:

a. generate, by a point of sale seller device, seller information representative of seller information including a financial transaction invoice with a unique, one-time-only and time-limited transaction identification and seller's financial institution data associated with a seller's financial institution system including financial routing number from the seller device based on a purchase being initiated with a buyer device in which buyer's financial data from the buyer device is never provided by the buyer device to the seller device;

b. generate, by the buyer device, encrypted buyer data that includes financial transaction invoice information data received from the seller device and the buyer's financial data based on the purchase;

c. generate, by a transaction manager, a single transaction data packet comprised of encrypted buyer data from the buyer device during the purchase and the seller information transmitted from the point of sale seller device to the buyer device;

d. establish, by the transaction manager, a communication session from the buyer device to transmit the encrypted transaction data packet directly to a buyer's financial institution system associated with the buyer's financial data;

e. send, by the buyer's financial institution system as directed by the transaction manager, the transaction packet information to the seller's financial institution system for pairing with a unique, one-time-only seller encrypted transaction invoice within an allotted time window established for a payment session by the seller; and f. determine, by the seller's financial institution system, that the unique, one-time-only transaction pairing is valid, and in response to the valid determination completing, by the seller's financial institution system, the transaction with transaction notification back to the buyer's financial institution system and to the seller device wherein the financial transaction is a secure retail transaction (SRT) created autonomously, the transaction invoice comprising an itemized bill, and a seller's unique and time-sensitive Retail Transaction ID for goods or services to be purchased.

32. The one or more non-transitory, tangible computer storage media of claim 31, further comprising multiple instructions causing the one or more processors to receive, by a network interface of the seller device, a confirmation of said payment from the seller's financial institution system wherein the transaction invoice generated by the seller device includes data associated with the time allotted window established by the seller for establishing the time allotted window for the payment session.

33. The one or more non-transitory, tangible computer storage media of claim 31, further comprising multiple instructions causing the one or more processors to receive, by a network interface of the buyer device, a confirmation from the buyer's financial institution system of said payment to the seller's financial institution system.

34. The one or more non-transitory, tangible computer storage media of claim 31, further comprising multiple instructions causing the one or more processors to decrypt the encrypted transaction data packet by the buyer's financial institution system using a decryption key dedicated to the buyer's financial institution system.

35. The one or more non-transitory, tangible computer storage media of claim 31, wherein the transaction manager further comprises a network interface and the seller device further comprises a network interface; and further comprising multiple instructions causing the one or more processors to:

receive, by the network interface of the transaction manager, a confirmation of payment by the buyer's financial institution system; and receive, by the network interface of the seller device, a communication representative of a confirmation of payment by the seller's financial institution system.

36. The one or more non-transitory, tangible computer storage media of claim 31, further comprising multiple instructions causing the one or more processors to receive, by the buyer device, biometric verification of the buyer before sending the transaction invoice information data.

* * * * *